United States Patent
Xu et al.

(10) Patent No.: US 12,448,450 B2
(45) Date of Patent: Oct. 21, 2025

(54) METHOD FOR TREATING TUMOR USING ANTI-CTLA4 SINGLE-DOMAIN ANTIBODIES

(71) Applicant: JIANGSU ALPHAMAB BIOPHARMACEUTICALS CO., LTD., Jiangsu (CN)

(72) Inventors: Ting Xu, Suzhou (CN); Kangping Guo, Suzhou (CN); Xiaoxiao Wang, Suzhou (CN); Pilin Wang, Suzhou (CN); Yuhao Jin, Suzhou (CN); Qian Li, Suzhou (CN)

(73) Assignee: JIANGSU ALPHAMAB BIOPHARMACEUTICALS CO., LTD., Jiangsu (CN)

( * ) Notice: Subject to any disclaimer, the term of this patent is extended or adjusted under 35 U.S.C. 154(b) by 945 days.

(21) Appl. No.: 17/624,795

(22) PCT Filed: Jul. 3, 2020

(86) PCT No.: PCT/CN2020/100232
§ 371 (c)(1),
(2) Date: Jan. 4, 2022

(87) PCT Pub. No.: WO2021/000953
PCT Pub. Date: Jan. 7, 2021

(65) Prior Publication Data
US 2022/0251207 A1  Aug. 11, 2022

(30) Foreign Application Priority Data
Jul. 4, 2019 (WO) ................ PCT/CN2019/094751

(51) Int. Cl.
*C07K 16/28* (2006.01)
*A61P 35/00* (2006.01)

(52) U.S. Cl.
CPC .......... *C07K 16/2818* (2013.01); *A61P 35/00* (2018.01); *C07K 2317/52* (2013.01); *C07K 2317/567* (2013.01)

(58) Field of Classification Search
CPC ............ C07K 16/2818; C07K 2317/52; C07K 2317/567; C07K 2299/00; C07K 2317/24; C07K 2317/33; C07K 2317/73; C07K 2317/76; C07K 2317/569; C07K 2317/71; C07K 2317/732; C07K 2317/77; C07K 2317/92; A61P 35/00; A61K 2039/505; A61K 2039/545
See application file for complete search history.

(56) References Cited

U.S. PATENT DOCUMENTS 11,091,549 B2    8/2021   Xu et al.

FOREIGN PATENT DOCUMENTS

| CN | 103833851       | * | 3/2014  |              |
|----|-----------------|---|---------|--------------|
| CN | 107400166 A1    |   | 11/2017 |              |
| CN | 109195665 A1    |   | 1/2019  |              |
| CN | 109843923 A1    |   | 6/2019  |              |
| EP | 3459597 A1      |   | 3/2019  |              |
| WO | WO2017198212    | * | 11/2017 | ....... A61K 2039/505 |
| WO | WO-2017198212 A1| * | 11/2017 | ........... A61K 39/395 |
| WO | 2018/068201 A1  |   | 4/2018  |              |
| WO | 2019/008001 A1  |   | 1/2019  |              |
| WO | WO-2019179388 A1| * | 9/2019  | ......... C07K 16/2818 |

OTHER PUBLICATIONS

Sharma et. al. The future of immune checkpoint therapy. Science 348,56-61(2015). DOI:10.1126/science.aaa8172 (Year: 2015).*
Ribas A, Wolchok JD. Cancer immunotherapy using checkpoint blockade. Science. Mar. 23, 2018;359(6382):1350-1355. doi: 10.1126/science.aar4060. Epub Mar. 22, 2018. PMID: 29567705; PMCID: PMC7391259 (Year: 2018).*
Ingram JR, et. al. Anti-CTLA-4 therapy requires an Fc domain for efficacy. Proc Natl Acad Sci U S A. Apr. 10, 2018;115(15):3912-3917. doi: 10.1073/pnas.1801524115. Epub Mar. 26, 2018. PMID: 29581255; PMCID: PMC5899492 (Year: 2018).*
Wan R et. al. Screening and antitumor effect of an anti CTLA 4 nanobody. Oncol Rep. Feb. 2018; 39(2):511-518. doi: 10.3892/or.2017.6131. Epub Dec. 4, 2017. PMID: 29207143; PMCID: PMC5783618. (Year: 2017).*
Gershoni et al., Epitope Mapping, Biodrugs 2007; 21 (3): 145-156 (Year: 2007).*
Blythe et al., Benchmarking B cell epitope prediction: Underperformance of existing methods, Protein Science (2005), 14:246-248 ( Year: 2005).*
Schreiber et al.,3D-Epitope-Explorer (3DEX): Localization of Conformational Epitopes within Three-Dimensional Structures of Proteins, Wiley Interscience, 2005 42-44, 60596 (Year: 2005).*
Chiu et al., Antibodies, 8(55):1-80. (Year: 2019).*
Wagner HJ et al. Int J Mol Sci. 2018 19(11): 3444 (Year: 2018).*
Dondelinger M, et. al. Understanding the Significance and Implications of Antibody Numbering and Antigen-Binding Surface/Residue Definition. Front Immunol. Oct. 16, 2018;9:2278. doi: 10.3389/fimmu.2018.02278. PMID: 30386328; PMCID: PMC6198058 ( Year: 2018).*
Furness AJ, et. al. Impact of tumour microenvironment and Fc receptors on the activity of immunomodulatory antibodies. Trends Immunol. Jul. 2014;35(7):290-8. doi: 10.1016/j.it.2014.05.002. Epub Jun. 18, 2014. PMID: 24953012 (Year: 2014).*
Lee HT, Lee SH, Heo YS. Molecular Interactions of Antibody Drugs Targeting PD-1, PD-L1, and CTLA-4 in Immuno-Oncology. Molecules. Mar. 26, 2019;24(6):1190. doi: 10.3390/molecules24061190. PMID: 30917623; PMCID: PMC6470598. (Year: 2019).*

(Continued)

Primary Examiner — Anand U Desai
Assistant Examiner — Kathleen Cunningchen
(74) Attorney, Agent, or Firm — Merchant & Gould P.C.; Daniel J. Pereira

(57) ABSTRACT

Disclosed are a method for treating a tumor using a CTLA4-binding protein and a use thereof, wherein the CTLA4-binding protein specifically binds to CTLA4 and does not compete with a ligand of CTLA4 for binding to CTLA4. The CTLA4-binding protein described in the present application can effectively inhibit tumor growth.

10 Claims, 10 Drawing Sheets

Specification includes a Sequence Listing.

(56) References Cited

OTHER PUBLICATIONS

UnitProt P16410—CTLA4 Human accessed on Dec. 11, 2024 (Year: 2024).*
Brezski RJ, Georgiou G. Immunoglobulin isotype knowledge and application to Fc engineering. Curr Opin Immunol. Jun. 2016;40:62-9. doi: 10.1016/j.coi.2016.03.002. Epub Mar. 23, 2016. PMID: 27003675 (Year: 2016).*

* cited by examiner

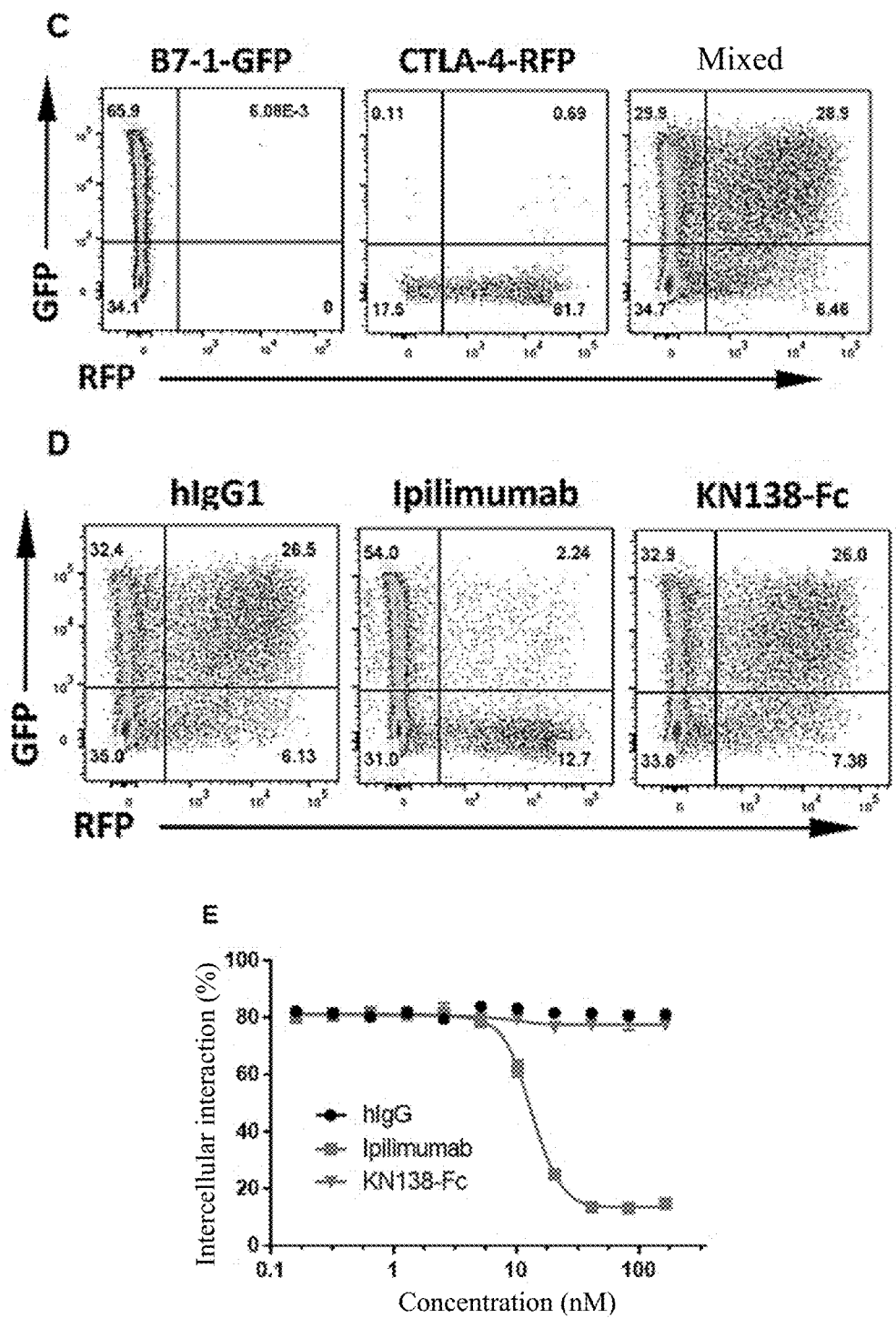
Fig. 6 continue

SEQUENCE LISTING

<160> NUMBER OF SEQ ID NOS: 36

<210> SEQ ID NO 1
<211> LENGTH: 19
<212> TYPE: PRT
<213> ORGANISM: Artificial Sequence
<220> FEATURE:
<223> OTHER INFORMATION: heavy chain CDR3 general formula
<220> FEATURE:
<221> NAME/KEY: X
<222> LOCATION: (1)..(1)
<223> OTHER INFORMATION: X is any amino acid
<220> FEATURE:
<221> NAME/KEY: X
<222> LOCATION: (2)..(2)
<223> OTHER INFORMATION: X is any amino acid
<220> FEATURE:
<221> NAME/KEY: X
<222> LOCATION: (3)..(3)
<223> OTHER INFORMATION: X is any amino acid
<220> FEATURE:
<221> NAME/KEY: X
<222> LOCATION: (4)..(4)
<223> OTHER INFORMATION: X is any amino acid
<220> FEATURE:
<221> NAME/KEY: X
<222> LOCATION: (5)..(5)
<223> OTHER INFORMATION: X is any amino acid
<220> FEATURE:
<221> NAME/KEY: X
<222> LOCATION: (6)..(6)
<223> OTHER INFORMATION: X is any amino acid
<220> FEATURE:
<221> NAME/KEY: X
<222> LOCATION: (7)..(7)
<223> OTHER INFORMATION: X is any amino acid
<220> FEATURE:
<221> NAME/KEY: X
<222> LOCATION: (11)..(11)
<223> OTHER INFORMATION: X is any amino acid
<220> FEATURE:
<221> NAME/KEY: X
<222> LOCATION: (13)..(13)
<223> OTHER INFORMATION: X is any amino acid
<220> FEATURE:
<221> NAME/KEY: X
<222> LOCATION: (14)..(14)
<223> OTHER INFORMATION: X is any amino acid
<220> FEATURE:
<221> NAME/KEY: X
<222> LOCATION: (15)..(15)
<223> OTHER INFORMATION: X is any amino acid
<220> FEATURE:
<221> NAME/KEY: X
<222> LOCATION: (16)..(16)
<223> OTHER INFORMATION: X is any amino acid
<220> FEATURE:
<221> NAME/KEY: X
<222> LOCATION: (17)..(17)
<223> OTHER INFORMATION: X is any amino acid
<220> FEATURE:
<221> NAME/KEY: X
<222> LOCATION: (18)..(18)
<223> OTHER INFORMATION: X is any amino acid
<220> FEATURE:
<221> NAME/KEY: X
<222> LOCATION: (19)..(19)
<223> OTHER INFORMATION: X is any amino acid

<400> SEQUENCE: 1

Xaa Xaa Xaa Xaa Xaa Xaa Xaa Ala Trp Cys Xaa Arg Xaa Xaa Xaa Xaa
1               5                   10                  15

Xaa Xaa Xaa

<210> SEQ ID NO 2

```
<211> LENGTH: 19
<212> TYPE: PRT
<213> ORGANISM: Artificial Sequence
<220> FEATURE:
<223> OTHER INFORMATION: heavy chain CDR3

<400> SEQUENCE: 2

Ala Ala Ala Pro Glu Gly Arg Ala Trp Cys Ser Arg Asp Pro Ser Gly
1               5                   10                  15

Tyr Asn Tyr

<210> SEQ ID NO 3
<211> LENGTH: 8
<212> TYPE: PRT
<213> ORGANISM: Artificial Sequence
<220> FEATURE:
<223> OTHER INFORMATION: heavy chain CDR2general formula
<220> FEATURE:
<221> NAME/KEY: X
<222> LOCATION: (1)..(1)
<223> OTHER INFORMATION: X is any amino acid
<220> FEATURE:
<221> NAME/KEY: X
<222> LOCATION: (2)..(2)
<223> OTHER INFORMATION: X is any amino acid
<220> FEATURE:
<221> NAME/KEY: X
<222> LOCATION: (3)..(3)
<223> OTHER INFORMATION: X is any amino acid
<220> FEATURE:
<221> NAME/KEY: X
<222> LOCATION: (4)..(4)
<223> OTHER INFORMATION: X is any amino acid
<220> FEATURE:
<221> NAME/KEY: X
<222> LOCATION: (7)..(7)
<223> OTHER INFORMATION: X is any amino acid
<220> FEATURE:
<221> NAME/KEY: X
<222> LOCATION: (8)..(8)
<223> OTHER INFORMATION: X is any amino acid

<400> SEQUENCE: 3

Xaa Xaa Xaa Xaa Gly Thr Xaa Xaa
1               5

<210> SEQ ID NO 4
<211> LENGTH: 8
<212> TYPE: PRT
<213> ORGANISM: Artificial Sequence
<220> FEATURE:
<223> OTHER INFORMATION: heavy chain CDR2

<400> SEQUENCE: 4

Ile Ser Gly Val Gly Thr Gly Thr
1               5

<210> SEQ ID NO 5
<211> LENGTH: 8
<212> TYPE: PRT
<213> ORGANISM: Artificial Sequence
<220> FEATURE:
<223> OTHER INFORMATION: heavy chain CDR1general formula
<220> FEATURE:
<221> NAME/KEY: X
<222> LOCATION: (1)..(1)
<223> OTHER INFORMATION: X is any amino acid
<220> FEATURE:
<221> NAME/KEY: X
<222> LOCATION: (2)..(2)
<223> OTHER INFORMATION: X is any amino acid
<220> FEATURE:
```

```
<221> NAME/KEY: X
<222> LOCATION: (3)..(3)
<223> OTHER INFORMATION: X is any amino acid
<220> FEATURE:
<221> NAME/KEY: X
<222> LOCATION: (5)..(5)
<223> OTHER INFORMATION: X is any amino acid
<220> FEATURE:
<221> NAME/KEY: X
<222> LOCATION: (6)..(6)
<223> OTHER INFORMATION: X is any amino acid
<220> FEATURE:
<221> NAME/KEY: X
<222> LOCATION: (7)..(7)
<223> OTHER INFORMATION: X is any amino acid
<220> FEATURE:
<221> NAME/KEY: X
<222> LOCATION: (8)..(8)
<223> OTHER INFORMATION: X is any amino acid

<400> SEQUENCE: 5

Xaa Xaa Xaa Asn Xaa Xaa Xaa Xaa
1               5

<210> SEQ ID NO 6
<211> LENGTH: 8
<212> TYPE: PRT
<213> ORGANISM: Artificial Sequence
<220> FEATURE:
<223> OTHER INFORMATION: heavy chain CDR1

<400> SEQUENCE: 6

Gly Tyr Ala Asn Ser Asn Thr Cys
1               5

<210> SEQ ID NO 7
<211> LENGTH: 126
<212> TYPE: PRT
<213> ORGANISM: Artificial Sequence
<220> FEATURE:
<223> OTHER INFORMATION: heavy chain variable region general formula/VHH
      general formula
<220> FEATURE:
<221> NAME/KEY: X
<222> LOCATION: (11)..(11)
<223> OTHER INFORMATION: X is S or L
<220> FEATURE:
<221> NAME/KEY: X
<222> LOCATION: (14)..(14)
<223> OTHER INFORMATION: X is A or P
<220> FEATURE:
<221> NAME/KEY: X
<222> LOCATION: (26)..(26)
<223> OTHER INFORMATION: X is any amino acid
<220> FEATURE:
<221> NAME/KEY: X
<222> LOCATION: (27)..(27)
<223> OTHER INFORMATION: X is any amino acid
<220> FEATURE:
<221> NAME/KEY: X
<222> LOCATION: (28)..(28)
<223> OTHER INFORMATION: X is any amino acid
<220> FEATURE:
<221> NAME/KEY: X
<222> LOCATION: (30)..(30)
<223> OTHER INFORMATION: X is any amino acid
<220> FEATURE:
<221> NAME/KEY: X
<222> LOCATION: (31)..(31)
<223> OTHER INFORMATION: X is any amino acid
<220> FEATURE:
<221> NAME/KEY: X
<222> LOCATION: (32)..(32)
<223> OTHER INFORMATION: X is any amino acid
<220> FEATURE:
```

```
<221> NAME/KEY: X
<222> LOCATION: (33)..(33)
<223> OTHER INFORMATION: X is any amino acid
<220> FEATURE:
<221> NAME/KEY: X
<222> LOCATION: (44)..(44)
<223> OTHER INFORMATION: X is E or G
<220> FEATURE:
<221> NAME/KEY: X
<222> LOCATION: (45)..(45)
<223> OTHER INFORMATION: X is R or L
<220> FEATURE:
<221> NAME/KEY: X
<222> LOCATION: (51)..(51)
<223> OTHER INFORMATION: X is any amino acid
<220> FEATURE:
<221> NAME/KEY: X
<222> LOCATION: (52)..(52)
<223> OTHER INFORMATION: X is any amino acid
<220> FEATURE:
<221> NAME/KEY: X
<222> LOCATION: (53)..(53)
<223> OTHER INFORMATION: X is any amino acid
<220> FEATURE:
<221> NAME/KEY: X
<222> LOCATION: (54)..(54)
<223> OTHER INFORMATION: X is any amino acid
<220> FEATURE:
<221> NAME/KEY: X
<222> LOCATION: (57)..(57)
<223> OTHER INFORMATION: X is any amino acid
<220> FEATURE:
<221> NAME/KEY: X
<222> LOCATION: (58)..(58)
<223> OTHER INFORMATION: X is any amino acid
<220> FEATURE:
<221> NAME/KEY: X
<222> LOCATION: (75)..(75)
<223> OTHER INFORMATION: X is G or S
<220> FEATURE:
<221> NAME/KEY: X
<222> LOCATION: (80)..(80)
<223> OTHER INFORMATION: X is F or Y
<220> FEATURE:
<221> NAME/KEY: X
<222> LOCATION: (87)..(87)
<223> OTHER INFORMATION: X is K or R
<220> FEATURE:
<221> NAME/KEY: X
<222> LOCATION: (88)..(88)
<223> OTHER INFORMATION: X is P or A
<220> FEATURE:
<221> NAME/KEY: X
<222> LOCATION: (93)..(93)
<223> OTHER INFORMATION: X is M or V
<220> FEATURE:
<221> NAME/KEY: X
<222> LOCATION: (97)..(97)
<223> OTHER INFORMATION: X is any amino acid
<220> FEATURE:
<221> NAME/KEY: X
<222> LOCATION: (98)..(98)
<223> OTHER INFORMATION: X is any amino acid
<220> FEATURE:
<221> NAME/KEY: X
<222> LOCATION: (99)..(99)
<223> OTHER INFORMATION: X is any amino acid
<220> FEATURE:
<221> NAME/KEY: X
<222> LOCATION: (100)..(100)
<223> OTHER INFORMATION: X is any amino acid
<220> FEATURE:
<221> NAME/KEY: X
<222> LOCATION: (101)..(101)
<223> OTHER INFORMATION: X is any amino acid
<220> FEATURE:
<221> NAME/KEY: X
<222> LOCATION: (102)..(102)
<223> OTHER INFORMATION: X is any amino acid
```

```
<220> FEATURE:
<221> NAME/KEY: X
<222> LOCATION: (103)..(103)
<223> OTHER INFORMATION: X is any amino acid
<220> FEATURE:
<221> NAME/KEY: X
<222> LOCATION: (107)..(107)
<223> OTHER INFORMATION: X is any amino acid
<220> FEATURE:
<221> NAME/KEY: X
<222> LOCATION: (109)..(109)
<223> OTHER INFORMATION: X is any amino acid
<220> FEATURE:
<221> NAME/KEY: X
<222> LOCATION: (110)..(110)
<223> OTHER INFORMATION: X is any amino acid
<220> FEATURE:
<221> NAME/KEY: X
<222> LOCATION: (111)..(111)
<223> OTHER INFORMATION: X is any amino acid
<220> FEATURE:
<221> NAME/KEY: X
<222> LOCATION: (112)..(112)
<223> OTHER INFORMATION: X is any amino acid
<220> FEATURE:
<221> NAME/KEY: X
<222> LOCATION: (113)..(113)
<223> OTHER INFORMATION: X is any amino acid
<220> FEATURE:
<221> NAME/KEY: X
<222> LOCATION: (114)..(114)
<223> OTHER INFORMATION: X is any amino acid
<220> FEATURE:
<221> NAME/KEY: X
<222> LOCATION: (115)..(115)
<223> OTHER INFORMATION: X is any amino acid
<220> FEATURE:
<221> NAME/KEY: X
<222> LOCATION: (121)..(121)
<223> OTHER INFORMATION: X is Q or L
<220> FEATURE:
<221> NAME/KEY: X
<222> LOCATION: (126)..(126)
<223> OTHER INFORMATION: X is S or missing

<400> SEQUENCE: 7

Gln Val Gln Leu Val Glu Ser Gly Gly Gly Xaa Val Gln Xaa Gly Gly
1               5                   10                  15

Ser Leu Arg Leu Ser Cys Ala Ala Ser Xaa Xaa Xaa Asn Xaa Xaa Xaa
            20                  25                  30

Xaa Met Gly Trp Phe Arg Gln Ala Pro Gly Lys Xaa Xaa Glu Arg Val
            35                  40                  45

Ala Ala Xaa Xaa Xaa Xaa Gly Thr Xaa Xaa Tyr Tyr Ala Asp Ser Val
        50                  55                  60

Lys Gly Arg Phe Thr Ile Ser Arg Asp Asn Xaa Lys Asn Thr Leu Xaa
65                  70                  75                  80

Leu Gln Met Asn Ser Leu Xaa Xaa Glu Asp Thr Ala Xaa Tyr Tyr Cys
                85                  90                  95

Xaa Xaa Xaa Xaa Xaa Xaa Xaa Ala Trp Cys Xaa Arg Xaa Xaa Xaa Xaa
            100                 105                 110

Xaa Xaa Xaa Trp Gly Gln Gly Thr Xaa Val Thr Val Ser Xaa
        115                 120                 125

<210> SEQ ID NO 8
<211> LENGTH: 126
<212> TYPE: PRT
<213> ORGANISM: Artificial Sequence
<220> FEATURE:
<223> OTHER INFORMATION: heavy chain variable region
```

<400> SEQUENCE: 8

Gln Val Gln Leu Gln Glu Ser Gly Gly Gly Ser Val Gln Ala Gly Gly
1               5                   10                  15

Ser Leu Thr Leu Ser Cys Ala Ala Ser Gly Tyr Ala Asn Ser Asn Thr
            20                  25                  30

Cys Met Gly Trp Phe Arg Gln Ala Pro Gly Lys Glu Arg Glu Arg Val
        35                  40                  45

Ala Ala Ile Ser Gly Val Gly Thr Gly Thr Tyr Tyr Ala Asp Ser Val
    50                  55                  60

Lys Gly Arg Phe Thr Ile Ser Arg Asp Asn Gly Lys Asn Thr Leu Phe
65                  70                  75                  80

Leu Gln Met Asn Ser Leu Lys Pro Glu Asp Thr Ala Met Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Gln Val Thr Val Ser Ser
            115                 120                 125

<210> SEQ ID NO 9
<211> LENGTH: 360
<212> TYPE: PRT
<213> ORGANISM: Artificial Sequence
<220> FEATURE:
<223> OTHER INFORMATION: KN138-Fc

<400> SEQUENCE: 9

Gln Val Gln Leu Gln Glu Ser Gly Gly Gly Ser Val Gln Ala Gly Gly
1               5                   10                  15

Ser Leu Thr Leu Ser Cys Ala Ala Ser Gly Tyr Ala Asn Ser Asn Thr
            20                  25                  30

Cys Met Gly Trp Phe Arg Gln Ala Pro Gly Lys Glu Arg Glu Arg Val
        35                  40                  45

Ala Ala Ile Ser Gly Val Gly Thr Gly Thr Tyr Tyr Ala Asp Ser Val
    50                  55                  60

Lys Gly Arg Phe Thr Ile Ser Arg Asp Asn Gly Lys Asn Thr Leu Phe
65                  70                  75                  80

Leu Gln Met Asn Ser Leu Lys Pro Glu Asp Thr Ala Met Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Gln Val Thr Val Ser Ser Gly Ser
            115                 120                 125

Glu Pro Lys Ser Ser Asp Lys Thr His Thr Cys Pro Pro Cys Pro Ala
    130                 135                 140

Pro Glu Leu Leu Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
            165                 170                 175

Val Asp Val Ser His Glu Asp Pro Glu Val Lys Phe Asn Trp Tyr Val
        180                 185                 190

Asp Gly Val Glu Val His Asn Ala Lys Thr Lys Pro Arg Glu Glu Gln
    195                 200                 205

Tyr Asn Ser Thr Tyr Arg Val Val Ser Val Leu Thr Val Leu His Gln
    210                 215                 220

Asp Trp Leu Asn Gly Lys Glu Tyr Lys Cys Lys Val Ser Asn Lys Ala

```
                225                 230                 235                 240
Leu Pro Ala Pro Ile Glu Lys Thr Ile Ser Lys Ala Lys Gly Gln Pro
                245                 250                 255

Arg Glu Pro Gln Val Tyr Thr Leu Pro Pro Ser Arg Asp Glu Leu Thr
                260                 265                 270

Lys Asn Gln Val Ser Leu Thr Cys Leu Val Lys Gly Phe Tyr Pro Ser
                275                 280                 285

Asp Ile Ala Val Glu Trp Glu Ser Asn Gly Gln Pro Glu Asn Asn Tyr
                290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
                325                 330                 335

Ser Cys Ser Val Met His Glu Ala Leu His Asn His Tyr Thr Gln Lys
                340                 345                 350

Ser Leu Ser Leu Ser Pro Gly Lys
                355                 360

<210> SEQ ID NO 10
<211> LENGTH: 232
<212> TYPE: PRT
<213> ORGANISM: Artificial Sequence
<220> FEATURE:
<223> OTHER INFORMATION: human IgG1-Fc

<400> SEQUENCE: 10

Glu Pro Lys Ser Cys Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
                20                  25                  30

Lys Asp Thr Leu Met Ile Ser Arg Thr Pro Glu Val Thr Cys Val Val
                35                  40                  45

Val Asp Val Ser His Glu Asp Pro Glu Val Lys Phe Asn Trp Tyr Val
    50                  55                  60

Asp Gly Val Glu Val His Asn Ala Lys Thr Lys Pro Arg Glu Glu Gln
65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
                100                 105                 110

Leu Pro Ala Pro Ile Glu Lys Thr Ile Ser Lys Ala Lys Gly Gln Pro
                115                 120                 125

Arg Glu Pro Gln Val Tyr Thr Leu Pro Pro Ser Arg Asp Glu Leu Thr
                130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
                180                 185                 190

Ser Lys Leu Thr Val Asp Lys Ser Arg Trp Gln Gln Gly Asn Val Phe
                195                 200                 205

Ser Cys Ser Val Met His Glu Ala Leu His Asn His Tyr Thr Gln Lys
                210                 215                 220

Ser Leu Ser Leu Ser Pro Gly Lys
```

<210> SEQ ID NO 11
<211> LENGTH: 360
<212> TYPE: PRT
<213> ORGANISM: Artificial Sequence
<220> FEATURE:
<223> OTHER INFORMATION: KN044

<400> SEQUENCE: 11

```
Gln Val Gln Leu Gln Glu Ser Gly Gly Gly Ser Val Gln Ala Gly Gly
1               5                   10                  15

Ser Leu Thr Leu Ser Cys Ala Ala Ser Gly Tyr Ala Asn Ser Asn Thr
            20                  25                  30

Cys Met Gly Trp Phe Arg Gln Ala Pro Gly Lys Glu Arg Glu Arg Val
        35                  40                  45

Ala Ala Ile Ser Gly Val Gly Thr Gly Thr Tyr Tyr Ala Asp Ser Val
    50                  55                  60

Lys Gly Arg Phe Thr Ile Ser Arg Asp Asn Gly Lys Asn Thr Leu Phe
65                  70                  75                  80

Leu Gln Met Asn Ser Leu Lys Pro Glu Asp Thr Ala Met Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Gln Val Thr Val Ser Gly Ser
        115                 120                 125

Glu Pro Lys Ser Ser Asp Lys Thr His Thr Cys Pro Pro Cys Pro Ala
    130                 135                 140

Pro Glu Leu Leu Gly Gly Pro Ser Val Phe Leu Phe Pro Pro Lys Pro
145                 150                 155                 160

Lys Asp Thr Leu Met Ile Ser Arg Thr Pro Glu Val Thr Cys Val Val
                165                 170                 175

Val Ala Val Ser His Glu Asp Pro Glu Val Lys Phe Asn Trp Tyr Val
            180                 185                 190

Asp Gly Val Glu Val His Asn Ala Lys Thr Lys Pro Arg Glu Glu Gln
        195                 200                 205

Tyr Asn Ser Thr Tyr Arg Val Val Ser Val Leu Thr Val Leu His Gln
    210                 215                 220

Asp Trp Leu Asn Gly Lys Glu Tyr Lys Cys Lys Val Ser Asn Lys Ala
225                 230                 235                 240

Leu Pro Ala Gly Ile Glu Lys Thr Ile Ser Lys Ala Lys Gly Gln Pro
                245                 250                 255

Arg Glu Pro Gln Val Tyr Thr Leu Pro Pro Ser Arg Asp Glu Leu Thr
            260                 265                 270

Lys Asn Gln Val Ser Leu Thr Cys Leu Val Lys Gly Phe Tyr Pro Ser
        275                 280                 285

Asp Ile Ala Val Glu Trp Glu Ser Asn Gly Gln Pro Glu Asn Asn Tyr
    290                 295                 300

Lys Thr Thr Pro Pro Val Leu Asp Ser Asp Gly Ser Phe Phe Leu Tyr
305                 310                 315                 320

Ser Lys Leu Thr Val Asp Lys Ser Arg Trp Gln Gln Gly Asn Val Phe
                325                 330                 335

Ser Cys Ser Val Met His Glu Ala Leu His Asn His Tyr Thr Gln Lys
            340                 345                 350

Ser Leu Ser Leu Ser Pro Gly Lys
        355                 360
```

<210> SEQ ID NO 12
<211> LENGTH: 448
<212> TYPE: PRT
<213> ORGANISM: Artificial Sequence
<220> FEATURE:
<223> OTHER INFORMATION: ipilimumab-AGheavy chain

<400> SEQUENCE: 12

```
Gln Val Gln Leu Val Glu Ser Gly Gly Gly Val Gln Pro Gly Arg
1               5                   10                  15

Ser Leu Arg Leu Ser Cys Ala Ala Ser Gly Phe Thr Phe Ser Ser Tyr
            20                  25                  30

Thr Met His Trp Val Arg Gln Ala Pro Gly Lys Gly Leu Glu Trp Val
        35                  40                  45

Thr Phe Ile Ser Tyr Asp Gly Asn Asn Lys Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Ile Tyr Tyr Cys
                85                  90                  95

Ala Arg Thr Gly Trp Leu Gly Pro Phe Asp Tyr Trp Gly Gln Gly Thr
            100                 105                 110

Leu Val Thr Val Ser Ser Ala Ser Thr Lys Gly Pro Ser Val Phe Pro
        115                 120                 125

Leu Ala Pro Ser Ser Lys Ser Thr Ser Gly Gly Thr Ala Ala Leu Gly
    130                 135                 140

Cys Leu Val Lys Asp Tyr Phe Pro Glu Pro Val Thr Val Ser Trp Asn
145                 150                 155                 160

Ser Gly Ala Leu Thr Ser Gly Val His Thr Phe Pro Ala Val Leu Gln
                165                 170                 175

Ser Ser Gly Leu Tyr Ser Leu Ser Ser Val Val Thr Val Pro Ser Ser
            180                 185                 190

Ser Leu Gly Thr Gln Thr Tyr Ile Cys Asn Val Asn His Lys Pro Ser
        195                 200                 205

Asn Thr Lys Val Asp Lys Lys Val Glu Pro Lys Ser Ser Asp Lys Thr
    210                 215                 220

His Thr Cys Pro Pro Cys Pro Ala Pro Glu Leu Leu Gly Gly Pro Ser
225                 230                 235                 240

Val Phe Leu Phe Pro Pro Lys Pro Lys Asp Thr Leu Met Ile Ser Arg
                245                 250                 255

Thr Pro Glu Val Thr Cys Val Val Val Ala Val Ser His Glu Asp Pro
            260                 265                 270

Glu Val Lys Phe Asn Trp Tyr Val Asp Gly Val Glu Val His Asn Ala
        275                 280                 285

Lys Thr Lys Pro Arg Glu Glu Gln Tyr Asn Ser Thr Tyr Arg Val Val
    290                 295                 300

Ser Val Leu Thr Val Leu His Gln Asp Trp Leu Asn Gly Lys Glu Tyr
305                 310                 315                 320

Lys Cys Lys Val Ser Asn Lys Ala Leu Pro Ala Gly Ile Glu Lys Thr
                325                 330                 335

Ile Ser Lys Ala Lys Gly Gln Pro Arg Glu Pro Gln Val Tyr Thr Leu
            340                 345                 350

Pro Pro Ser Arg Asp Glu Leu Thr Lys Asn Gln Val Ser Leu Thr Cys
```

355                 360                 365

Leu Val Lys Gly Phe Tyr Pro Ser Asp Ile Ala Val Glu Trp Glu Ser
    370                 375                 380

Asn Gly Gln Pro Glu Asn Asn Tyr Lys Thr Thr Pro Pro Val Leu Asp
385                 390                 395                 400

Ser Asp Gly Ser Phe Phe Leu Tyr Ser Lys Leu Thr Val Asp Lys Ser
                405                 410                 415

Arg Trp Gln Gln Gly Asn Val Phe Ser Cys Ser Val Met His Glu Ala
                420                 425                 430

Leu His Asn His Tyr Thr Gln Lys Ser Leu Ser Leu Ser Pro Gly Lys
                435                 440                 445

<210> SEQ ID NO 13
<211> LENGTH: 215
<212> TYPE: PRT
<213> ORGANISM: Artificial Sequence
<220> FEATURE:
<223> OTHER INFORMATION: ipilimumab-AG light chain

<400> SEQUENCE: 13

Glu Ile Val Leu Thr Gln Ser Pro Gly Thr Leu Ser Leu Ser Pro Gly
1               5                   10                  15

Glu Arg Ala Thr Leu Ser Cys Arg Ala Ser Gln Ser Val Gly Ser Ser
                20                  25                  30

Tyr Leu Ala Trp Tyr Gln Gln Lys Pro Gly Gln Ala Pro Arg Leu Leu
            35                  40                  45

Ile Tyr Gly Ala Phe Ser Arg Ala Thr Gly Ile Pro Asp Arg Phe Ser
        50                  55                  60

Gly Ser Gly Ser Gly Thr Asp Phe Thr Leu Thr Ile Ser Arg Leu Glu
65                  70                  75                  80

Pro Glu Asp Phe Ala Val Tyr Tyr Cys Gln Gln Tyr Gly Ser Ser Pro
                85                  90                  95

Trp Thr Phe Gly Gln Gly Thr Lys Val Glu Ile Lys Arg Thr Val Ala
                100                 105                 110

Ala Pro Ser Val Phe Ile Phe Pro Pro Ser Asp Glu Gln Leu Lys Ser
            115                 120                 125

Gly Thr Ala Ser Val Val Cys Leu Leu Asn Asn Phe Tyr Pro Arg Glu
130                 135                 140

Ala Lys Val Gln Trp Lys Val Asp Asn Ala Leu Gln Ser Gly Asn Ser
145                 150                 155                 160

Gln Glu Ser Val Thr Glu Gln Asp Ser Lys Asp Ser Thr Tyr Ser Leu
                165                 170                 175

Ser Ser Thr Leu Thr Leu Ser Lys Ala Asp Tyr Glu Lys His Lys Val
                180                 185                 190

Tyr Ala Cys Glu Val Thr His Gln Gly Leu Ser Ser Pro Val Thr Lys
            195                 200                 205

Ser Phe Asn Arg Gly Glu Cys
        210                 215

<210> SEQ ID NO 14
<211> LENGTH: 127
<212> TYPE: PRT
<213> ORGANISM: Artificial Sequence
<220> FEATURE:
<223> OTHER INFORMATION: human CTLA4

<400> SEQUENCE: 14

```
Lys Ala Met His Val Ala Gln Pro Ala Val Leu Ala Ser Ser Arg
1               5                   10                  15

Gly Ile Ala Ser Phe Val Cys Glu Tyr Ala Ser Pro Gly Lys Ala Thr
            20                  25                  30

Glu Val Arg Val Thr Val Leu Arg Gln Ala Asp Ser Gln Val Thr Glu
        35                  40                  45

Val Cys Ala Ala Thr Tyr Met Met Gly Asn Glu Leu Thr Phe Leu Asp
    50                  55                  60

Asp Ser Ile Cys Thr Gly Thr Ser Ser Gly Asn Gln Val Asn Leu Thr
65                  70                  75                  80

Ile Gln Gly Leu Arg Ala Met Asp Thr Gly Leu Tyr Ile Cys Lys Val
                85                  90                  95

Glu Leu Met Tyr Pro Pro Pro Tyr Tyr Leu Gly Ile Gly Asn Gly Thr
                100                 105                 110

Gln Ile Tyr Val Ile Asp Pro Glu Pro Cys Pro Asp Ser Asp Gln
            115                 120                 125
```

<210> SEQ ID NO 15
<211> LENGTH: 357
<212> TYPE: PRT
<213> ORGANISM: Artificial Sequence
<220> FEATURE:
<223> OTHER INFORMATION: CTLA4-muFc

<400> SEQUENCE: 15

```
Met His Val Ala Gln Pro Ala Val Val Leu Ala Ser Ser Arg Gly Ile
1               5                   10                  15

Ala Ser Phe Val Cys Glu Tyr Ala Ser Pro Gly Lys Ala Thr Glu Val
            20                  25                  30

Arg Val Thr Val Leu Arg Gln Ala Asp Ser Gln Val Thr Glu Val Cys
        35                  40                  45

Ala Ala Thr Tyr Met Met Gly Asn Glu Leu Thr Phe Leu Asp Asp Ser
    50                  55                  60

Ile Cys Thr Gly Thr Ser Ser Gly Asn Gln Val Asn Leu Thr Ile Gln
65                  70                  75                  80

Gly Leu Arg Ala Met Asp Thr Gly Leu Tyr Ile Cys Lys Val Glu Leu
                85                  90                  95

Met Tyr Pro Pro Pro Tyr Tyr Leu Gly Ile Gly Asn Gly Thr Gln Ile
                100                 105                 110

Tyr Val Ile Asp Pro Glu Pro Cys Pro Asp Ser Asp Gln Gly Ser Met
            115                 120                 125

Asp Pro Lys Ser Ser Asp Lys Thr His Thr Cys Pro Pro Cys Pro Ala
130                 135                 140

Pro Glu Val Ser Ser Val Phe Ile Phe Pro Pro Lys Pro Lys Asp Val
145                 150                 155                 160

Leu Thr Ile Thr Leu Thr Pro Lys Val Thr Cys Val Val Val Asp Ile
                165                 170                 175

Ser Lys Asp Asp Pro Glu Val Gln Phe Ser Trp Phe Val Asp Asp Val
                180                 185                 190

Glu Val His Thr Ala Gln Thr Gln Pro Arg Glu Glu Gln Phe Asn Ser
            195                 200                 205

Thr Phe Arg Ser Val Ser Glu Leu Pro Ile Met His Gln Asp Trp Leu
210                 215                 220

Asn Gly Lys Glu Phe Lys Cys Arg Val Asn Ser Ala Ala Phe Pro Ala
225                 230                 235                 240
```

```
Pro Ile Glu Lys Thr Ile Ser Lys Thr Lys Gly Arg Pro Lys Ala Pro
                245                 250                 255

Gln Val Tyr Thr Ile Pro Pro Lys Glu Gln Met Ala Lys Asp Lys
            260                 265                 270

Val Ser Leu Thr Cys Met Ile Thr Asp Phe Phe Pro Glu Asp Ile Thr
            275                 280                 285

Val Glu Trp Gln Trp Asn Gly Gln Pro Ala Glu Asn Tyr Lys Asn Thr
            290                 295                 300

Gln Pro Ile Met Asn Thr Asn Gly Ser Tyr Phe Val Tyr Ser Lys Leu
305                 310                 315                 320

Asn Val Gln Lys Ser Asn Trp Glu Ala Gly Asn Thr Phe Thr Cys Ser
                325                 330                 335

Val Leu His Glu Gly Leu His Asn His His Thr Glu Lys Ser Leu Ser
            340                 345                 350

His Ser Pro Gly Lys
            355

<210> SEQ ID NO 16
<211> LENGTH: 357
<212> TYPE: PRT
<213> ORGANISM: Artificial Sequence
<220> FEATURE:
<223> OTHER INFORMATION: CTLA4-Fc

<400> SEQUENCE: 16

Met His Val Ala Gln Pro Ala Val Val Leu Ala Ser Ser Arg Gly Ile
1               5                   10                  15

Ala Ser Phe Val Cys Glu Tyr Ala Ser Pro Gly Lys Ala Thr Glu Val
            20                  25                  30

Arg Val Thr Val Leu Arg Gln Ala Asp Ser Gln Val Thr Glu Val Cys
        35                  40                  45

Ala Ala Thr Tyr Met Met Gly Asn Glu Leu Thr Phe Leu Asp Asp Ser
    50                  55                  60

Ile Cys Thr Gly Thr Ser Ser Gly Asn Gln Val Asn Leu Thr Ile Gln
65                  70                  75                  80

Gly Leu Arg Ala Met Asp Thr Gly Leu Tyr Ile Cys Lys Val Glu Leu
                85                  90                  95

Met Tyr Pro Pro Pro Tyr Tyr Leu Gly Ile Gly Asn Gly Thr Gln Ile
            100                 105                 110

Tyr Val Ile Asp Pro Glu Pro Cys Pro Asp Ser Asp Gln Glu Pro Lys
        115                 120                 125

Ser Ser Asp Lys Thr His Thr Cys Pro Pro Cys Pro Ala Pro Glu Leu
    130                 135                 140

Leu Gly Gly Pro Ser Val Phe Leu Phe Pro Pro Lys Pro Lys Asp Thr
145                 150                 155                 160

Leu Met Ile Ser Arg Thr Pro Glu Val Thr Cys Val Val Val Asp Val
                165                 170                 175

Ser His Glu Asp Pro Glu Val Lys Phe Asn Trp Tyr Val Asp Gly Val
            180                 185                 190

Glu Val His Asn Ala Lys Thr Lys Pro Arg Glu Glu Gln Tyr Asn Ser
        195                 200                 205

Thr Tyr Arg Val Val Ser Val Leu Thr Val Leu His Gln Asp Trp Leu
    210                 215                 220

Asn Gly Lys Glu Tyr Lys Cys Lys Val Ser Asn Lys Ala Leu Pro Ala
225                 230                 235                 240
```

-continued

```
Pro Ile Glu Lys Thr Ile Ser Lys Ala Lys Gly Gln Pro Arg Glu Pro
                245                 250                 255

Gln Val Tyr Thr Leu Pro Pro Ser Arg Asp Glu Leu Thr Lys Asn Gln
            260                 265                 270

Val Ser Leu Thr Cys Leu Val Lys Gly Phe Tyr Pro Ser Asp Ile Ala
        275                 280                 285

Val Glu Trp Glu Ser Asn Gly Gln Pro Glu Asn Asn Tyr Lys Thr Thr
    290                 295                 300

Pro Pro Val Leu Asp Ser Asp Gly Ser Phe Phe Leu Tyr Ser Lys Leu
305                 310                 315                 320

Thr Val Asp Lys Ser Arg Trp Gln Gln Gly Asn Val Phe Ser Cys Ser
                325                 330                 335

Val Met His Glu Ala Leu His Asn His Tyr Thr Gln Lys Ser Leu Ser
            340                 345                 350

Leu Ser Pro Gly Lys
            355
```

<210> SEQ ID NO 17
<211> LENGTH: 126
<212> TYPE: PRT
<213> ORGANISM: Artificial Sequence
<220> FEATURE:
<223> OTHER INFORMATION: hu138 V1

<400> SEQUENCE: 17

```
Gln Val Gln Leu Val Glu Ser Gly Gly Gly Val Gln Ala Gly Gly
1               5                   10                  15

Ser Leu Arg Leu Ser Cys Ala Ala Ser Gly Tyr Ala Asn Ser Asn Thr
            20                  25                  30

Cys Met Gly Trp Phe Arg Gln Ala Pro Gly Lys Glu Arg Glu Arg Val
        35                  40                  45

Ala Ala Ile Ser Gly Val Gly Thr Gly Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Leu Val Thr Val Ser Ser
        115                 120                 125
```

<210> SEQ ID NO 18
<211> LENGTH: 126
<212> TYPE: PRT
<213> ORGANISM: Artificial Sequence
<220> FEATURE:
<223> OTHER INFORMATION: hu138 V2

<400> SEQUENCE: 18

```
Gln Val Gln Leu Val Glu Ser Gly Gly Gly Leu Val Gln Pro Gly Gly
1               5                   10                  15

Ser Leu Arg Leu Ser Cys Ala Ala Ser Gly Tyr Ala Asn Ser Asn Thr
            20                  25                  30

Cys Met Gly Trp Phe Arg Gln Ala Pro Gly Lys Glu Arg Glu Arg Val
        35                  40                  45

Ala Ala Ile Ser Gly Val Gly Thr Gly Thr Tyr Tyr Ala Asp Ser Val
    50                  55                  60
```

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Leu Val Thr Val Ser Ser
        115                 120                 125

<210> SEQ ID NO 19
<211> LENGTH: 126
<212> TYPE: PRT
<213> ORGANISM: Artificial Sequence
<220> FEATURE:
<223> OTHER INFORMATION: hu138 V3

<400> SEQUENCE: 19

Gln Val Gln Leu Val Glu Ser Gly Gly Gly Ser Val Gln Ala Gly Gly
1               5                   10                  15

Ser Leu Arg Leu Ser Cys Ala Ala Ser Gly Tyr Ala Asn Ser Asn Thr
            20                  25                  30

Cys Met Gly Trp Phe Arg Gln Ala Pro Gly Lys Gly Leu Glu Arg Val
        35                  40                  45

Ala Ala Ile Ser Gly Val Gly Thr Gly Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Leu Val Thr Val Ser Ser
        115                 120                 125

<210> SEQ ID NO 20
<211> LENGTH: 126
<212> TYPE: PRT
<213> ORGANISM: Artificial Sequence
<220> FEATURE:
<223> OTHER INFORMATION: hu138 V4

<400> SEQUENCE: 20

Gln Val Gln Leu Val Glu Ser Gly Gly Gly Leu Val Gln Pro Gly Gly
1               5                   10                  15

Ser Leu Arg Leu Ser Cys Ala Ala Ser Gly Tyr Ala Asn Ser Asn Thr
            20                  25                  30

Cys Met Gly Trp Phe Arg Gln Ala Pro Gly Lys Gly Leu Glu Arg Val
        35                  40                  45

Ala Ala Ile Ser Gly Val Gly Thr Gly Thr Tyr Tyr Ala Asp Ser Val
    50                  55                  60

Lys Gly Arg Phe Thr Ile Ser Arg Asp Asn Ser Lys Asn Thr Leu Tyr
65                  70                  75                  80

Leu Gln Met Asn Ser Leu Arg Ala Glu Asp Thr Ala Val Tyr Tyr Cys
                85                  90                  95

Ala Ala Ala Pro Glu Gly Arg Ala Trp Cys Ser Arg Asp Pro Ser Gly
            100                 105                 110

Tyr Asn Tyr Trp Gly Gln Gly Thr Leu Val Thr Val Ser Ser

<210> SEQ ID NO 21
<211> LENGTH: 25
<212> TYPE: PRT
<213> ORGANISM: Artificial Sequence
<220> FEATURE:
<223> OTHER INFORMATION: hu138 V1/V3 HFR1

<400> SEQUENCE: 21

Gln Val Gln Leu Val Glu Ser Gly Gly Gly Ser Val Gln Ala Gly Gly
1               5                   10                  15

Ser Leu Arg Leu Ser Cys Ala Ala Ser
            20                  25

<210> SEQ ID NO 22
<211> LENGTH: 17
<212> TYPE: PRT
<213> ORGANISM: Artificial Sequence
<220> FEATURE:
<223> OTHER INFORMATION: hu138 V1/V2 HFR2

<400> SEQUENCE: 22

Met Gly Trp Phe Arg Gln Ala Pro Gly Lys Glu Arg Glu Arg Val Ala
1               5                   10                  15

Ala

<210> SEQ ID NO 23
<211> LENGTH: 38
<212> TYPE: PRT
<213> ORGANISM: Artificial Sequence
<220> FEATURE:
<223> OTHER INFORMATION: hu138 V1-V4 HFR3

<400> SEQUENCE: 23

Tyr Tyr Ala Asp Ser Val Lys Gly Arg Phe Thr Ile Ser Arg Asp Asn
1               5                   10                  15

Ser Lys Asn Thr Leu Tyr Leu Gln Met Asn Ser Leu Arg Ala Glu Asp
            20                  25                  30

Thr Ala Val Tyr Tyr Cys
        35

<210> SEQ ID NO 24
<211> LENGTH: 11
<212> TYPE: PRT
<213> ORGANISM: Artificial Sequence
<220> FEATURE:
<223> OTHER INFORMATION: hu138 V1-V4 HFR4

<400> SEQUENCE: 24

Trp Gly Gln Gly Thr Leu Val Thr Val Ser Ser
1               5                   10

<210> SEQ ID NO 25
<211> LENGTH: 25
<212> TYPE: PRT
<213> ORGANISM: Artificial Sequence
<220> FEATURE:
<223> OTHER INFORMATION: hu138 V2/v4 HFR1

<400> SEQUENCE: 25

Gln Val Gln Leu Val Glu Ser Gly Gly Gly Leu Val Gln Pro Gly Gly
1               5                   10                  15

Ser Leu Arg Leu Ser Cys Ala Ala Ser

```
                    20                  25

<210> SEQ ID NO 26
<211> LENGTH: 17
<212> TYPE: PRT
<213> ORGANISM: Artificial Sequence
<220> FEATURE:
<223> OTHER INFORMATION: hu138 V3/V4 HFR2

<400> SEQUENCE: 26

Met Gly Trp Phe Arg Gln Ala Pro Gly Lys Gly Leu Glu Arg Val Ala
1               5                   10                  15

Ala

<210> SEQ ID NO 27
<211> LENGTH: 25
<212> TYPE: PRT
<213> ORGANISM: Artificial Sequence
<220> FEATURE:
<223> OTHER INFORMATION: HFR1 general formula
<220> FEATURE:
<221> NAME/KEY: X
<222> LOCATION: (11)..(11)
<223> OTHER INFORMATION: X is S or L
<220> FEATURE:
<221> NAME/KEY: X
<222> LOCATION: (14)..(14)
<223> OTHER INFORMATION: X is A or P

<400> SEQUENCE: 27

Gln Val Gln Leu Val Glu Ser Gly Gly Gly Xaa Val Gln Xaa Gly Gly
1               5                   10                  15

Ser Leu Arg Leu Ser Cys Ala Ala Ser
            20                  25

<210> SEQ ID NO 28
<211> LENGTH: 17
<212> TYPE: PRT
<213> ORGANISM: Artificial Sequence
<220> FEATURE:
<223> OTHER INFORMATION: HFR2 general formula
<220> FEATURE:
<221> NAME/KEY: X
<222> LOCATION: (11)..(11)
<223> OTHER INFORMATION: X is E or G
<220> FEATURE:
<221> NAME/KEY: X
<222> LOCATION: (12)..(12)
<223> OTHER INFORMATION: X is R or L

<400> SEQUENCE: 28

Met Gly Trp Phe Arg Gln Ala Pro Gly Lys Xaa Xaa Glu Arg Val Ala
1               5                   10                  15

Ala

<210> SEQ ID NO 29
<211> LENGTH: 232
<212> TYPE: PRT
<213> ORGANISM: Artificial Sequence
<220> FEATURE:
<223> OTHER INFORMATION: FcAG

<400> SEQUENCE: 29

Glu Pro Lys Ser Ser Asp Lys Thr His Thr Cys Pro Pro Cys Pro Ala
1               5                   10                  15

Pro Glu Leu Leu Gly Gly Pro Ser Val Phe Leu Phe Pro Pro Lys Pro
            20                  25                  30
```

```
Lys Asp Thr Leu Met Ile Ser Arg Thr Pro Glu Val Thr Cys Val Val
            35                  40                  45

Val Ala Val Ser His Glu Asp Pro Glu Val Lys Phe Asn Trp Tyr Val
 50                  55                  60

Asp Gly Val Glu Val His Asn Ala Lys Thr Lys Pro Arg Glu Glu Gln
 65                  70                  75                  80

Tyr Asn Ser Thr Tyr Arg Val Val Ser Val Leu Thr Val Leu His Gln
                85                  90                  95

Asp Trp Leu Asn Gly Lys Glu Tyr Lys Cys Lys Val Ser Asn Lys Ala
            100                 105                 110

Leu Pro Ala Gly Ile Glu Lys Thr Ile Ser Lys Ala Lys Gly Gln Pro
            115                 120                 125

Arg Glu Pro Gln Val Tyr Thr Leu Pro Pro Ser Arg Asp Glu Leu Thr
            130                 135                 140

Lys Asn Gln Val Ser Leu Thr Cys Leu Val Lys Gly Phe Tyr Pro Ser
145                 150                 155                 160

Asp Ile Ala Val Glu Trp Glu Ser Asn Gly Gln Pro Glu Asn Asn Tyr
                165                 170                 175

Lys Thr Thr Pro Pro Val Leu Asp Ser Asp Gly Ser Phe Phe Leu Tyr
            180                 185                 190

Ser Lys Leu Thr Val Asp Lys Ser Arg Trp Gln Gln Gly Asn Val Phe
            195                 200                 205

Ser Cys Ser Val Met His Glu Ala Leu His Asn His Tyr Thr Gln Lys
            210                 215                 220

Ser Leu Ser Leu Ser Pro Gly Lys
225                 230

<210> SEQ ID NO 30
<211> LENGTH: 440
<212> TYPE: PRT
<213> ORGANISM: Artificial Sequence
<220> FEATURE:
<223> OTHER INFORMATION: CD80-muFc

<400> SEQUENCE: 30

Val Ile His Val Thr Lys Glu Val Lys Glu Val Ala Thr Leu Ser Cys
 1               5                  10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
            35                  40                  45

Ile Trp Pro Glu Tyr Lys Asn Arg Thr Ile Phe Asp Ile Thr Asn Asn
 50                  55                  60

Leu Ser Ile Val Ile Leu Ala Leu Arg Pro Ser Asp Glu Gly Thr Tyr
 65                  70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
            100                 105                 110

Ile Ser Asp Phe Glu Ile Pro Thr Ser Asn Ile Arg Arg Ile Ile Cys
            115                 120                 125

Ser Thr Ser Gly Gly Phe Pro Glu Pro His Leu Ser Trp Leu Glu Asn
            130                 135                 140

Gly Glu Glu Leu Asn Ala Ile Asn Thr Thr Val Ser Gln Asp Pro Glu
145                 150                 155                 160
```

-continued

```
Thr Glu Leu Tyr Ala Val Ser Ser Lys Leu Asp Phe Asn Met Thr Thr
                165                 170                 175
Asn His Ser Phe Met Cys Leu Ile Lys Tyr Gly His Leu Arg Val Asn
            180                 185                 190
Gln Thr Phe Asn Trp Asn Thr Thr Lys Gln Glu His Phe Pro Asp Asn
        195                 200                 205
Gly Ser Met Asp Pro Lys Ser Ser Asp Lys Thr His Thr Cys Pro Pro
    210                 215                 220
Cys Pro Ala Pro Glu Val Ser Val Phe Ile Phe Pro Pro Lys Pro
225                 230                 235                 240
Lys Asp Val Leu Thr Ile Thr Leu Thr Pro Lys Val Thr Cys Val Val
                245                 250                 255
Val Asp Ile Ser Lys Asp Asp Pro Glu Val Gln Phe Ser Trp Phe Val
            260                 265                 270
Asp Asp Val Glu Val His Thr Ala Gln Thr Gln Pro Arg Glu Glu Gln
        275                 280                 285
Phe Asn Ser Thr Phe Arg Ser Val Ser Glu Leu Pro Ile Met His Gln
    290                 295                 300
Asp Trp Leu Asn Gly Lys Glu Phe Lys Cys Arg Val Asn Ser Ala Ala
305                 310                 315                 320
Phe Pro Ala Pro Ile Glu Lys Thr Ile Ser Lys Thr Lys Gly Arg Pro
                325                 330                 335
Lys Ala Pro Gln Val Tyr Thr Ile Pro Pro Pro Lys Glu Gln Met Ala
            340                 345                 350
Lys Asp Lys Val Ser Leu Thr Cys Met Ile Thr Asp Phe Phe Pro Glu
        355                 360                 365
Asp Ile Thr Val Glu Trp Gln Trp Asn Gly Gln Pro Ala Glu Asn Tyr
    370                 375                 380
Lys Asn Thr Gln Pro Ile Met Asn Thr Asn Gly Ser Tyr Phe Val Tyr
385                 390                 395                 400
Ser Lys Leu Asn Val Gln Lys Ser Asn Trp Glu Ala Gly Asn Thr Phe
                405                 410                 415
Thr Cys Ser Val Leu His Glu Gly Leu His Asn His Thr Glu Lys
            420                 425                 430
Ser Leu Ser His Ser Pro Gly Lys
        435                 440

<210> SEQ ID NO 31
<211> LENGTH: 456
<212> TYPE: PRT
<213> ORGANISM: Artificial Sequence
<220> FEATURE:
<223> OTHER INFORMATION: CD86-muFc

<400> SEQUENCE: 31

Ala Pro Leu Lys Ile Gln Ala Tyr Phe Asn Glu Thr Ala Asp Leu Pro
1               5                   10                  15
Cys Gln Phe Ala Asn Ser Gln Asn Gln Ser Leu Ser Glu Leu Val Val
                20                  25                  30
Phe Trp Gln Asp Gln Glu Asn Leu Val Leu Asn Glu Val Tyr Leu Gly
            35                  40                  45
Lys Glu Lys Phe Asp Ser Val His Ser Lys Tyr Met Gly Arg Thr Ser
        50                  55                  60
Phe Asp Ser Asp Ser Trp Thr Leu Arg Leu His Asn Leu Gln Ile Lys
65                  70                  75                  80
```

```
Asp Lys Gly Leu Tyr Gln Cys Ile Ile His His Lys Lys Pro Thr Gly
                85                  90                  95
Met Ile Arg Ile His Gln Met Asn Ser Glu Leu Ser Val Leu Ala Asn
            100                 105                 110
Phe Ser Gln Pro Glu Ile Val Pro Ile Ser Asn Ile Thr Glu Asn Val
        115                 120                 125
Tyr Ile Asn Leu Thr Cys Ser Ser Ile His Gly Tyr Pro Glu Pro Lys
    130                 135                 140
Lys Met Ser Val Leu Leu Arg Thr Lys Asn Ser Thr Ile Glu Tyr Asp
145                 150                 155                 160
Gly Val Met Gln Lys Ser Gln Asp Asn Val Thr Glu Leu Tyr Asp Val
                165                 170                 175
Ser Ile Ser Leu Ser Val Ser Phe Pro Asp Val Thr Ser Asn Met Thr
            180                 185                 190
Ile Phe Cys Ile Leu Glu Thr Asp Lys Thr Arg Leu Leu Ser Ser Pro
        195                 200                 205
Phe Ser Ile Glu Leu Glu Asp Pro Gln Pro Pro Asp His Ile Pro
    210                 215                 220
Gly Ser Met Asp Pro Lys Ser Ser Asp Lys Thr His Thr Cys Pro Pro
225                 230                 235                 240
Cys Pro Ala Pro Glu Val Ser Ser Val Phe Ile Phe Pro Pro Lys Pro
                245                 250                 255
Lys Asp Val Leu Thr Ile Thr Leu Thr Pro Lys Val Thr Cys Val Val
            260                 265                 270
Val Asp Ile Ser Lys Asp Asp Pro Glu Val Gln Phe Ser Trp Phe Val
        275                 280                 285
Asp Asp Val Glu Val His Thr Ala Gln Thr Gln Pro Arg Glu Glu Gln
    290                 295                 300
Phe Asn Ser Thr Phe Arg Ser Val Ser Glu Leu Pro Ile Met His Gln
305                 310                 315                 320
Asp Trp Leu Asn Gly Lys Glu Phe Lys Cys Arg Val Asn Ser Ala Ala
                325                 330                 335
Phe Pro Ala Pro Ile Glu Lys Thr Ile Ser Lys Thr Lys Gly Arg Pro
            340                 345                 350
Lys Ala Pro Gln Val Tyr Thr Ile Pro Pro Lys Glu Gln Met Ala
        355                 360                 365
Lys Asp Lys Val Ser Leu Thr Cys Met Ile Thr Asp Phe Phe Pro Glu
    370                 375                 380
Asp Ile Thr Val Glu Trp Gln Trp Asn Gly Gln Pro Ala Glu Asn Tyr
385                 390                 395                 400
Lys Asn Thr Gln Pro Ile Met Asn Thr Asn Gly Ser Tyr Phe Val Tyr
                405                 410                 415
Ser Lys Leu Asn Val Gln Lys Ser Asn Trp Glu Ala Gly Asn Thr Phe
            420                 425                 430
Thr Cys Ser Val Leu His Glu Gly Leu His Asn His His Thr Glu Lys
        435                 440                 445
Ser Leu Ser His Ser Pro Gly Lys
    450                 455

<210> SEQ ID NO 32
<211> LENGTH: 440
<212> TYPE: PRT
<213> ORGANISM: Artificial Sequence
<220> FEATURE:
```

-continued

<223> OTHER INFORMATION: CD80-Fc

<400> SEQUENCE: 32

```
Val Ile His Val Thr Lys Glu Val Lys Val Ala Thr Leu Ser Cys
 1               5                  10                  15

Gly His Asn Val Ser Val Glu Glu Leu Ala Gln Thr Arg Ile Tyr Trp
                20                  25                  30

Gln Lys Glu Lys Lys Met Val Leu Thr Met Met Ser Gly Asp Met Asn
                35                  40                  45

Ile Trp Pro Glu Tyr Lys Asn Arg Thr Ile Phe Asp Ile Thr Asn Asn
            50                  55                  60

Leu Ser Ile Val Ile Leu Ala Leu Arg Pro Ser Asp Glu Gly Thr Tyr
 65                 70                  75                  80

Glu Cys Val Val Leu Lys Tyr Glu Lys Asp Ala Phe Lys Arg Glu His
                85                  90                  95

Leu Ala Glu Val Thr Leu Ser Val Lys Ala Asp Phe Pro Thr Pro Ser
               100                 105                 110

Ile Ser Asp Phe Glu Ile Pro Thr Ser Asn Ile Arg Arg Ile Ile Cys
               115                 120                 125

Ser Thr Ser Gly Gly Phe Pro Glu Pro His Leu Ser Trp Leu Glu Asn
130                 135                 140

Gly Glu Glu Leu Asn Ala Ile Asn Thr Thr Val Ser Gln Asp Pro Glu
145                 150                 155                 160

Thr Glu Leu Tyr Ala Val Ser Ser Lys Leu Asp Phe Asn Met Thr Thr
                165                 170                 175

Asn His Ser Phe Met Cys Leu Ile Lys Tyr Gly His Leu Arg Val Asn
                180                 185                 190

Gln Thr Phe Asn Trp Asn Thr Thr Lys Gln Glu His Phe Pro Asp Asn
                195                 200                 205

Ile Glu Gly Arg Met Asp Lys Thr His Thr Cys Pro Pro Cys Pro Ala
            210                 215                 220

Pro Glu Leu Leu Gly Gly Pro Ser Val Phe Leu Phe Pro Pro Lys Pro
225                 230                 235                 240

Lys Asp Thr Leu Met Ile Ser Arg Thr Pro Glu Val Thr Cys Val Val
                245                 250                 255

Val Asp Val Ser His Glu Asp Pro Glu Val Lys Phe Asn Trp Tyr Val
                260                 265                 270

Asp Gly Val Glu Val His Asn Ala Lys Thr Lys Pro Arg Glu Glu Gln
            275                 280                 285

Tyr Asn Ser Thr Tyr Arg Val Val Ser Val Leu Thr Val Leu His Gln
290                 295                 300

Asp Trp Leu Asn Gly Lys Glu Tyr Lys Cys Lys Val Ser Asn Lys Ala
305                 310                 315                 320

Leu Pro Ala Pro Ile Glu Lys Thr Ile Ser Lys Ala Lys Gly Gln Pro
                325                 330                 335

Arg Glu Pro Gln Val Tyr Thr Leu Pro Pro Ser Arg Asp Glu Leu Thr
                340                 345                 350

Lys Asn Gln Val Ser Leu Thr Cys Leu Val Lys Gly Phe Tyr Pro Ser
            355                 360                 365

Asp Ile Ala Val Glu Trp Glu Ser Asn Gly Gln Pro Glu Asn Asn Tyr
        370                 375                 380

Lys Thr Thr Pro Pro Val Leu Asp Ser Asp Gly Ser Phe Phe Leu Tyr
385                 390                 395                 400
```

Ser Lys Leu Thr Val Asp Lys Ser Arg Trp Gln Gln Gly Asn Val Phe
        405                 410                 415

Ser Cys Ser Val Met His Glu Ala Leu His Asn His Tyr Thr Gln Lys
            420                 425                 430

Ser Leu Ser Leu Ser Pro Gly Lys
        435                 440

<210> SEQ ID NO 33
<211> LENGTH: 38
<212> TYPE: PRT
<213> ORGANISM: Artificial Sequence
<220> FEATURE:
<223> OTHER INFORMATION: HFR3 general formula
<220> FEATURE:
<221> NAME/KEY: X
<222> LOCATION: (17)..(17)
<223> OTHER INFORMATION: X is G or S
<220> FEATURE:
<221> NAME/KEY: X
<222> LOCATION: (22)..(22)
<223> OTHER INFORMATION: X is F or Y
<220> FEATURE:
<221> NAME/KEY: X
<222> LOCATION: (29)..(29)
<223> OTHER INFORMATION: X is K or R
<220> FEATURE:
<221> NAME/KEY: X
<222> LOCATION: (30)..(30)
<223> OTHER INFORMATION: X is P or A
<220> FEATURE:
<221> NAME/KEY: X
<222> LOCATION: (35)..(35)
<223> OTHER INFORMATION: X is M or V

<400> SEQUENCE: 33

Tyr Tyr Ala Asp Ser Val Lys Gly Arg Phe Thr Ile Ser Arg Asp Asn
1               5                   10                  15

Xaa Lys Asn Thr Leu Xaa Leu Gln Met Asn Ser Leu Xaa Xaa Glu Asp
            20                  25                  30

Thr Ala Xaa Tyr Tyr Cys
        35

<210> SEQ ID NO 34
<211> LENGTH: 11
<212> TYPE: PRT
<213> ORGANISM: Artificial Sequence
<220> FEATURE:
<223> OTHER INFORMATION: HFR4 general formula
<220> FEATURE:
<221> NAME/KEY: X
<222> LOCATION: (6)..(6)
<223> OTHER INFORMATION: X is Q or L
<220> FEATURE:
<221> NAME/KEY: X
<222> LOCATION: (11)..(11)
<223> OTHER INFORMATION: X is S or missing

<400> SEQUENCE: 34

Trp Gly Gln Gly Thr Xaa Val Thr Val Ser Xaa
1               5                   10

<210> SEQ ID NO 35
<211> LENGTH: 38
<212> TYPE: PRT
<213> ORGANISM: Artificial Sequence
<220> FEATURE:
<223> OTHER INFORMATION: 138 antibody HFR3

<400> SEQUENCE: 35

```
Tyr Tyr Ala Asp Ser Val Lys Gly Arg Phe Thr Ile Ser Arg Asp Asn
1               5                   10                  15

Gly Lys Asn Thr Leu Phe Leu Gln Met Asn Ser Leu Lys Pro Glu Asp
            20                  25                  30

Thr Ala Met Tyr Tyr Cys
        35

<210> SEQ ID NO 36
<211> LENGTH: 10
<212> TYPE: PRT
<213> ORGANISM: Artificial Sequence
<220> FEATURE:
<223> OTHER INFORMATION: 138 antibody HFR4

<400> SEQUENCE: 36

Trp Gly Gln Gly Thr Gln Val Thr Val Ser
1               5                   10
```

METHOD FOR TREATING TUMOR USING ANTI-CTLA4 SINGLE-DOMAIN ANTIBODIES

TECHNICAL FIELD

The present application relates to the field of biomedicine, specifically to a method for treating a tumor by using a CTLA4-binding protein and a use thereof.

CROSS-REFERENCE TO RELATED APPLICATIONS

This application is a national stage application under 35 U.S.C. § 371 of Patent Cooperation Treaty Application PCT/CN2020/100232, filed Jul. 3, 2020, which claims the benefit of Patent Cooperation Treaty Application PCT/CN2019/094751, filed Jul. 4, 2019. Priority is claimed to those applications and their disclosures are incorporated by reference herein in their entirety.

BACKGROUND OF THE INVENTION

In tumor immune responses, the CTLA4-mediated inhibition mechanism often becomes one of the reasons for tumor cells to escape from the immune system, so CTLA4 is a key target for tumor immunotherapy. The currently approved CTLA antibody (e.g., ipilimumab) exerts anti-tumor effects by blocking the interaction between CTLA4 and its ligand. After the currently approved CTLA antibody binds to the CTLA4 protein, the level of CTLA4 protein on the surface of cell membrane may be reduced by endocytic degradation, but this will lead to a decrease in the ADCC activity.

CTLA4 antibodies that exert anti-tumor effects through other mechanisms are still needed to overcome possible problems such as poor efficacy, immunotoxicity, or drug resistance.

SUMMARY OF THE INVENTION

The present application provides a use of a CTLA4-binding protein in the preparation of a medicament for treating a tumor. The CTLA4-binding protein described in the present application has one or more of the following properties: 1) capable of specifically binding to CTLA4, but substantially not competing with a ligand of CTLA4 for binding to the CTLA4; 2) substantially not competing with ipilimumab for binding to CTLA4; 3) capable of recognizing or binding to one or more amino acids in ABEDC" chain, A'B loop, C"D loop, DE loop and/or EF loop of human CTLA4; 4) not competing with a molecule that recognizes or binds to amino acid residues K95, E97, M99, Y104, L106 and/or I108 in human CTLA4 for binding to the CTLA4; 5) capable of inhibiting the growth/proliferation of tumors or tumor cells; 6) not causing the endocytic degradation of CTLA4, so that the endocytic degradation rate of CTLA4 on the surface of 293 cell membrane expressing the CTLA4 is lower than about 50%.

In one aspect, the present application provides a use of a CTLA4-binding protein in the preparation of a medicament for treating a tumor, in which the CTLA4-binding protein specifically binds to CTLA4 and does not compete with a ligand of CTLA4 for binding to the CTLA4.

In some embodiments, the CTLA4-binding protein does not block the binding of CTLA4 to its ligand.

In some embodiments, the ligand of CTLA4 is selected from CD80 or a functional fragment thereof and CD86 or a functional fragment thereof.

In some embodiments, the CTLA4-binding protein does not compete with a reference antibody for binding to the CTLA4, in which the reference antibody is ipilimumab.

In some embodiments, the CTLA4-binding protein binds to human CTLA4 and monkey CTLA4.

In some embodiments, in which the CTLA4-binding protein binds to or recognizes one or more amino acids in ABEDC" chain, A'B loop, C"D loop, DE loop and/or EF loop of human CTLA4.

In some embodiments, the CTLA4-binding protein binds to or recognizes one or more amino acids in C' chain, C"D loop and/or DE loop of human CTLA4.

In some embodiments, the CTLA4-binding protein recognizes or binds to amino acid residues in human CTLA4 selected from a group consisting of: E48, V49, D65, L84, D88 and Y92. In some embodiments, the CTLA4-binding protein also recognizes or binds to amino acid residues in human CTLA4 selected from a group consisting of: V46, T47, D64, I67 and G83.

In some embodiments, the CTLA4-binding protein recognizes or binds to a conformational epitope in human CTLA4 comprising one or more of the following amino acid residues: V46, T47, E48, V49, D64, D65, I67, G83, L84, D88 and Y92. In some embodiments, the CTLA4-binding protein recognizes or binds to a conformational epitope in human CTLA4 comprising the following amino acid residues: E48, V49, D65, L84, D88 and Y92.

In some embodiments, the CTLA4-binding protein does not compete with a molecule that recognizes or binds to one or more of the following amino acid residues in human CTLA4 for binding to the CTLA4: M3, K95, E97, M99, Y104, L106 and I108.

In some embodiments, the CTLA4-binding protein does not compete with a molecule that recognizes or binds to one or more of the following amino acid residues in human CTLA4 for binding to the CTLA4: K95, E97, M99, Y104, L106 and I108.

In some embodiments, the CTLA4-binding protein does not compete with a molecule that recognizes or binds to one or more amino acids in F chain, FG loop and/or G chain of CTLA4 for binding to the CTLA4.

In some embodiments, the CTLA4-binding protein comprises at least one CDR in the VH whose amino acid sequence is as set forth in SEQ ID NO: 7. In some embodiments, the CTLA4-binding protein comprises HCDR3 in the VH whose amino acid sequence is as set forth in SEQ ID NO: 7. In some embodiments, the CTLA4-binding protein comprises HCDR2 in the VH whose amino acid sequence is as set forth in SEQ ID NO: 7. In some embodiments, the CTLA4-binding protein comprises HCDR1 in the VH whose amino acid sequence is as set forth in SEQ ID NO: 7.

In some embodiments, the CTLA4-binding protein is an antibody or an antigen binding fragment thereof, and comprises an antibody heavy chain CDR3, the heavy chain CDR3 comprises an amino acid sequence as set forth in SEQ ID NO: 1. In some embodiments, the CTLA4-binding protein is an antibody or an antigen binding fragment thereof, and comprises an antibody heavy chain CDR3, the heavy chain CDR3 comprises an amino acid sequence as set forth in SEQ ID NO: 2.

In some embodiments, the CTLA4-binding protein is an antibody or an antigen binding fragment thereof, and comprises an antibody heavy chain CDR2, the heavy chain CDR2 comprises an amino acid sequence as set forth in SEQ ID NO: 3. In some embodiments, the CTLA4-binding protein is an antibody or an antigen binding fragment thereof, and comprises an antibody heavy chain CDR2, the heavy chain CDR2 comprises an amino acid sequence as set forth in SEQ ID NO: 4.

In some embodiments, the CTLA4-binding protein is an antibody or an antigen binding fragment thereof, and comprises an antibody heavy chain CDR1, the heavy chain CDR1 comprises an amino acid sequence as set forth in SEQ ID NO: 5. In some embodiments, the CTLA4-binding protein is an antibody or an antigen binding fragment thereof, and comprises an antibody heavy chain CDR1, the heavy chain CDR1 comprises an amino acid sequence as set forth in SEQ ID NO: 6.

In some embodiments, the CTLA4-binding protein is an antibody or an antigen binding fragment thereof, and comprises an antibody heavy chain FR1, the heavy chain FR1 comprises an amino acid sequence as set forth in SEQ ID NO: 27. In some embodiments, the CTLA4-binding protein is an antibody or an antigen binding fragment thereof, and comprises an antibody heavy chain FR1, the heavy chain FR1 comprises an amino acid sequence as set forth in any one of SEQ ID NO: 21 and SEQ ID NO: 25.

In some embodiments, the CTLA4-binding protein is an antibody or an antigen binding fragment thereof, and comprises an antibody heavy chain FR2, the heavy chain FR2 comprises an amino acid sequence as set forth in SEQ ID NO: 28. In some embodiments, the CTLA4-binding protein is an antibody or an antigen binding fragment thereof, and comprises an antibody heavy chain FR2, the heavy chain FR2 comprises an amino acid sequence as set forth in any one of SEQ ID NO: 22 and SEQ ID NO: 26.

In some embodiments, the CTLA4-binding protein is an antibody or an antigen binding fragment thereof, and comprises an antibody heavy chain FR3, the heavy chain FR3 comprises an amino acid sequence as set forth in SEQ ID NO: 33. In some embodiments, the CTLA4-binding protein is an antibody or an antigen binding fragment thereof, and comprises an antibody heavy chain FR3, the heavy chain FR3 comprises an amino acid sequence as set forth in any one of SEQ ID NO: 23 and SEQ ID NO: 35.

In some embodiments, the CTLA4-binding protein is an antibody or an antigen binding fragment thereof, and comprises an antibody heavy chain FR4, the heavy chain FR4 comprises an amino acid sequence as set forth in SEQ ID NO: 34. In some embodiments, the CTLA4-binding protein is an antibody or an antigen binding fragment thereof, and comprises an antibody heavy chain FR4, the heavy chain FR4 comprises an amino acid sequence as set forth in any one of SEQ ID NO: 24 and SEQ ID NO: 36.

In some embodiments, the CTLA4-binding protein is an antibody or an antigen binding fragment thereof, and comprises a heavy chain variable region, the heavy chain variable region comprises an amino acid sequence as set forth in SEQ ID NO: 7. In some embodiments, the CTLA4-binding protein is an antibody or an antigen binding fragment thereof, and comprises a heavy chain variable region, the heavy chain variable region comprises an amino acid sequence as set forth in any one of SEQ ID NO: 8 and SEQ ID NOs: 17-20.

In some embodiments, the CTLA4-binding protein comprises a single-domain antibody or an antigen binding fragment thereof.

In some embodiments, the CTLA4-binding protein comprises a single-domain antibody or an antigen binding fragment thereof, and the single-domain antibody or the antigen binding fragment thereof comprises an amino acid sequence as set forth in SEQ ID NO: 7. In some embodiments, the CTLA4-binding protein comprises a single-domain antibody or an antigen binding fragment thereof, and the single-domain antibody or the antigen binding fragment thereof comprises an amino acid sequence as set forth in any one of SEQ ID NO: 8 and SEQ ID NOs: 17-20.

In some embodiments, the CTLA4-binding protein has properties selected from the following group: a) binding to human CTLA4 with a $K_D$ value of $2.6 \times 10^8$ M or lower; b) inhibiting the growth of tumor cells; and c) causing an endocytic degradation rate of lower than about 50% to the CTLA4 protein expressed on the cell membrane.

In some embodiments, the CTLA4-binding protein also comprises an antibody Fc domain. In some embodiments, the antibody Fc domain comprises an Fc domain derived from an IgG antibody. In some embodiments, the CTLA4-binding protein comprises the antibody Fc domain and the antibody heavy chain variable region, and the antibody heavy chain variable region is directly or indirectly fused with the antibody Fc domain.

In another aspect, the present application provides a pharmaceutical composition, comprising the CTLA4-binding protein described in the present application, and optionally a pharmaceutically acceptable carrier.

In some embodiments, the CTLA4-binding protein does not block the binding of CTLA4 to its ligand.

In some embodiments, the ligand of CTLA4 is selected from CD80 or a functional fragment thereof and CD86 or a functional fragment thereof.

In some embodiments, the CTLA4-binding protein does not compete with a reference antibody for binding to the CTLA4, in which the reference antibody is ipilimumab.

In some embodiments, the CTLA4-binding protein binds to human CTLA4 and monkey CTLA4.

In some embodiments, the CTLA4-binding protein binds to or recognizes one or more amino acids in C' chain, C"D loop and/or DE loop of human CTLA4.

In some embodiments, the CTLA4-binding protein recognizes or binds to amino acid residues in human CTLA4 selected from a group consisting of: E48, V49, D65, L84, D88 and Y92. In some embodiments, the CTLA4-binding protein also recognizes or binds to amino acid residues in human CTLA4 selected from a group consisting of: V46, T47, D64, I67 and G83.

In some embodiments, the CTLA4-binding protein recognizes or binds to a conformational epitope in human CTLA4 comprising one or more of the following amino acid residues: V46, T47, E48, V49, D64, D65, I67, G83, L84, D88 and Y92. In some embodiments, the CTLA4-binding protein recognizes or binds to a conformational epitope in human CTLA4 comprising the following amino acid residues: E48, V49, D65, L84, D88 and Y92.

In some embodiments, the CTLA4-binding protein does not compete with a molecule that recognizes or binds to one or more of the following amino acid residues in human CTLA4 for binding to the CTLA4: M3, K95, E97, M99, Y104, L106 and I108.

In some embodiments, the CTLA4-binding protein does not compete with a molecule that recognizes or binds to one or more of the following amino acid residues in human CTLA4 for binding to the CTLA4: K95, E97, M99, Y104, L106 and I108.

In some embodiments, the CTLA4-binding protein does not compete with a molecule that recognizes or binds to one or more amino acids in the F chain, FG loop and/or G chain of CTLA4 for binding to the CTLA4.

In some embodiments, the CTLA4-binding protein is an antibody or an antigen binding fragment thereof, and comprises an antibody heavy chain CDR3, the heavy chain CDR3 comprises an amino acid sequence as set forth in SEQ ID NO: 1. In some embodiments, the CTLA4-binding protein is an antibody or an antigen binding fragment thereof, and comprises an antibody heavy chain CDR3, the heavy chain CDR3 comprises an amino acid sequence as set forth in SEQ ID NO: 2.

In some embodiments, the CTLA4-binding protein is an antibody or an antigen binding fragment thereof, and comprises an antibody heavy chain CDR2, the heavy chain CDR2 comprises an amino acid sequence as set forth in SEQ ID NO: 3. In some embodiments, the CTLA4-binding protein is an antibody or an antigen binding fragment thereof, and comprises an antibody heavy chain CDR2, the heavy chain CDR2 comprises an amino acid sequence as set forth in SEQ ID NO: 4.

In some embodiments, the CTLA4-binding protein is an antibody or an antigen binding fragment thereof, and comprises an antibody heavy chain CDR1, the heavy chain CDR1 comprises an amino acid sequence as set forth in SEQ ID NO: 5. In some embodiments, the CTLA4-binding protein is an antibody or an antigen binding fragment thereof, and comprises an antibody heavy chain CDR1, the heavy chain CDR1 comprises an amino acid sequence as set forth in SEQ ID NO: 6.

In some embodiments, the CTLA4-binding protein is an antibody or an antigen binding fragment thereof, and comprises an antibody heavy chain FR1, the heavy chain FR1 comprises an amino acid sequence as set forth in SEQ ID NO: 27. In some embodiments, the CTLA4-binding protein is an antibody or an antigen binding fragment thereof, and comprises an antibody heavy chain FR1, the heavy chain FR1 comprises an amino acid sequence as set forth in any one of SEQ ID NO: 21 and SEQ ID NO: 25.

In some embodiments, the CTLA4-binding protein is an antibody or an antigen binding fragment thereof, and comprises an antibody heavy chain FR2, the heavy chain FR2 comprises an amino acid sequence as set forth in SEQ ID NO: 28. In some embodiments, the CTLA4-binding protein is an antibody or an antigen binding fragment thereof, and comprises an antibody heavy chain FR2, the heavy chain FR2 comprises an amino acid sequence as set forth in any one of SEQ ID NO: 22 and SEQ ID NO: 26.

In some embodiments, the CTLA4-binding protein is an antibody or an antigen binding fragment thereof, and comprises an antibody heavy chain FR3, the heavy chain FR3 comprises an amino acid sequence as set forth in SEQ ID NO: 33. In some embodiments, the CTLA4-binding protein is an antibody or an antigen binding fragment thereof, and comprises an antibody heavy chain FR3, the heavy chain FR3 comprises an amino acid sequence as set forth in any one of SEQ ID NO: 23 and SEQ ID NO: 35.

In some embodiments, the CTLA4-binding protein is an antibody or an antigen binding fragment thereof, and comprises an antibody heavy chain FR4, the heavy chain FR4 comprises an amino acid sequence as set forth in SEQ ID NO: 34. In some embodiments, the CTLA4-binding protein is an antibody or an antigen binding fragment thereof, and comprises an antibody heavy chain FR4, the heavy chain FR4 comprises an amino acid sequence as set forth in any one of SEQ ID NO: 24 and SEQ ID NO: 36.

In some embodiments, the CTLA4-binding protein is an antibody or an antigen binding fragment thereof, and comprises a heavy chain variable region, the heavy chain variable region comprises an amino acid sequence as set forth in SEQ ID NO: 7. In some embodiments, the CTLA4-binding protein is an antibody or an antigen binding fragment thereof, and comprises a heavy chain variable region, the heavy chain variable region comprises an amino acid sequence as set forth in any one of SEQ ID NO: 8 and SEQ ID NOs: 17-20.

In some embodiments, the CTLA4-binding protein comprises a single-domain antibody or an antigen binding fragment thereof.

In some embodiments, the CTLA4-binding protein comprises a single-domain antibody or an antigen binding fragment thereof, and the single-domain antibody or the antigen binding fragment thereof comprises an amino acid sequence as set forth in SEQ ID NO: 7. In some embodiments, the CTLA4-binding protein comprises a single-domain antibody or an antigen binding fragment thereof, and the single-domain antibody or the antigen binding fragment thereof comprises an amino acid sequence as set forth in any one of SEQ ID NO: 8 and SEQ ID NOs: 17-20.

In some embodiments, the CTLA4-binding protein has properties selected from the following group: a) binding to human CTLA4 with a $K_D$ value of $2.6 \times 10^8$ M or lower; b) inhibiting the growth of tumor cells; and c) causing the degradation rate of CTLA4 on the surface of 293 cell membrane expressing the CTLA4 be lower than about 50%.

In some embodiments, the CTLA4-binding protein also comprises an antibody Fc domain. In some embodiments, the antibody Fc domain comprises an Fc domain derived from an IgG antibody. In some embodiments, the CTLA4-binding protein comprises the antibody Fc domain and an antibody heavy chain variable region, and the antibody heavy chain variable region is directly or indirectly fused with the antibody Fc domain.

In another aspect, the present application provides a pharmaceutical composition (e.g., a pharmaceutical composition for treating a tumor), comprising the CTLA4-binding protein described in the present application.

In another aspect, the present application provides a use of the pharmaceutical composition in the preparation of a medicament for treating a tumor.

In some embodiments, the tumor is a solid tumor. In some embodiments, the tumor is selected from: colon cancer and melanoma.

In another aspect, the present application provides the CTLA4-binding protein or the pharmaceutical composition described in the present application, used for treating a tumor. In some embodiments, the tumor is a solid tumor.

In another aspect, the present application provides a method for treating a tumor, comprising the following step: administering to a subject in need thereof the CTLA4-binding protein described in the present application or the pharmaceutical composition described in the present application. In some embodiments, the tumor is a solid tumor.

Those skilled in the art can easily perceive other aspects and advantages of the present disclosure from the detailed description below. In the following detailed description, only exemplary embodiments of the present disclosure are shown and described. As those skilled in the art will recognize, the content of the present disclosure enables those skilled in the art to make changes to the disclosed specific embodiments without departing from the spirit and scope of the invention involved in the present application. Correspondingly, the drawings and descriptions in the specification of the present application are merely exemplary, rather than restrictive.

BRIEF DESCRIPTION OF THE DRAWINGS

The specific features of the invention involved in this application are shown in the appended claims. The characteristics and advantages of the invention involved in this application can be better understood by referring to the exemplary embodiments and the accompanying drawings described in detail below. A brief description of the drawings is as follows:

DETAILED DESCRIPTION

Figure 1:
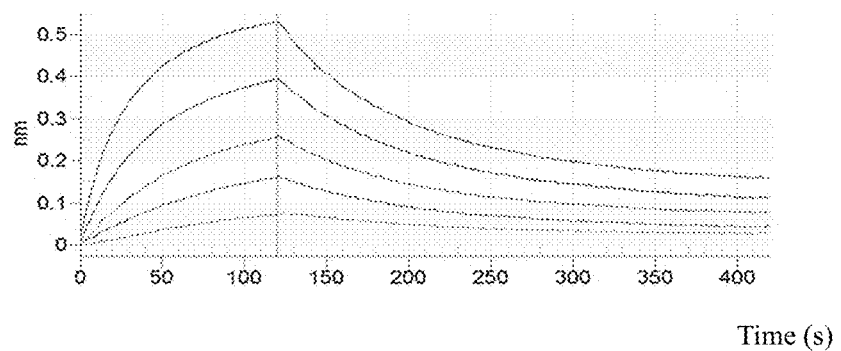
FIG. 1 shows the affinity of the CTLA4-binding protein described in the present application.

The implementation of the present application will be illustrated in the following specific examples, and other advantages and effects of the present application will be easily known by those familiar with this technology from the content disclosed in the specification.

In the present application, the term "treatment" generally refers to preventing, relieving, alleviating and/or reversing one or more symptoms of a disease or disorder, and may also refer to inhibiting or arresting the recurrence of the disease or disorder. In some cases, the treatment may be preventive (e.g., it can prevent or inhibit the onset of the disease, or prevent the appearance of clinical phenomena or subclinical symptoms thereof), or it may also therapeutically inhibit or relieve the symptoms after the appearance of the disease.

In the present application, the term "not block" generally refers to not substantially prevent or destroy the execution or effect of related functions or processes. For example, "not blocking" the interaction between a certain protein (e.g., CTLA4) and another protein (e.g., a ligand of CTLA4, such as CD80 or CD86) generally refers to not substantially preventing or destroying the interaction between them. In some cases, the "not substantially preventing or destroying" may refer to a decrease or reduction in the related functions/processes of not more than about 35%, not more than about 30%, or less, compared with normal conditions. The normal conditions may be without any intervention (e.g., without administration of any CTLA4-binding proteins of the present application).

In the present application, the term "CTLA4" generally refers to cytotoxic T-lymphocyte-associated 4 (also referred as CTLA4 or CD152), which is an immune checkpoint and a protein receptor that regulates downstream immune responses. CTLA4 is a kind of immunosuppressive receptor belonging to the CD28 family. In vivo, CTLA4 is only expressed on T cells (CD $4^+$ and CD $8^+$ cells), and binds to two ligands CD80 and CD86 (also referred to B7-1 and B7-2, respectively). For example, the term "CTLA4" may include a polypeptide or a fragment thereof that has at least about 85% amino acid sequence identity with NCBI Accession No. AAL07473.1 and specifically binds to CD80 and/or CD86. The term "CTLA4" comprises the entire CTLA4 receptor, its extracellular domain and a fusion protein comprising a functional active part of CTLA4 that is covalently linked to the second part, such as a protein domain. Also included in the definition of CTLA4 are variants that differ in amino acid sequences from naturally occurring CTLA4 but retain the ability of specifically binding to the ligand CD80 and/or CD86. The CTLA4 sequence is known in the art, and is provided in Accession No. 1493, for example. The term "CTLA4" as used herein comprises human CTLA4 (hCTLA4), variants, isomers and species homologs of hCTLA4, as well as analogs having at least one common epitope of hCTLA4. For example, the term "CTLA4" also encompasses CTLA4 from other species, such as other mammals (e.g., rat, murine, rabbit, non-human primates, pig or cattle). The complete hCTLA4 sequence may be found in GenBank Accession No. 1493.

In the present application, the term "C' chain" generally refers to a part of the three-dimensional structure of human CTLA4. For example, the C' chain may include amino acid residues at positions 45-54 of human CTLA4 (e.g., its amino acid sequence may be shown in SEQ ID NO: 14).

In the present application, the term "C"D loop" generally refers to a part of the three-dimensional structure of human CTLA4. For example, the C"D loop may include amino acid residues at positions 50-60 and 67-72 of human CTLA4 (e.g., its amino acid sequence may be shown in SEQ ID NO: 14).

In the present application, the term "DE loop" generally refers to a part of the three-dimensional structure of human CTLA4. For example, the DE loop may include amino acid residues at positions 67-81 of human CTLA4 (e.g., its amino acid sequence may be shown in SEQ ID NO: 14).

In the present application, the term "N-terminus" generally refers to the N-end of the amino acid sequence of a protein/polypeptide. For example, the N-terminus may be the initiation site for the synthesis of the protein/polypeptide. For example, the N-terminus may be the N-terminus of the primary structure of the human CTLA4.

In the present application, the term "F chain" generally refers to a part of the three-dimensional structure of human CTLA4. For example, the F chain may include amino acid residues at positions 90-99 of human CTLA4 (e.g., its amino acid sequence can be shown in SEQ ID NO: 14).

In the present application, the term "FG loop" generally refers to a part of the three-dimensional structure of human CTLA4. For example, the FG loop may be referred as CDR3-like fragment. The FG loop may include amino acid residues at positions 105-109 and 112-115 of human CTLA4 (e.g., its amino acid sequence can be shown in SEQ ID NO: 14).

In the present application, the term "G chain" generally refers to a part of the three-dimensional structure of human CTLA4. For example, the G chain may include amino acid residues at positions 105-109 and 112-115 of human CTLA4 (e.g., its amino acid sequence can be shown in SEQ ID NO: 14).

The structure information of the above CTLA4 may be refered to the literature "Structural basis for co-stimulation by the human CTLA4/B7-2 complex" (Nature 2001, Schwartz et al.) as well as "Crystal structure of the B7-1/CTLA4 complex that inhibits human immune responses" (Nature 2001, Stamper et al.). The 3D structures of CTLA4 and its ligand are documented in the Protein Data Bank (PDB) database, of which the accession numbers are 1I85 and 1I8L, respectively.

In the present application, the term "CTLA4-binding protein" generally refers to a protein that may specifically bind to CTLA4. For example, the CTLA4-binding protein may include or is an antibody or an antigen binding fragment thereof.

In the present application, the term "specifically binding" generally refers to the binding of a binding molecule (e.g., the CTLA4-binding protein) to a target molecule (e.g., CLTA4), and this binding is different from a non-specific interaction (e.g., the non-specific interaction may include the binding of the CTLA4-binding protein to a non-CTLA4, for example, the binding to bovine serum albumin or casein). In the present application, specific binding may be determined by the binding of a binding molecule to the target molecule relative to the binding of the binding molecule to the control molecule (other molecules other than the target molecule). In some cases, the binding specificity may mean that the CTLA4-binding protein specifically binds to a specific epitope on CTLA4, and does not substantially bind to any other proteins or other epitopes thereof.

In the present application, the term "binding affinity" generally refers to the strength of the sum of non-covalent interactions between a single binding site of a binding molecule (e.g., the CTLA4-binding protein) and a target molecule it binds to (e.g., CTLA4). For example, the binding affinity may reflect the inherent binding affinity of the linear interaction between the binding molecule and the target molecule. In some cases, the level of the binding affinity may be determined by Biacore™, KinExA® or ForteBio® method. For example, the binding molecule with higher affinity may remain binding for a longer time, and it may be more difficult to dissociate. In the present application, the CTLA4-binding protein may bind to human CTLA4 with a $K_D$ value of $2.6 \times 10^8$ M or lower.

In the present application, the term "monkey" generally refers to animals belonging to the primates of Platyrrhini and Catarrhini. In the present application, the monkey may be *Macaca fascicularis* or *Macaca* mulatta. For example, the monkey may be *Macaca fascicularis*.

In the present application, the term "murine" generally refers to animals belonging to the superfamily Rodent. In the present application, the murine may be mouse (*Mus musculus*) or rat (*Rattus norvegicus* f. *domestica*). For example, the murine may be rat.

In the present application, the term "ipilimumab" generally refers to a humanized IgG1k monoclonal antibody, which specifically binds to the extracellular region of human CTLA4. Its trade name is Yervoy® (Bristol-Myers Squibb), which was approved by FDA in 2011 for the treatment of melanoma. Ipilimumab can block the binding of human CTLA4 to its ligand B7-1. The specific structure of the complex formed from the binding of ipilimumab to human CTLA4 may be refered to Ramagopal U A et al., "Structural basis for cancer immunotherapy by the first-in-class checkpoint inhibitor ipilimumab," Proc. Natl. Acad. Sci. U.S.A. (2017). The information on the structure and amino acid sequence of ipilimumab may be found in Lipson E J et al., "Ipilimumab: an anti-CTLA4 antibody for metastatic melanoma, Clin Cancer Res. 2011 Nov. 15; 17 (22): 6958-62"; or refer to the antibody 10D1 in US Application US20020086041.

In the present application, the term "KN044" generally refers to a CTLA4-binding protein comprising a single variable domain of immunoglobulin that specifically binds to CTLA4. The KN044 may block the binding of CTLA4 to CD80, and the affinity for binding to CTLA4 is high. The KN044 may include an amino acid sequence as set forth in SEQ ID NO: 11.

In the present application, the term "endocytosis" generally refers to a process in which the cell membrane transfers the extracellular material into the cell through deformation movement. Endocytosis may include phagocytosis and pinocytosis. For example, cells may sag into "vesicles" to encapsulate the macromolecular material (e.g., protein), which then break away from the cell membrane and enter the interior of cells.

In the present application, the term "single-domain antibody" generally refers to an antigen binding domain or fragment, for example, a VHH domain or a VH domain or a VL domain, respectively. The term antigen binding molecule or antigen-binding protein may be used interchangeably, and also includes the term Nanobodies. The immunoglobulin single variable domain may be further a light chain variable domain sequence (e.g., VL-sequence), or a heavy chain variable domain sequence (e.g., VH-sequence); more particularly, they may be derived from a heavy chain variable domain sequence of a conventional four-chain antibody or derived from a heavy chain variable domain sequence of a heavy chain antibody. Therefore, immunoglobulin single variable domain may be a domain antibody, or an immunoglobulin sequence suitable for use as a domain antibody, a single domain antibody, or an immunoglobulin sequence suitable for use as a single domain, "dAbs" or an immunoglobulin sequence suitable for use as dAbs, or nanobodies, including, but not limited to VHH sequences. The immunoglobulin single variable domain may include fully human, humanized, other sequence optimized or chimeric immunoglobulin sequences. The immunoglobulin single variable domain and the structure of the immunoglobulin single variable domain may be considered to be composed of—but not only limited to—four framework regions or "FRs", which are referred as "framework region 1" or "FR1"; "framework region 2" or "FR2"; or "framework region 3" or "FR3"; and "framework region 4" or "FR4", respectively in the art and herein; in which the framework regions are inserted with three complementary determining regions or "CDRs", which are referred as "complementary determining region 1" or "CDR1"; "complementary determining region 2" or "CDR2"; and "complementary determining region 3" or "CDR3", respectively in the art.

In the present application, the term "Fc" generally refers to the Fc region derived from the constant region of human IgG1, IgG2, IgG3 or IgG4 (for the amino acid sequence of the constant region, referring to the entries P01857, P01859, P01860, P01861 in the protein database of www.uniprot.org), which includes the hinge region or the partial hinge region, CH2 region, as well as CH3 region in the constant region of the immunoglobulin. In the present application, the amino acid sequence of the "human immunoglobulin Fc region" may be mutated 1-5 amino acids on the CH2 region so as to increase or remove Fc-mediated ADCC or CDC activity or enhance or reduce the affinity of FcRn; or may be mutated 1-4 amino acids on the hinge region so as to increase the stability of the protein.

In the present application, the term "epitope" generally refers to the antibody binding site on the antigen. Epitopes can be formed by continuous amino acids (linear epitopes) or non-continuous amino acids that are spatially adjacent due to the tertiary folding of the protein (conformational epitopes). When exposed to a denaturing solvent, the epitopes formed by continuous amino acids may be usually retained, but when treated with a denaturing solvent, the epitopes formed by tertiary folding may be usually lost. Epitopes may generally include at least 3, usually more, at least 5 or 8-10 amino acids in a unique spatial conformation. The methods for determining the spatial conformation of an epitope include, for example, X-ray crystal diffraction and two-dimensional NMR. See, e.g., "Epitope Mapping Protocols" in Methods in Molecular Biology, Vol. 66, Glenn E. Morris, Ed (1996). The term "conformational epitope" as used herein generally refers to non-continuous amino acid residues of an antigen (such as, CTLA4 antigen) that are spatially adjacent due to the tertiary folding of the protein. When the polypeptide chain is folded to form a natural protein, these non-continuous amino acid residues may accumulate on the surface. Conformational epitopes include, but are not limited to, functional epitopes.

In the present application, the term "$K_D$" can be used interchangeably with "KD", which generally refers to the dissociation equilibrium constant of a specific antibody-antigen interaction, in M (mol/L). KD may be calculated from the concentrations of the substance AB and the substance A and substance B obtained from the dissociation: KD=c(A)*c(B)/c (AB). It can be known from the formula that, the larger the KD value, the more dissociation, indicating the weaker the affinity between substances A and B; conversely, the smaller the KD value, the less dissociation, indicating the stronger the affinity between substances A and B.

In the present application, the term "about" generally refers to varying in a range of 0.5%-10% above or below a specified value, for example, varying in a range of 0.5%, 1%, 1.5%, 2%, 2.5%, 3%, 3.5%, 4%, 4.5%, 5%, 5.5%, 6%, 6.5%, 7%, 7.5%, 8%, 8.5%, 9%, 9.5%, or 10% above or below a specified value.

Pharmaceutical Use of the CTLA4-Binding Protein

In the present application, in one aspect, the present application provides a use of a CTLA4-binding protein in the preparation of a medicament for treating a tumor, in which the CTLA4-binding protein specifically binds to CTLA4 and does not compete with a ligand of CTLA4 for binding to the CTLA4.

In the present application, the CTLA4-binding protein may specifically bind to CTLA4. For example, it may found through detection by an ELISA method that the CTLA4-binding protein can specifically only binds to CTLA4. For example, through determination by a surface plasmon resonance (SRP) method, the $K_D$ value of the CTLA4-binding protein binding to CTLA4 may be about $2.8*10^{-8}$ or less, about $2.6*10^{-8}$ or less, about $2.5*10^{-8}$ or less, about $2.0*10^{-8}$ or less, or lower. For example, through detection by an ELISA method, the EC50 value of the CTLA4-binding protein binding to CTLA4 may be about 2 or more, about 2.5 or more, about 3 or more, about 3.5 or more, or higher.

In the present application, the methods for detecting the specific binding of the CTLA4-binding protein to CTLA4 include surface plasmon resonance (SPR) assay, Scatchard assay, competitive binding assay (e.g., radioimmunoassay (RIA), enzyme immunoassay (EIA) and/or sandwich competitive assay).

In the present application, the CTLA4-binding protein may not block the binding of CTLA4 to its ligand.

In the present application, to determine whether the binding of CTLA4 to its ligand is blocked, a method selected from the following group may be used: competitive ELISA method, cell neutralization test and bio-layer interferometry (BLI) method. For example, as determined by the competitive ELISA method, in the experiment where the CTLA4-binding protein competes with CD80 for binding to CTLA4, when the concentration of the CTLA4-binding protein used is about 0.002 to about 2000 times the concentration of CD80 protein (e.g., the concentration of CD80 protein is about 50 ng/ml, the concentration of the CTLA4-binding protein is about 0.01 ng/ml-100 μg/mL), or when the concentration of the CTLA4-binding protein used is about 0.002 to about 500 times the concentration of CD86 protein (e.g., the concentration of CD86 protein is about 50 ng/mL, the concentration of the CTLA4-binding protein is about 0.01 ng/ml-about 25 μg/mL), the decrease in absorbance caused by it is less than about 30%. For another example, as determined by competitive FACS, the CTLA4-binding protein at a concentration range of about 0.01 to about 10000 nM competes with human CD80 or about 1.6 μg/mL of human CD86 for binding to HEK293 cells expressing human CTLA4, the decrease in the mean fluorescence value caused by it is less than about 30%.

In the present application, the "substantially not block" may refer to that within the concentration range of about 0.01 to about 100000 ng/mL, no obvious concentration-dependent blocking effect on the interaction between CTLA4 and its ligand (CD80 or CD86) can be observed. For example, the binding of the CTLA4-binding protein in the concentration range of about 0.01 to about 10000 ng/mL to CTLA4 has an effect on the binding of CTLA4 to its ligand CD80 or CD86 (it can be measured by the change in the OD value as detected by ELISA, or it can be measured by the change of MFI as detected by FACS) of less than about 30%, and there is no obvious concentration dependence. In some cases, the "not block" may also be confirmed through the study on the antigenic epitope. For example, the antigenic epitopes recognized by the CTLA4-binding protein do not include the epitope where CLTA4 and its ligand (CD80 or CD86) bind to each other; or, the antigenic epitopes recognized by the CTLA4-binding protein do not overlap with the epitope where CLTA4 and its ligand (CD80 or CD86) bind to each other; or, the CTLA4-binding protein does not recognize the epitope where CLTA4 and its ligand (CD80 or CD86) bind to each other.

In the present application, the ligand of CTLA4 may be selected from CD80 or a functional fragment thereof and CD86 or a functional fragment thereof.

In the present application, the functional fragments may be protein mutants or fragments with the biological activity of CD80 or CD86. For example, the CD80 functional fragment may have at least one CD80 functional region. The CD80 functional region may refer to the complete protein region of CD80 or a partial region that retains the activity of the complete region. For example, the CD80 functional region may comprise a functional V region of CD80 (amino acids at positions 43-123) or a fragment thereof, and has the ability of binding to CD28 as well as CTLA4; and/or, the CD80 functional region may comprise a complete extracellular segment of CD80 (amino acids at positions 35-242) or a fragment thereof. For example, the CD86 functional fragment may have at least one CD86 functional region. The CD86 functional region may comprise a V region of CD86 (amino acids at positions 33-131), a complete extracellular segment of CD86 (amino acids at positions 24-274), etc. For the amino acid codes of the above CD80 and CD86 functional regions, please refer to the information in the Uniprot database. Where, the accession number of CD80 in Uniprot is P33681, and the accession number of CD86 is P42081.

In the present application, the CTLA4-binding protein may not compete with a reference antibody for binding to the CTLA4, in which the reference antibody may be selected from ipilimumab and KN044.

In the present application, the binding of the CTLA4-binding protein to the CTLA4 may be not affected by the binding of the reference antibody to the CTLA4. In some cases, the CTLA4 binding protein may bind to a certain location/epitope on the CTLA4, while the reference antibody may bind to another location/epitope on the CTLA4 other than the foregoing location/epitope. For example, the CTLA4-binding protein described in the present application and ipilimumab may bind to the CTLA4 at different locations respectively, and the CTLA4-binding protein described in the present application may not compete with ipilimumab for binding to the CTLA4. For another example, the CTLA4-binding protein described in the present application and KN044 may bind to the CTLA4 at different locations respectively, and the CTLA4-binding protein described in the present application may not compete with KN044 for binding to the CTLA4.

In the present application, the CTLA4-binding protein may bind to human CTLA4 and monkey CTLA4. In the present application, the CTLA4-binding protein may substantially not bind to mouse CTLA4 or rat CTLA4. In the present application, the binding of the CTLA4-binding protein to CTLA4 may be species-specific.

In the present application, the CTLA4-binding protein may bind to or recognize one or more amino acids in ABEDC" chain, A'B loop, C"D loop, DE loop and/or EF loop of human CTLA4.

In the present application, the CTLA4-binding protein may bind to or recognize one or more amino acids in C' chain, C"D loop and/or DE loop of human CTLA4.

For example, the CTLA4-binding protein may bind to or recognize one or more amino acids in C' chain of human CTLA4: E48, V49, V46 and T47.

For example, the CTLA4-binding protein may bind to or recognize the amino acid I67 in C"D loop of human CTLA4.

In the present application, the protein 3D structure of human CTLA4 may refer to the "structure" section in UniProt database, and the accession number of the protein of human CTLA4 in the Protein Data Bank (PDB) database is: 1185.

For example, in the present application, the CTLA4-binding protein may recognize or bind to amino acid residues in human CTLA4 selected from a group consisting of: E48, V49, D65, L84, D88 and Y92. In the present application, the CTLA4-binding protein may also recognize or bind to amino acid residues in human CTLA4 selected from a group consisting of: V46, T47, D64, I67 and G83.

For example, in the present application, the CTLA4-binding protein may recognize or bind to a conformational epitope in human CTLA4 comprising one or more of the following amino acid residues: V46, T47, E48, V49, D64, D65, I67, G83, L84, D88 and Y92.

In the present application, the CTLA4-binding protein may recognize or bind to a conformational epitope in human CTLA4 comprising the following amino acid residues: E48, V49, D65, L84, D88 and Y92. In the present application, when one or more of the amino acid residues E48, V49, D65, L84, D88 and Y92 in human CTLA4 are mutated, it may cause the CTLA4-binding protein to lose its ability to specifically bind to human CTLA4 (e.g., the $K_D$ value of the binding of the CTLA4-binding protein to the mutated human CTLA4 can be up-regulated by at least about 800 times, at least about 1000 times, at least about 1200 times or more). In the present application, the CTLA4-binding protein specifically recognizes and/or binds to the conformational epitope of human CTLA4, and the mutation of any one or more of the amino acid residues E48, V49, D65, L84, D88 and Y92 in human CTLA4 may cause changes in the conformation of the conformational epitope.

In the present application, the CTLA4-binding protein may not compete with a molecule that recognizes or binds to one or more of the following amino acid residues in human CTLA4 for binding to the CTLA4: K95, E97, M99, Y104, L106 and I108.

In the present application, the CTLA4-binding protein may not compete with a molecule that recognizes or binds to one or more amino acids in F chain, FG loop and/or G chain of CTLA4 for binding to the CTLA4.

In the present application, the recognition or binding position of the CTLA4-binding protein to CTLA4 may not be located at F chain, FG loop and/or G chain of the CTLA4. For example, the CTLA4-binding protein may not bind to one or more amino acids in F chain, FG loop and/or G chain of CTLA4. If other CTLA4-binding proteins recognize or bind to one or more amino acids in F chain, FG loop and/or G chain of CTLA4, the binding of the other CTLA4-binding proteins to CTLA4 does not affect the binding of the CTLA4-binding protein described in the present application to CTLA4.

For example, the CTLA4-binding protein may not bind to or recognize one or more amino acids in F chain of human CTLA4: K95, E97 and M99. For example, the CTLA4-binding protein may not bind to or recognize one or more amino acids in FG loop of human CTLA4: L106 and I108.

In the present application, the CTLA4-binding protein may comprise at least one CDR in the VH whose amino acid sequence is as set forth in SEQ ID NO: 7.

QVQLVESGGGX$_1$VQX$_2$GGSLRLSCAASX$_3$X$_4$X$_5$NX$_6$X$_7$X$_8$X$_9$MGWFRQAPGKX$_{10}$X$_{11}$ERVAAX$_{12}$X$_{13}$X$_{14}$X$_{15}$GTX$_{16}$X$_{17}$YYADSVKGRFTISRDNX$_{18}$KNTLX$_{19}$LQM-NSLX$_{20}$X$_{21}$EDTAX$_{22}$YYCX$_{23}$X$_{24}$X$_{25}$X$_{26}$X$_{27}$X$_{28}$X$_{29}$AWCX$_{30}$RX$_{31}$X$_{32}$X$_{33}$X$_{34}$X$_{35}$X$_{36}$X$_{37}$WGQGTX$_{38}$VTV

SX$_{39}$ (SEQ ID NO: 7), in which X$_1$ is S or L; X$_2$ is A or P; X$_{10}$ is E or G; X$_{11}$ is R or L; X$_{18}$ is G or S; X$_{19}$ is F or Y; X$_{20}$ is K or R; X$_{21}$ is P or A; X$_{22}$ is M or V; X$_{38}$ is Q or L; X$_{39}$ is S or there are no amino acids; the remaining X are any amino acids.

In the present application, the CTLA4-binding protein may comprise the heavy chain CDR defined by the VH as set forth in SEQ ID NO: 7 above according to any method: at least one of HCDR1, HCDR2 and HCDR3 (e.g., there may be one, two or three). For example, the CTLA4-binding protein may comprise at least one of HCDR1, HCDR2 and HCDR3 defined by the VH as set forth in SEQ ID NO: 8 above according to any method (e.g., there may be one, two or three).

For example, the CTLA4-binding protein may comprise HCDR3 in the VH whose amino acid sequence is as set forth in SEQ ID NO: 7. In some cases, the CTLA4-binding protein may comprise HCDR3 in the VH whose amino acid sequence is as set forth in SEQ ID NO: 8. For example, the CTLA4-binding protein may comprise HCDR2 in the VH whose amino acid sequence is as set forth in SEQ ID NO: 7. In some cases, the CTLA4-binding protein may comprise HCDR3 in the VH whose amino acid sequence is as set forth in SEQ ID NO: 8. For example, the CTLA4-binding protein may comprise HCDR1 in the VH whose amino acid sequence is as set forth in SEQ ID NO: 7. In some cases, the CTLA4-binding protein may comprise HCDR3 in the VH whose amino acid sequence is as set forth in SEQ ID NO: 8.

In the present application, for the at least one CDR in the VH whose amino acid sequence is as set forth in SEQ ID NO: 7 above, or the at least one CDR in the VH whose amino acid sequence is as set forth in SEQ ID NO: 8 above, the division method for CDR may be any division method for CDR known in the art.

For example, the general numbering method of VH domains given by Kabat et al. can be used for numbering ("Sequence of proteins of immunological interest", US Public Health Services, NIH Bethesda, MD, Publication No. 91). According to this numbering method, FR1 includes amino acid residues at positions 1-30, CDR1 includes amino acid residues at positions 31-35, FR2 includes amino acids at positions 36-49, CDR2 includes amino acid residues at positions 50-65, FR3 includes amino acid residues at positions 66-94, CDR3 includes amino acid residues at positions 95-102, and FR4 includes amino acid residues at positions 103-113.

In this field, the CDRs of an antibody may be defined by many methods, for example: 1) Kabat definition rule based on sequence variability (Wu and Kabat, J Exp Med 132: 211-50, 1970; Kabat et al., Sequences of Proteins of Immunological Interest, Ed. 5, Public Health Service, National Institutes of Health, Bethesda, Md., 1991), 2) Chothia definition rule based on the location of the structural ring region (Al-Lazikani et al., J Mol Biol 273:927-48, 1997), 3) AbM definition rule that weigh the above two rules using an AbMantibody model software of Oxford Molecular, 4) Contact definition rule based on the crystal structure analysis of the obtained complex. The initiation and termination sites of CDR amino acids of the CTLA4-binding protein described in the present application divided by these methods may be shown as follows:

|  | Kabat Definition | AbM Definition | Chothia Definition | Contact Definition |
|---|---|---|---|---|
| Heavy chain CDR1 | H31-H35 | H26-H35 | H26-H32 | H30-H35 |
| Heavy chain CDR2 | H50-H65 | H50-H58 | H52-H56 | H47-H58 |
| Heavy chain CDR3 | H95-H102 | H95-H102 | H95-H102 | H93-H101 |

Where, Ha-Hb may refer to the amino acid sequence at positions from a to b starting from the N-terminus of the antibody heavy chain. For example, H31-H35 may refer to the amino acid sequence at positions from 31 to 35 in the Kabat numbering after the antibody heavy chain is numbered according to the Kabat numbering rule.

In the present application, the CTLA4-binding protein may comprise or be an antibody or an antigen binding fragment thereof, and comprises an antibody heavy chain CDR3, the heavy chain CDR3 may comprise an amino acid sequence as set forth in SEQ ID NO: 1. $X_1X_2X_3X_4X_5X_6X_7AWCX_8RX_9X_{10}X_{11}X_{12}X_{13}X_{14}X_{15}$ (SEQ ID NO: 1), in which $X_1$-$X_{12}$ are all any amino acids.

In the present application, the CTLA4-binding protein may comprise or be an antibody or an antigen binding fragment thereof, and comprises an antibody heavy chain CDR3, the heavy chain CDR3 may comprise an amino acid sequence as set forth in SEQ ID NO: 2.

In the present application, the CTLA4-binding protein may comprise or be an antibody or an antigen binding fragment thereof, and comprises an antibody heavy chain CDR2, the heavy chain CDR2 may comprise an amino acid sequence as set forth in SEQ ID NO: 3. $X_1\ X_2\ X_3\ X_4GT\ X_5\ X_6$ (SEQ ID NO: 3), in which $X_1$-$X_6$ are all any amino acids.

In the present application, the CTLA4-binding protein may comprise or be an antibody or an antigen binding fragment thereof, and comprises an antibody heavy chain CDR2, the heavy chain CDR2 may comprise an amino acid sequence as set forth in SEQ ID NO: 4.

In the present application, the CTLA4-binding protein may comprise or be an antibody or an antigen binding fragment thereof, and comprises an antibody heavy chain CDR1, the heavy chain CDR1 may comprise an amino acid sequence as set forth in SEQ ID NO: 5. $X_1\ X_2\ X_3N\ X_4\ X_5\ X_6\ X_7$ (SEQ ID NO: 5), in which $X_1$-$X_7$ are all any amino acids.

In the present application, the CTLA4-binding protein may comprise or be an antibody or an antigen binding fragment thereof, and comprises an antibody heavy chain CDR1, the heavy chain CDR1 may comprise an amino acid sequence as set forth in SEQ ID NO: 6.

In the present application, the CTLA4-binding protein may comprise a structure as shown below: FR1-CDR1-FR2-CDR2-FR3-CDR3-FR4.

In the present application, the structures and serial numbers according to the above numbering method may or may not correspond to the actual serial numbers of amino acid residues in the actual sequence.

In the present application, the CTLA4-binding protein may comprise or be an antibody or an antigen binding fragment thereof, and its heavy chain CDR1 may comprise an amino acid sequence as set forth in SEQ ID NO: 6, its heavy chain CDR2 may comprise an amino acid sequence as set forth in SEQ ID NO: 4, and its heavy chain CDR3 may comprise an amino acid sequence as set forth in SEQ ID NO: 2.

In the present application, the CTLA4-binding protein may comprise or be an antibody or an antigen binding fragment thereof, and comprises an antibody heavy chain FR1, the heavy chain FR1 may comprise an amino acid sequence as set forth in SEQ ID NO: 27. QVQLVESGGG $X_1$VQX$_2$GGSLRLSCAAS (SEQ ID NO: 27), in which $X_1$ is S or L; $X_2$ is A or P.

In the present application, the heavy chain FR1 may be located at the N-terminus of the heavy chain CDR1. For example, the C-terminus of the heavy chain FR1 may be directly linked to the N-terminus of the heavy chain CDR1.

For example, the CTLA4-binding protein may comprise or be an antibody or an antigen binding fragment thereof, and comprises an antibody heavy chain FR1, the heavy chain FR1 may comprise an amino acid sequence as set forth in any one of SEQ ID NO: 21 and SEQ ID NO: 25.

In the present application, the CTLA4-binding protein may comprise or be an antibody or an antigen binding fragment thereof, and may comprise an antibody heavy chain FR2, the heavy chain FR2 comprises an amino acid sequence as set forth in SEQ ID NO: 28. MGWFRQAPGKX$_1$X$_2$ERVAA (SEQ ID NO: 28), in which $X_1$ is E or G; $X_2$ is R or L.

In the present application, the heavy chain FR2 may be located between the heavy chain CDR1 and the heavy chain CDR2. For example, the N-terminus of the heavy chain FR2 may be directly linked to the C-terminus of the heavy chain CDR1; and the C-terminus of the heavy chain FR2 may be directly linked to the N-terminus of the heavy chain CDR2.

For example, the CTLA4-binding protein may comprise or be an antibody or an antigen binding fragment thereof, and may comprise an antibody heavy chain FR2, the heavy chain FR2 comprises an amino acid sequence as set forth in any one of SEQ ID NO: 22 and SEQ ID NO: 26.

In the present application, the CTLA4-binding protein may comprise or be an antibody or an antigen binding fragment thereof, and may comprise an antibody heavy chain FR3, the heavy chain FR3 comprises an amino acid sequence as set forth in SEQ ID NO: 33. YYADSVKGRFTISRDN $X_1$ KNTL$X_2$ LQMNSL $X_3$ $X_4$ EDTA $X_5$ YYC, in which $X_1$ is G or S; $X_2$ is F or Y; $X_3$ is K or R; $X_4$ is P or A; $X_5$ is M or V.

In the present application, the heavy chain FR3 may be located between the heavy chain CDR2 and the heavy chain CDR3. For example, the N-terminus of the heavy chain FR3 may be directly linked to the C-terminus of the heavy chain CDR2; and the C-terminus of the heavy chain FR3 may be directly linked to the N-terminus of the heavy chain CDR3.

For example, the CTLA4-binding protein may comprise or be an antibody or an antigen binding fragment thereof, and may comprise an antibody heavy chain FR3, the heavy chain FR3 comprises an amino acid sequence as set forth in any one of SEQ ID NO: 23 and SEQ ID NO: 35.

In the present application, the CTLA4-binding protein may comprise or be an antibody or an antigen binding fragment thereof, and may comprise an antibody heavy chain FR4, the heavy chain FR4 comprises an amino acid sequence as set forth in SEQ ID NO: 34. WGQGTX$_1$VTVSX$_2$ (SEQ ID NO: 34), in which $X_1$ is Q or L; $X_2$ is S or there are no amino acids.

In the present application, the heavy chain FR4 may be located at the C-terminus of the heavy chain CDR3. For example, the N-terminus of the heavy chain FR4 may be directly linked to the C-terminus of the heavy chain CDR3.

For example, the CTLA4-binding protein may comprise or be an antibody or an antigen binding fragment thereof, and may comprise an antibody heavy chain FR4, the heavy chain FR4 comprises an amino acid sequence as set forth in any one of SEQ ID NO: 24 and SEQ ID NO: 36.

In the present application, the CTLA4-binding protein may comprise or be an antibody or an antigen binding fragment thereof, and comprises a heavy chain variable region which may comprise an amino acid sequence as set forth in SEQ ID NO: 7.

```
(SEQ ID NO: 7)
QVQLVESGGGX₁VQX₂GGSLRLSCAASX₃X₄X₅NX₆X₇X₈X₉MGW

FRQAPGKX₁₀X₁₁ERVAAX₁₂X₁₃X₁₄X₁₅GTX₁₆X₁₇YYADSVKGR

FTISRDNX₁₈KNTLX₁₉LQMNSLX₂₀X₂₁EDTAX₂₂YYCX₂₃X₂₄

X₂₅X₂₆X₂₇X₂₈X₂₉AWCX₃₀RX₃₁X₃₂X₃₃X₃₄X₃₅X₃₆X₃₇WGQGTX₃₈

VTVSX₃₉,
``` in which, $X_1$ is S or L; $X_2$ is A or P; $X_{10}$ is E or G; $X_{11}$ is R or L; $X_{18}$ is G or S; $X_{19}$ is F or Y; $X_{20}$ is K or R; $X_{21}$ is P or A; $X_{22}$ is M or V; $X_{38}$ is Q or L; $X_{39}$ is S or there are no amino acids; the remaining X are any amino acids.

In the present application, the CTLA4-binding protein may comprise or be an antibody or an antigen binding fragment thereof, and it comprises an amino acid sequence as set forth in any one of SEQ ID NO: 8 and SEQ ID NOs: 17-20.

In the present application, the CTLA4-binding protein may comprise or be a single-domain antibody or an antigen binding fragment thereof, and it comprises an amino acid sequence as set forth in any one of SEQ ID NO: 8 and SEQ ID NOs: 17-20.

In the present application, the CTLA4-binding protein may comprise or be an antibody 138, the antibody 138 comprises the heavy chain CDR1 to the heavy chain CDR3, in which the heavy chain CDR1 may comprise an amino acid sequence as set forth in SEQ ID NO: 6, the heavy chain CDR2 may comprise an amino acid sequence as set forth in SEQ ID NO: 4, the heavy chain CDR3 may comprise an amino acid sequence as set forth in SEQ ID NO: 2. In the present application, the antibody 138 may comprise a heavy chain variable region which may comprise an amino acid sequence as set forth in SEQ ID NO: 8. In the present application, the antibody 138 may be a single-domain antibody or an antigen binding fragment thereof, which comprises an amino acid sequence as set forth in SEQ ID NO: 8.

In the present application, the CTLA4-binding protein may be humanized. For example, according to the universal humanized VHH framework hNbBcII10FGLA (PDB number is: 3EAK), the humanization of amino acids on the surface of a protein may be performed with reference to a humanized antibody (PDB number is: 1OHQ), so as to modify the partial amino acids VLP of the VHH sequence framework 1 (framework 1, FR1), the partial amino acid GL of the VHH sequence framework 2 (FR2), the partial amino acids RSKRAAV of the VHH sequence framework 3 (FR3) and the amino acid L of the VHH sequence framework 4 (FR4).

For example, the antibody 138 may be humanized to obtain about 4 humanized variants (hu138V1 to hu138V4) of the antibody 138.

Where, hu138V1 may comprise HFR1-HFR4, in which HFR1 comprises an amino acid sequence as set forth in SEQ ID NO:21, HFR2 comprises an amino acid sequence as set forth in SEQ ID NO:22, HFR3 comprises an amino acid sequence as set forth in SEQ ID NO: 23, HFR4 comprises an amino acid sequence as set forth in SEQ ID NO:24; hu138V1 may comprise a heavy chain variable region, in which the heavy chain variable region comprises an amino acid sequence as set forth in SEQ ID NO:17.

Where, hu138V2 may comprise HFR1-HFR4, in which HFR1 comprises an amino acid sequence as set forth in SEQ ID NO:25, HFR2 comprises an amino acid sequence as set forth in SEQ ID NO:22, HFR3 comprises an amino acid sequence as set forth in SEQ ID NO: 23, HFR4 comprises an amino acid sequence as set forth in SEQ ID NO:24; hu138V2 may comprise a heavy chain variable region, in which the heavy chain variable region comprises an amino acid sequence as set forth in SEQ ID NO:18.

Where, hu138V3 may comprise HFR1-HFR4, in which HFR1 comprises an amino acid sequence as set forth in SEQ ID NO:21, HFR2 comprises an amino acid sequence as set forth in SEQ ID NO:26, HFR3 comprises an amino acid sequence as set forth in SEQ ID NO: 23, HFR4 comprises an amino acid sequence as set forth in SEQ ID NO:24; hu138V3 may comprise a heavy chain variable region, in which the heavy chain variable region comprises an amino acid sequence as set forth in SEQ ID NO:19.

Where, hu138V4 may comprise HFR1-HFR4, in which HFR1 comprises an amino acid sequence as set forth in SEQ ID NO:25, HFR2 comprises an amino acid sequence as set forth in SEQ ID NO:26, HFR3 comprises an amino acid sequence as set forth in SEQ ID NO: 23, HFR4 comprises an amino acid sequence as set forth in SEQ ID NO:24; hu138V4 may comprise a heavy chain variable region, in which the heavy chain variable region comprises an amino acid sequence as set forth in SEQ ID NO:20.

In the present application, the CTLA4-binding protein may comprise or is an antibody or an antigen binding fragment thereof, and it comprises an amino acid sequence as set forth in any one of SEQ ID NO: 8 and SEQ ID NOs: 17-20.

In the present application, the CTLA4-binding protein may comprise or is a single-domain antibody or an antigen binding fragment thereof, and it comprises an amino acid sequence as set forth in any one of SEQ ID NO: 8 and SEQ ID NOs: 17-20.

In the present application, the protein, polypeptide and/or amino acid sequence involved in the present application should also be understood to comprise at least the following range: variants or homologues that have the same or similar functions as the protein or polypeptide.

In the present application, the variant may be a protein or a polypeptide in which one or more amino acids are substituted, deleted or added in the amino acid sequence of the protein and/or the polypeptide (e.g., the CTLA4-binding protein). For example, the functional variant may comprise a protein or a polypeptide with amino acid changes through substitution, deletion and/or insertion of at least one, for example 1-30, 1-20 or 1-10, further for example 1, 2, 3, 4 or 5 amino acids. The functional variant may substantially remain the biological properties of the protein or the polypeptide before changing (e.g., substitution, deletion or addition). For example, the functional variant may remain at least 60%, 70%, 80%, 90%, or 100% of the biological activity (e.g., the ability of binding to CTLA4) of the protein or the polypeptide before changing. For example, the substitution may be conservative substitution.

In the present application, a part of the amino acid sequence of the antigen-binding protein may be homologous to the corresponding amino acid sequence in the antibody derived from a specific species, or belong to a specific category. For example, the variable region and constant part of an antibody may be derived from the variable region and constant region of the antibody of an animal species (e.g., human). In the present application, the homologues may be proteins or polypeptides having at least about 85% (e.g., having at least about 85%, about 90%, about 91%, about 92%, about 93%, about 94%, about 95%, about 96%, about 97%, about 98%, about 99% or higher) sequence homology with the amino acid sequence of the protein and/or the polypeptide (e.g., the CTLA4-binding protein).

In the present application, the homology generally refers to the comparability, similarity or relevancy between two or more sequences. The "percentage of sequence homology" may be calculated in the following way: the two sequences to be aligned are compared in the comparison window to determine the number of positions where the same nucleic acid bases (e.g., A, T, C, G, I) or the same amino acid residues (e.g., Ala, Pro, Ser, Thr, Gly, Val, Leu, Ile, Phe, Tyr, Trp, Lys, Arg, His, Asp, Glu, Asn, Gln, Cys and Met) exist in the two sequences to obtain the number of matching positions, the number of matching positions is divided by the total number of positions in the comparison window (i.e., the window size) and the obtained result is multiplied by 100 to get the percentage of sequence homology. The alignment to determine the percentage of sequence homology can be achieved in a variety of ways known in the art, for example, by using publicly available computer software, such as BLAST, BLAST-2, ALIGN or Megalign (DNASTAR) software. Those skilled in the art can determine the appropriate parameters for sequence alignment, including any algorithms needed to achieve the maximum alignment within the full-length sequence being compared or within the target sequence region. The homology may also be determined by the following methods: FASTA and BLAST. The description of the FASTA algorithm can be found in "Improved tools for comparison of biological sequences" to W. R. Pearson and D. J. Lipman, Proc. Natl. Acad. Sci., 85:2444-2448, 1988; and "Fast and sensitive search for protein similarity" to D. J. Lipman and W. R. Pearson, Science, 227:1435-1441, 1989. The description of the BLAST algorithm can be found in "Basic search tool for local alignment" to S. Altschul, W. Gish, W. Miller, E. W. Myers and D. Lipman, Journal of Molecular Biology, 215:403-410, 1990.

In the present application, the CTLA4-binding protein may bind to human CTLA4 with a $K_D$ value of $2.6\times10^8$ M or lower (e.g., $2.5\times10^8$ M or lower, $2.0\times10^8$ M or lower, $1.5\times10^8$ M or lower, $1.0\times10^8$ M or lower or $0.5\times10^8$ M or lower).

In the present application, the CTLA4-binding protein may inhibit the growth of tumor cells.

In the present application, the CTLA4-binding protein may cause a CTLA4 endocytic degradation rate lower than about 50% (e.g., lower than about 45%, lower than about 40%, lower than about 35%, lower than about 30%, lower than about 25%, lower than about 20%, lower than about 15%, lower than about 10%, lower than about 5% or lower) on the 293 cells expressing CTLA4.

In the present application, the degree of endocytic degradation may be evaluated by the "endocytic degradation rate". With regard to a certain cell exogenous macromolecule (e.g., a soluble protein) that interacts with cells, the "endocytic degradation rate" of the macromolecular substance may refer to the ratio of the amount of the macromolecular substance that enters the cell through endocytosis to the total amount of the macromolecular substance that interacts with the cells (generally the total amount can be the sum of the amount of endocytosis and the amount bound to the cell surface) (usually expressed as a percentage). With regard to the macromolecular substance on the cell membrane surface (e.g., a certain membrane protein on the cell), the "endocytic degradation rate" of the macromolecule may refer to the ratio of the amount of the macromolecular substance that enters the cell through endocytosis and is degraded to the total amount of the macromolecular substance on the cell (generally the total amount can be the sum of the amount of endocytic degradation and the amount remaining on the cell membrane surface after endocytic degradation; or it can also be expressed as the total number on the cell membrane surface without the occurrence of endocytic degradation) (usually expressed as a percentage).

In the present application, the CTLA4-binding protein may not cause the endocytic degradation of CTLA4 on the cell surface expressing the CTLA4. This is completely different from the general way that the CTLA4 antibody reduces the level of CTLA4 on the cell membrane surface through endocytic degradation, and the decrease of the CTLA4 level will bring a series of immune disorders (see dentifying functional defects in patients with immune dysregulation due to LRBA and CTLA4 mutations). Therefore, the CTLA4-binding protein described in the present application may remain the number of CTLA4 on the surface of cells expressing the CTLA4 and enhance the activity of ADCC, thereby enhancing the killing effect on tumors; meanwhile, the CTLA4-binding protein described in the present application can remain the number of CTLA4 on the surface of T cells in normal tissues, thereby remaining the functions of CTLA4 in non-tumor environments and reducing or avoiding the possible adverse reactions or immunotoxicity caused by the CTLA4-binding protein.

In the present application, the CTLA4-binding protein may also comprise an antibody Fc domain. In the present application, the inclusion of an antibody Fc domain in the CTLA4-binding protein may make the CTLA4-binding protein form a dimeric molecule, and at the same time extend the in vivo half-life of the binding protein.

In the present application, the antibody Fc domain may comprise an Fc domain derived from an IgG antibody. For example, the Fc may be derived from different subtypes of immunoglobulin, for example, IgG (e.g., IgG1, IgG2, IgG3 or IgG4 subtypes), IgA1, IgA2, IgD, IgE or IgM.

In the present application, mutations may be introduced into the antibody Fc domain to change Fc-mediated related activities. For example, the mutations may be selected from the following group: mutations that change Fc-mediated CDC activities, mutations that change Fc-mediated ADCC activities and mutations that change FcRn-mediated in vivo half-life. In the present application, the mutations may occur in the CH2 region, the CH3 region and/or the hinge region. The mutation sites of Fc and/or the amino acid sequence of the mutated Fc can be found in WO2017020802A1. In the present application, the antibody Fc domain may comprise an amino acid sequence as set forth in SEQ ID NO: 29.

In the present application, the CTLA4-binding protein may comprise the antibody Fc domain and the antibody heavy chain variable region, and the antibody heavy chain variable region is directly or indirectly fused with the antibody Fc domain. For example, the antibody heavy chain variable region may be linked to the antibody Fc domain through a linker. For example, the linker may be a connecting peptide. In the present application, the connecting peptide may be GGGGS, GS or AP.

In the present application, the CTLA4-binding protein may comprise the antibody Fc domain and the antibody heavy chain variable region, and the antibody Fc domain can make the CTLA4-binding protein form a dimeric structure. For example, the dimeric structure may be a homodimer, or alternatively, may be a heterodimer.

For example, the CTLA4-binding protein may comprise the antibody 138 and the antibody Fc domain. For example, the antibody Fc domain may be the Fc domain of a human IgG. In some cases, the CTLA4-binding protein may comprise or may be 138-Fc, in which the Fc domain of the human IgG may be located at the C-terminus of the 138. For example, the 138-Fc may comprise an amino acid sequence as set forth in SEQ ID NO: 9. In some cases, the CTLA4-binding protein may be 138-FcAG, in which the modified Fc domain of the human IgG is located at the C-terminus of the 138.

Composition and Application Thereof.

In another aspect, the present application provides a pharmaceutical composition (e.g., a pharmaceutical composition for treating a tumor), which comprises the CTLA4-binding protein described in the present application.

In the present application, the pharmaceutical composition may also comprise a pharmaceutically acceptable carrier.

In the present application, the CTLA4-binding protein may specifically bind to CTLA4. For example, as detected by the ELISA method, it can be found that the CTLA4-binding protein may only specifically bind to CTLA4. For example, as determined by the surface plasmon resonance (SRP) method, the $K_D$ value for the binding of the CTLA4-binding protein to CTLA4 may be about $2.8*10^{-8}$ or less, about $2.6*10^{-8}$ or less, about $2.5*10^{-8}$ or less, about $2.0*10^{-8}$ or less or lower. For example, as detected by the ELISA method, the EC50 value for the binding of the CTLA4-binding protein to CTLA4 may be about 2 or more, about 2.5 or more, about 3 or more, about 3.5 or more or higher.

In the present application, the CTLA4-binding protein may not block the binding of CTLA4 to its ligand.

In the present application, to determine whether the binding of CTLA4 to its ligand is blocked, a method selected from the following group can be used: competitive ELISA method, cell neutralization test and bio-layer interferometry (BLI) method. For example, as determined by the competitive ELISA method, in the experiment where the CTLA4-binding protein competes with CD80 for binding to CTLA4, when the concentration of the CTLA4-binding protein used is about 0.002 to about 2000 times the concentration of CD80 protein (e.g., the concentration of CD80 protein is about 50 ng/ml, the concentration of the CTLA4-binding protein is about 0.01 ng/mL-100 µg/mL), or when the concentration of the CTLA4-binding protein used is about 0.002 to about 500 times the concentration of CD86 protein (e.g., the concentration of CD86 protein is about 50 ng/ml, the concentration of the CTLA4-binding protein is about 0.01 ng/ml-about 25 µg/mL), the decrease in absorbance caused by it is less than about 30%. For another example, as determined by competitive FACS, the CTLA4-binding protein at a concentration range of about 0.01 to about 10000 nM competes with human CD80 or about 1.6 µg/mL of human CD86 for binding to HEK293 cells expressing human CTLA4, the decrease in the mean fluorescence value caused by it is less than about 30%.

In the present application, the "substantially not block" may refer to that within the concentration range of about 0.01 to about 100000 ng/mL, no obvious concentration-dependent blocking effect on the interaction between CTLA4 and its ligand (CD80 or CD86) may be observed. For example, the binding of the CTLA4-binding protein in the concentration range of about 0.01 to about 10000 ng/mL to CTLA4 has an effect on the binding of CTLA4 to its ligand CD80 or CD86 (it can be measured by the change in the OD value as detected by ELISA, or it may be measured by the change of MFI as detected by FACS) of less than about 30%, and there is no obvious concentration dependence. In some cases, the "not block" may also be confirmed through the study on the antigenic epitope. For example, the antigenic epitopes recognized by the CTLA4-binding protein do not comprise the epitope where CLTA4 and its ligand (CD80 or CD86) bind to each other; or, the antigenic epitopes recognized by the CTLA4-binding protein do not overlap with the epitope where CLTA4 and its ligand (CD80 or CD86) bind to each other; or, the CTLA4-binding protein does not recognize the epitope where CLTA4 and its ligand (CD80 or CD86) bind to each other.

In the present application, the ligand of CTLA4 may be selected from CD80 or a functional fragment thereof and CD86 or a functional fragment thereof.

In the present application, the functional fragment may be protein mutants or fragments with the biological activity of CD80 or CD86. For example, the CD80 functional fragment may have at least one CD80 functional region. The CD80 functional region may refer to the complete protein region of CD80 or a partial region that retains the activity of the complete region. For example, the CD80 functional region may comprise a functional V region of CD80 (amino acids at positions 43-123) or a fragment thereof, and has the ability of binding to CD28 as well as CTLA4; and/or, the CD80 functional region may comprise a complete extracellular segment of CD80 (amino acids at positions 35-242) or a fragment thereof. For example, the CD86 functional fragment may have at least one CD86 functional region. The CD86 functional region may comprise a V region of CD86 (amino acids at positions 33-131), a complete extracellular segment of CD86 (amino acids at positions 24-274), etc. For the amino acid codes of the above CD80 and CD86 functional regions, please refer to the information in the Uniprot database. Where, the accession number of CD80 in Uniprot is P33681, and the accession number of CD86 is P42081.

In the present application, the CTLA4-binding protein may not compete with a reference antibody for binding to the CTLA4, in which the reference antibody may be selected from ipilimumab and KN044.

In the present application, the binding of the CTLA4-binding protein to the CTLA4 may be not affected by the binding of the reference antibody to the CTLA4. In some cases, the CTLA4 binding protein may bind to a certain location/epitope on the CTLA4, while the reference antibody may bind to another location/epitope on the CTLA4 other than the foregoing location/epitope. For example, the CTLA4-binding protein described in the present application and ipilimumab may bind to the CTLA4 at different locations respectively, and the CTLA4-binding protein described in the present application may not compete with ipilimumab for binding to the CTLA4. For another example, the CTLA4-binding protein described in the present application and KN044 may bind to the CTLA4 at different locations respectively, and the CTLA4-binding protein described in the present application may not compete with KN044 for binding to the CTLA4.

In the present application, the CTLA4-binding protein may bind to human CTLA4 and monkey CTLA4. In the present application, the CTLA4-binding protein may substantially not bind to mouse CTLA4 or rat CTLA4. In the present application, the binding of the CTLA4-binding protein to CTLA4 may be species-specific.

In the present application, the CTLA4-binding protein can bind to or recognize one or more amino acids in ABEDC" chain, A'B loop, C"D loop, DE loop and/or EF loop of human CTLA4.

In the present application, the CTLA4-binding protein can bind to or recognize one or more amino acids in C' chain, C"D loop and/or DE loop of human CTLA4.

For example, the CTLA4-binding protein can bind to or recognize one or more amino acids in C' chain of human CTLA4: E48, V49, V46 and T47.

For example, the CTLA4-binding protein can bind to or recognize the amino acid I67 in C"D loop of human CTLA4.

In the present application, the protein 3D structure of human CTLA4 can refer to the "structure" section in Uni-Prot database, and the accession number of the protein of human CTLA4 in the Protein Data Bank (PDB) database is: 1I85.

For example, in the present application, the CTLA4-binding protein may recognize or bind to amino acid residues in human CTLA4 selected from a group consisting of: E48, V49, D65, L84, D88 and Y92. In the present application, the CTLA4-binding protein can also recognize or bind to amino acid residues in human CTLA4 selected from a group consisting of: V46, T47, D64, I67 and G83.

For example, in the present application, the CTLA4-binding protein may recognize or bind to a conformational epitope in human CTLA4 comprising one or more of the following amino acid residues: V46, T47, E48, V49, D64, D65, I67, G83, L84, D88 and Y92.

In the present application, the CTLA4-binding protein may recognize or bind to a conformational epitope in human CTLA4 comprising the following amino acid residues: E48, V49, D65, L84, D88 and Y92. In the present application, when one or more of the amino acid residues E48, V49, D65, L84, D88 and Y92 in human CTLA4 are mutated, it may cause the CTLA4-binding protein to lose its ability to specifically bind to human CTLA4 (e.g., the $K_D$ value of the binding of the CTLA4-binding protein to the mutated human CTLA4 can be up-regulated by at least 800 times, at least 1000 times, at least 1200 times or more). In the present application, the CTLA4-binding protein specifically recognizes and/or binds to the conformational epitope of human CTLA4, and the mutation of any one or more of the amino acid residues E48, V49, D65, L84, D88 and Y92 in human CTLA4 may cause changes in the conformation of the conformational epitope.

In the present application, the CTLA4-binding protein may not compete with a molecule that recognizes or binds to one or more of the following amino acid residues in human CTLA4 for binding to the CTLA4: K95, E97, M99, Y104, L106 and I108.

In the present application, the CTLA4-binding protein may not compete with a molecule that recognizes or binds to one or more amino acids in F chain, FG loop and/or G chain of CTLA4 for binding to the CTLA4.

In the present application, the recognition or binding position of the CTLA4-binding protein to CTLA4 may not be located at F chain, FG loop and/or G chain of the CTLA4. For example, the CTLA4-binding protein may not bind to one or more amino acids in F chain, FG loop and/or G chain of CTLA4. If other CTLA4-binding proteins recognize or bind to one or more amino acids in F chain, FG loop and/or G chain of CTLA4, the binding of the other CTLA4-binding proteins to CTLA4 does not affect the binding of the CTLA4-binding protein described in the present application to CTLA4.

For example, the CTLA4-binding protein may not bind to or recognize one or more amino acids in F chain of human CTLA4: K95, E97 and M99. For example, the CTLA4-binding protein may not bind to or recognize one or more amino acids in FG loop of human CTLA4: L106 and I108. In the present application, the CTLA4-binding protein may comprise or be an antibody or an antigen binding fragment thereof, and comprises an antibody heavy chain CDR3, the heavy chain CDR3 may comprise an amino acid sequence as set forth in SEQ ID NO: 1. $X_1 X_2 X_3 X_4 X_5 X_6 X_7 AWC X_8 R X_9 X_{10} X_{11} X_{12}$ $X_{13}$ $X_{14}$ $X_{15}$ (SEQ ID NO: 1), in which $X_1$-$X_{12}$ are all any amino acids.

In the present application, the CTLA4-binding protein may comprise or be an antibody or an antigen binding fragment thereof, and comprises an antibody heavy chain CDR3, the heavy chain CDR3 may comprise an amino acid sequence as set forth in SEQ ID NO: 2.

In the present application, the CTLA4-binding protein may comprise or be an antibody or an antigen binding fragment thereof, and comprises an antibody heavy chain CDR2, the heavy chain CDR2 may comprise an amino acid sequence as set forth in SEQ ID NO: 3. $X_1$ $X_2$ $X_3$ $X_4$GT $X_5$ $X_6$ (SEQ ID NO: 3), in which $X_1$-$X_6$ are all any amino acids.

In the present application, the CTLA4-binding protein may comprise or be an antibody or an antigen binding fragment thereof, and comprises an antibody heavy chain CDR2, the heavy chain CDR2 may comprise an amino acid sequence as set forth in SEQ ID NO: 4.

In the present application, the CTLA4-binding protein may comprise or be an antibody or an antigen binding fragment thereof, and comprises an antibody heavy chain CDR1, the heavy chain CDR1 may comprise an amino acid sequence as set forth in SEQ ID NO: 5. $X_1$ $X_2$ $X_3$N $X_4$ $X_5$ $X_6$ $X_7$ (SEQ ID NO: 5), in which $X_1$-$X_7$ are all any amino acids.

In the present application, the CTLA4-binding protein may comprise or be an antibody or an antigen binding fragment thereof, and comprises an antibody heavy chain FR1, the heavy chain FR1 may comprise an amino acid sequence as set forth in SEQ ID NO: 27. QVQLVESGGG $X_1$VQ $X_2$GGSLRLSCAAS (SEQ ID NO: 27), in which $X_1$ is S or L; $X_2$ is A or P.

For example, the CTLA4-binding protein may comprise or be an antibody or an antigen binding fragment thereof, and comprises an antibody heavy chain FR1, the heavy chain FR1 may comprise an amino acid sequence as set forth in any one of SEQ ID NO: 21 and SEQ ID NO: 25.

In the present application, the CTLA4-binding protein may comprise or be an antibody or an antigen binding fragment thereof, and may comprise an antibody heavy chain FR2, the heavy chain FR2 comprises an amino acid sequence as set forth in SEQ ID NO: 28. MGWFRQAPGKX$_1$ $X_2$ERVAA (SEQ ID NO: 28), in which $X_1$ is E or G; $X_2$ is R or L.

For example, the CTLA4-binding protein may comprise or be an antibody or an antigen binding fragment thereof, and may comprise an antibody heavy chain FR2, the heavy chain FR2 comprises an amino acid sequence as set forth in any one of SEQ ID NO: 22 and SEQ ID NO: 26.

In the present application, the CTLA4-binding protein may comprise or be an antibody or an antigen binding fragment thereof, and may comprise an antibody heavy chain FR3, the heavy chain FR3 comprises an amino acid sequence as set forth in SEQ ID NO: 33. YYADSVKGRFTISRDNX$_1$KNTLX$_2$LQMNSLX$_3$X$_4$EDTAX$_5$YYC, in which $X_1$ is G or S; $X_2$ is F or Y; $X_3$ is K or R; $X_4$ is P or A; $X_5$ is M or V.

For example, the CTLA4-binding protein may comprise or be an antibody or an antigen binding fragment thereof, and may comprise an antibody heavy chain FR3, the heavy chain FR3 comprises an amino acid sequence as set forth in any one of SEQ ID NO: 23 and SEQ ID NO: 35.

In the present application, the CTLA4-binding protein may comprise or be an antibody or an antigen binding fragment thereof, and may comprise an antibody heavy chain FR4, the heavy chain FR4 comprises an amino acid sequence as set forth in SEQ ID NO: 34. WGQGTX$_1$VTVSX$_2$ (SEQ ID NO: 34), in which $X_1$ is Q or L; $X_2$ is S or there are no amino acids.

For example, the CTLA4-binding protein may comprise or be an antibody or an antigen binding fragment thereof, and may comprise an antibody heavy chain FR4, the heavy chain FR4 comprises an amino acid sequence as set forth in any one of SEQ ID NO: 24 and SEQ ID NO: 36.

In the present application, the CTLA4-binding protein may comprise or is an antibody or an antigen binding fragment thereof, and comprises a heavy chain variable region which may comprise an amino acid sequence as set forth in SEQ ID NO: 7.

QVQLVESGGGX$_1$VQX$_2$GGSLRLSCAASX$_3$X$_4$X$_5$NX$_6$X$_7$X$_8$X$_9$MGWFRQAPGKX$_{10}$X$_{11}$ERVAAX$_{12}$X$_{13}$X$_{14}$X$_{15}$GTX$_{16}$X$_{17}$YYADSVKGRFTISRDNX$_{18}$KNTLX$_{19}$LQMNSLX$_{20}$X$_{21}$EDTAX$_{22}$YYCX$_{23}$X$_{24}$X$_{25}$X$_{26}$X$_{27}$X$_{28}$X$_{29}$AWCX$_{30}$RX$_{31}$X$_{32}$X$_{33}$X$_{34}$X$_{35}$X$_{36}$X$_{37}$WGQGTX$_{38}$VTVSX$_{39}$ (SEQ ID NO: 7), in which $X_1$ is S or L; $X_2$ is A or P; $X_{10}$ is E or G; $X_{11}$ is R or L; $X_{18}$ is G or S; $X_{19}$ is F or Y; $X_{20}$ is K or R; $X_{21}$ is P or A; $X_{22}$ is M or V; $X_{38}$ is Q or L; $X_{39}$ is S or there are no amino acids; the remaining X are any amino acids.

In the present application, the CTLA4-binding protein may comprise or is an antibody or an antigen binding fragment thereof, and it comprises an amino acid sequence as set forth in any one of SEQ ID NO: 8 and SEQ ID NOs: 17-20.

In the present application, the CTLA4-binding protein may comprise or is a single-domain antibody or an antigen binding fragment thereof, and it comprises an amino acid sequence as set forth in any one of SEQ ID NO: 8 and SEQ ID NOs: 17-20.

In the present application, the CTLA4-binding protein may comprise or is an antibody 138, the antibody 138 comprises the heavy chain CDR1 to the heavy chain CDR3, in which the heavy chain CDR1 may comprise an amino acid sequence as set forth in SEQ ID NO: 6, the heavy chain CDR2 may comprise an amino acid sequence as set forth in SEQ ID NO: 4, the heavy chain CDR3 may comprise an amino acid sequence as set forth in SEQ ID NO: 2. In the present application, the antibody 138 may comprise a heavy chain variable region which may comprise an amino acid sequence as set forth in SEQ ID NO: 8. In the present application, the antibody 138 may be a single-domain antibody or an antigen binding fragment thereof, which comprises an amino acid sequence as set forth in SEQ ID NO: 8.

In the present application, the CTLA4-binding protein may comprise or is humanized variants of the antibody 138 (hu138V1 to hu138V4). In the present application, the antibody 138 may be a single-domain antibody or an antigen binding fragment thereof, which comprises an amino acid sequence as set forth in any one of SEQ ID NO: 8 and SEQ ID NOs: 17-20.

In the present application, the CTLA4-binding protein may bind to human CTLA4 with a $K_D$ value of $2.6\times10^8$ M or lower (e.g., $2.5 \times 10^8$ M or lower, $2.0 \times 10^8$ M or lower, $1.5 \times 10^8$ M or lower, $1.0 \times 10^8$ M or lower or $0.5 \times 10^8$ M or lower).

In the present application, the CTLA4-binding protein may inhibit the growth of tumor cells.

In the present application, the CTLA4-binding protein may cause a CTLA4 endocytic degradation rate lower than about 50% (e.g., lower than about 45%, lower than about 40%, lower than about 35%, lower than about 30%, lower than about 25%, lower than about 20%, lower than about 15%, lower than about 10%, lower than about 5% or lower) on the 293 cells expressing CTLA4.

In the present application, the CTLA4-binding protein may also comprise an antibody Fc domain. In the present application, the inclusion of an antibody Fc domain in the CTLA4-binding protein may make the CTLA4-binding protein form a dimeric molecule, and at the same time extend the in vivo half-life of the binding protein.

In the present application, the antibody Fc domain may comprise an Fc domain derived from an IgG antibody. For example, the Fc may be derived from different subtypes of immunoglobulin, for example, IgG (e.g., IgG1, IgG2, IgG3 or IgG4 subtypes), IgA1, IgA2, IgD, IgE or IgM. In the present application, mutations may be introduced into the antibody Fc domain to change Fc-mediated related activities. For example, the mutations may be selected from the following group: mutations that change Fc-mediated CDC activities, mutations that change Fc-mediated ADCC activities and mutations that change FcRn-mediated in vivo half-life. In the present application, the mutations may occur in the CH2 region, the CH3 region and/or the hinge region. In the present application, the antibody Fc domain may comprise an amino acid sequence as set forth in SEQ ID NO: 29.

In the present application, the CTLA4-binding protein may comprise the antibody Fc domain and the antibody heavy chain variable region, and the antibody heavy chain variable region is directly or indirectly fused with the antibody Fc domain. For example, the antibody heavy chain variable region may be linked to the antibody Fc domain through a linker. For example, the linker may be a connecting peptide. In the present application, the connecting peptide may be GGGGS, GS or AP.

In the present application, the CTLA4-binding protein may comprise the antibody Fc domain and the antibody heavy chain variable region, and the antibody Fc domain may make the CTLA4-binding protein form a dimeric structure. For example, the dimeric structure may be a homodimer, or alternatively, may be a heterodimer.

For example, the CTLA4-binding protein may comprise the antibody 138 and the antibody Fc domain. For example, the antibody Fc domain may be the Fc domain of a human IgG. In some cases, the CTLA4-binding protein may comprise or may be 138-Fc, in which the Fc domain of the human IgG may be located at the C-terminus of the 138. For example, the 138-Fc may comprise an amino acid sequence as set forth in SEQ ID NO: 9. In some cases, the CTLA4-binding protein may be 138-FcAG, in which the modified Fc domain of the human IgG is located at the C-terminus of the 138.

The pharmaceutically acceptable carrier generally refers to an adjuvant that can be used to prepare a pharmaceutical composition or preparation, and is generally safe, non-toxic, and neither biologically nor otherwise undesirable. The adjuvant used is generally an adjuvant suitable for administration to humans or other mammals. When preparing the composition, the active ingredients are usually mixed with the adjuvant, and diluted or blocked by the adjuvant. When the adjuvant is used as a diluent, it can be a solid, semi-solid or liquid material, which acts as a vehicle, carrier or medium for the active ingredients of the antibody.

The pharmaceutically acceptable carrier may comprise buffers, antioxidants, preservatives, low molecular weight polypeptides, proteins, hydrophilic polymers, amino acids, sugars, chelating agents, counterions, metal complexes, and/or nonionic surfactants, etc. For example, the pharmaceutically acceptable carrier may comprise solvents, dispersion media, coatings, antibacterial and antifungal agents, isotonic agents and/or absorption delaying agents.

In the present application, the pharmaceutical composition may be formulated for oral administration, intravenous administration, intramuscular administration, in situ administration at the tumor site, inhalation, rectal administration, vaginal administration, transdermal administration or administration via subcutaneous reservoir.

The pharmaceutical composition described in the present application may comprise a prophylactically and/or therapeutically effective amount of the CTLA4-binding protein. The prophylactically and/or therapeutically effective amount is a dose required to prevent and/or treat (at least partially treat) a disease or disorder and/or any complications thereof in a subject suffering from or at risk of developing the disease or disorder. "Effective amount" generally refers to an amount that is at least effective to achieve the desired or specified effect (including therapeutic or preventive results) at the required dose and time period.

The pharmaceutical composition may be used to inhibit the tumor growth. For example, the pharmaceutical composition of the present application may inhibit or delay the development or progression of the disease, may reduce the tumor size (or even substantially eliminate the tumor), and/or may alleviate and/or stabilize the disease state. The actual dose level of the CTLA4 binding protein in the pharmaceutical composition may vary, and this amount is effective to obtain the desired therapeutic response for the specific subject, pharmaceutical composition and mode of administration.

In another aspect, the present application provides a use of the pharmaceutical composition in the preparation of a medicament for treating a tumor.

In the present application, the tumor may be a solid tumor. In some embodiments, the tumor may be selected from: colon cancer and melanoma.

In the present application, the colon cancer may comprise colorectal cancer.

In another aspect, the present application provides the CTLA4-binding protein or the pharmaceutical composition described in the present application, which is used for treating a tumor.

In another aspect, the present application provides a method for treating a tumor, comprising the following step: administering to a subject in need thereof the CTLA4-binding protein described in the present application or the pharmaceutical composition described in the present application.

In the present application, the method may be an in vivo and/or in vitro method.

In the present application, the method may improve the immune response of the subject. For example, the PBMC activation of the subject may be stimulated, and/or, the release of cytokines (e.g., IL-2) can be stimulated.

In the present application, the subject may comprise human and non-human animals. For example, the non-human animals may comprise mammals. For example, the subject may be selected from human and monkey.

Without intending to be limited by any theory, the following embodiments are only to illustrate the working modes of the device, method, and system of the present application, and are not used to limit the inventive scope of the present application.

EXAMPLES

Example 1: Preparation of CTLA4-Binding Protein

According to the method described in CN107400166A, an anti-CTLA4 single-domain antibody 138 was expressed recombinantly, of which CDR1, CDR2 and CDR3 comprise an amino acid sequence as set forth in SEQ ID NO: 6, SEQ ID NO: 4 and SEQ ID NO: 2, respectively. The amino acid sequence of the 138 antibody is as set forth in SEQ ID NO: 8.

The amino acid sequence of the heavy chain variable region of the 138 antibody is as set forth in SEQ ID NO: 8. This protein is also referred as KN138 in the present application.

According to the amino acid sequence (P01857) of the constant region of human immunoglobulin γ1 (IgG1) on the protein database Uniprot, the amino acid sequence (SEQ ID NO: 10) of the human IgG1-Fc region was obtained. By reverse transcription PCR, a nucleic acid fragment encoding human IgG1-Fc was obtained from the total RNA of human PBMC, and then a nucleic acid fragment encoding the fusion protein 138-Fc of 138 and Fc was obtained by overlap PCR. The nucleic acid fragments were then subcloned onto a vector pCDNA4 (Invitrogen, Cat V86220). The recombinantly constructed 138-Fc plasmid was transfected into HEK293 cells for antibody expression. The recombinantly expressed plasmid was diluted with Freestyle293 medium and added into a PEI (Polyethylenimine) solution required for transformation. Each group of plasmid/PEI mixture was added into a suspension of HEK293 cells respectively, and cultured at 37° C., 10% $CO_2$, 90 rpm; and at the same time, 50 μg/L of IGF-1 was supplemented. Four hours later, an EX293 medium, 2 mM glutamine and 50 μg/L of IGF-1 were further supplemented, and cultured at 135 rpm. 3.8 mM VPA was added after 24 hours. After culturing for 5 to 6 days, the transiently expressed culture supernatant was collected and purified by Protein A affinity chromatography to get 138-Fc (this protein is also referred as KN138-Fc in the present application). The amino acid sequence of 138-Fc was set forth in SEQ ID NO: 9.

The 138-Fc was mutated in the Fc region of human immunoglobulin according to the method documented in CN107849130A and/or WO2017/020802 to remove the ADCC and CDC activities of the Fc region (the amino acid sequence of the Fc region can be seen in WO2017/020802, and shown in SEQ ID NO: 29 in the present application), thus preparing the 138-FcAG.

The anti-CTLA4 single-domain antibody KN044 was expressed recombinantly according to the method described in CN107400166A, whose amino acid sequence was as set forth in SEQ ID NO: 11.

The anti-CTLA4 antibody ipilimumab was expressed recombinantly according to the method described in CN107400166A. Briefly, the antibody gene was cloned into a vector pCDNA4 according to the preparation method of the antibody 10D1 documented in US20020086041A1. The recombinantly constructed plasmid was expressed by transiently transfecting HEK293 cells, and the resulted CTLA4 antibody was renamed as 10D1 (in the present application, 10D1 may be used interchangeably with ipilimumab).

Ipilimumab was prepared into ipilimumab-AG according to the method documented in CN107849130A. Where, the amino acid sequence of the heavy chain of ipilimumab-AG was as set forth in SEQ ID NO: 12; and the amino acid sequence of the light chain of ipilimumab-AG was as set forth in SEQ ID NO: 13.

Example 2: Ability of CTLA4-Binding Protein for Binding to CTLA4

2.1. Using Bio-Layer Interferometry (BLI) Method

The binding ability of the 138-Fc prepared in Example 1 to the recombinant human CTLA4 was detected through bio-layer interferometry (BLI). An Octet K2 instrument was used for measurement. A recombinant camel anti-human Fc antibody was firstly immobilized onto an AHC biosensor. Then the fusion protein CTLA4-muFc (SEQ ID NO: 14) of human CTLA4 (SEQ ID NO: 13) and mouse Fc was diluted gradiently, samples were injected for 150 s, the dissociation time was 900 s, and 10 mM glycine-HCl (pH 1.7) was regenerated for 5 s. A simple one-to-one Languir binding model (Octet K2 data analysis software v9.0 (Data analysis 9.0)) was used to calculate the binding rate (kon) and the dissociation rate (Kdis). The equilibrium dissociation constant (kD) was calculated as the ratio of kdis/kon. The determination results of affinity were shown in Table 1 and FIG. 1.

TABLE 1

|  | $K_D$ (M) | Kon (1/Ms) | Kdis (1/s) |
| --- | --- | --- | --- |
| 138-Fc | $2.53*10^{-8}$ | $2.00*10^5$ | $5.06*10^{-3}$ |

2.2. Binding to CTLA4 on the Cell Surface

Human HEK293-CTLA4 cells comprising a plasmid containing the full-length gene of human CTLA4 protein were obtained by transient transfection to express the human CTLA4 on the membrane transiently.

3% of BSA/PBS was used to adjust the density of HEK293-CTLA4 cells to $3\times10^6$ cells/ml. The KN044 or 138-Fc prepared in Example 1 was diluted with 3% of BSA/PBS to obtain different concentrations (1000 nM, 250.00 nM, 62.50 nM, 15.63 nM, 3.91 nM, 0.98 nM, 0.24 nM, 0.06 nM, 0.02 nM). 3 μg/mL of CTLA4-muFc was formulated with 3% of BSA/PBS.

Into a 1.5 ml centrifuge tube were respectively added 50 μl cell suspension, 50 μl CTLA4-muFC, 50 μl different concentrations of KN044 or 138-Fc, and placed on ice for 30 min. Then, APC-goat anti-mouse IgG at a dilution of 1:100 was used, and placed on ice for 30 min for reaction. After that, they were washed with 1% of BSA/PBS and resuspended, and then detected on a FACS machine (using a Guava EasyCyte instrument).

The flow cytometry results were analyzed by Guava 5.3.1 to calculate the mean fluorescence intensity (MFI) of the detected samples. The log values of the obtained MFI versus the concentrations of the samples were calculated, and the experimental results were fit with four parameters using GraphPad Prism 6.0.

Figure 2:
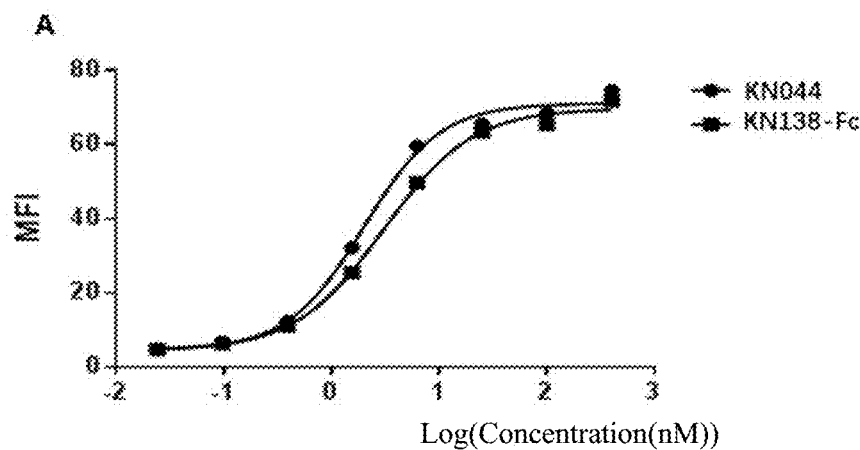
FIG. 2 shows the effect of the CTLA4-binding protein described in the present application binding to CTLA4 on the cell surface.

The results were shown in FIG. 2 and Table 2. Both 138-Fc and KN044 can bind to human CTLA4 expressed on the surface of cells in a concentration-dependent manner.

The EC50 value of 138-Fc was slightly higher than that of KN044, indicating that its binding was slightly lower than that of KN044.

TABLE 2

|  | 138-Fc | KN044 |
|---|---|---|
| EC50 | 3.054 nM | 2.014 nM |

Example 3: Blocking Effect of CTLA4-Binding Protein on Interaction of CTLA4 and its Ligand 3.1. Competitive ELISA Method CB 3% BSA was added into the wells in which the concentration of CTLA4-Fc (whose amino acid sequence was set forth in SEQ ID NO: 16) was 3 μg/well, the plate was coated at room temperature for 2 hours, and then the 138-Fc prepared in Example 1 or ipilimumab was added (as the positive control). Samples were diluted in buffer A and then incubated at 25° C. for 2 hours.

Buffer A comprises 1% of BSA, 0.05% of PBST20 and 50 ng/mL of CD80-muFc (a fusion protein of human CD80 protein and mouse Fc fragment, its amino acid sequence was as set forth in SEQ ID NO: 30) or CD86-muFc (a fusion protein of human CD86 protein and mouse Fc fragment, its amino acid sequence was as set forth in SEQ ID NO: 31). Goat anti-mouse IgG1-HRP (Thermo) was further added, which was diluted in a buffer B (the buffer B comprised 1% of BSA and 0.05% of PBST20) at a ratio of 1:3000, and the absorbance value was read at a wavelength of 405 nm.

Figure 3:
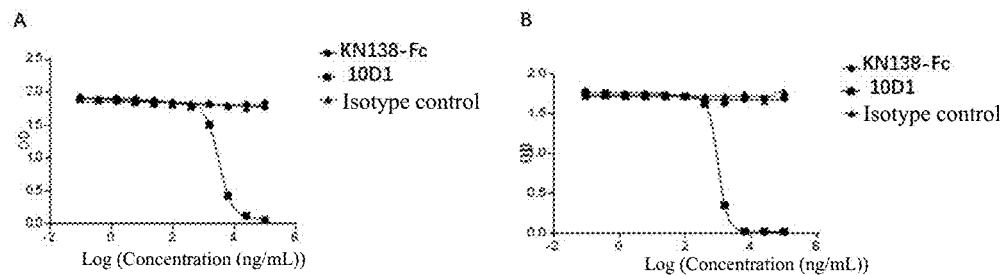
FIGS. 3A-3B show the blocking effect of the CTLA4-binding protein described in the present application on the binding of CTLA4 to its ligand on the cell surface.

The software SoftMax Pro v5.4 was used for data processing and graphic analysis, and a blocking curve of 138-Fc to CTLA4-CD80 was obtained through four-parameter fitting. The results were seen in FIGS. 3A-3B, from which it was indicated that 138-Fc did not block the interaction of CTLA4-CD80 (FIG. 3A) or CTLA4-CD86 (FIG. 3B).

3.2. Bio-Layer Interferometry (BLI) Method

The instrument required for the experiment is Octet K2, the sensor is AMC biosensor (ForteBio®, 18-5088), and the reagents comprise PBST (weighing 8 g NaCl, 0.2 g KCl, 1.44 g $Na_2HPO_4$ and 0.24 g $KH_2PO_4$, dissolving in 800 ml ultrapure water, adding 0.5 ml TWEEN®20, mixing evenly and then metering to 1 L).

Figure 4:
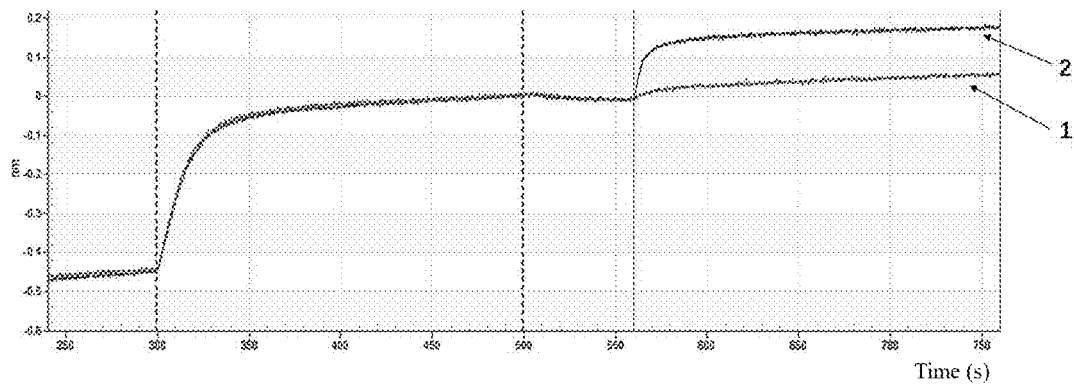
FIG. 4 shows the blocking effect of the CTLA4-binding protein described in the present application on the binding of CTLA4 to CD80.

The fusion protein CTLA4-muFc of human CTLA4 and mouse Fc (whose amino acid sequence was as set forth in SEQ ID NO: 15) was immobilized on a probe, in which the first protein P1 (138-Fc prepared in Example 1) was bound first, and then the second protein P2 (138-Fc prepared in Example 1) was bound (the results were shown in curve 1 of FIG. 4); or, the first protein P1 (138-Fc prepared in Example 1) was bound first, and then the second protein P2 (CD80-Fc, self-prepared, a fusion protein of human CD80 protein and human Fc protein, whose amino acid sequence was set forth in SEQ ID NO: 32) was bound (the results were shown in curve 2 of FIG. 4). The results in FIG. 4 indicate that CD80-Fc can still fully bind to CTLA4 protein even when 138-Fc has been bound, so it can be judged that 138-Fc does not compete with CD80 for binding to CTLA4.

3.3. Competitive Experiment Between CTLA4-Binding Protein and Cell Expression Protein HEK293 cells were transiently transfected with a plasmid containing a human CTLA4 full-length gene or a plasmid containing a human CD86 protein full-length gene, to obtain HEK293-CTLA4 cells and HEK293-CD86 cells respectively. HEK293-CTLA4 cells and HEK293-CD86 cells transiently express human CTLA4 or human CD86 on the membrane, respectively.

3% of BSA/PBS was used to adjust the density of HEK293-CTLA4 cells and HEK293-CD86 cells to $3 \times 10^6$ cells/ml. The KN044 or 138-Fc prepared in Example 1 was diluted with 3% of BSA/PBS to obtain different concentrations (1000 nM, 250.00 nM, 62.50 nM, 15.63 nM, 3.91 nM, 0.98 nM, 0.24 nM, 0.06 nM, 0.02 nM). 3 μg/mL of CTLA4-muFc was formulated with 3% of BSA/PBS. 4.8 μg/mL of CD86-muFc was formulated with 3% of BSA/PBS.

According to different experiment requirements, into a 1.5 ml centrifuge tube were added the following components, respectively:

Competitive experiment with HEK293-CTLA4/CD86-muFc: 50 μl HEK293-CTLA4 cell suspension, 50 μl CD86-muFC, 50 μl different concentrations of KN044 or 138-Fc, placing on ice for 30 min.

Competitive experiment with HEK293-CD86/CTLA4-muFc: 50 μl HEK293-CD86 cell suspension, 50 μl CTLA4-muFC, 50 μl different concentrations of KN044 or 138-Fc, placing on ice for 30 min.

Then, APC-goat anti-mouse IgG at a dilution of 1:100 was used, and placed on ice for 30 min for reaction. They were washed with 1% of BSA/PBS and resuspended, and then detected on a FACS machine (using a Guava EasyCyte instrument).

The flow cytometry results were analyzed by Guava 5.3.1 to calculate the mean fluorescence intensity (MFI) of the detected samples. The log values of MFI versus the concentrations of the samples were calculated, and the experimental results were fit with four parameters using GraphPad Prism 6.0.

Figure 5:
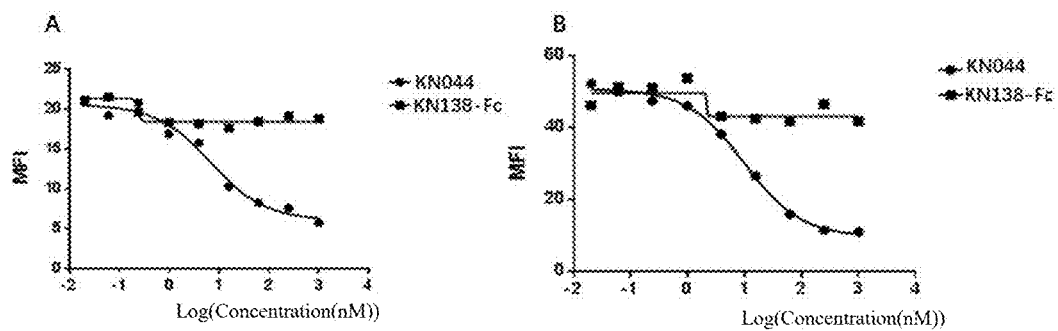
FIGS. 5A-5B show the blocking effect of the CTLA4-binding protein described in the present application on the binding of CTLA4 to its ligand.

The experimental results are shown in FIGS. 5A-5B. The results indicate that 138-Fc does not block the interaction of CTLA4-CD80 or CTLA4-CD86.

3.4. Blocking Effect of CTLA4-Binding Protein on the Mutual Binding of Cell-Expressed CTLA4 and its Ligand Human HEK293 cells were transiently transfected with a plasmid containing human hCTLA4-RFP protein gene or a plasmid containing B7-1-GFP protein gene (pCDNA4, invitrogen, Cat V86220), to obtain transfected cell lines 293-hCTLA4-RFP and 293-B7-1-GFP respectively, so as to transiently express human hCTLA4-RFP protein or B7-1-GFP protein on the membrane respectively. Since the C-terminus of B7-1 (i.e., CD80) in the B7-1-GFP protein is fused with EGFP protein, the C-terminus of human CTLA4 in the human hCTLA4-RFP protein is fused with RFP protein, the expression level of B7-1 protein on the membrane can be investigated by the green fluorescence intensity, and the expression of CTLA4 protein on the membrane can be investigated by the red fluorescence intensity. The expression of fluorescence was detected after 24 hours, with the results shown in FIG. 6A.

Into the cell suspension of cell lines 293-hCTLA4-RFP were added 100 nM different antibodies respectively (138-Fc, at the same time, setting hIgG1 that does not bind to human CTLA4 protein as the negative control, and ipilimumab as the positive control), and incubated for 5 min. B7-1-GFP cells of equal number of cells were then added, mixed evenly and incubated for 5 min. After then, the aggregation of cells was observed with a fluorescence microscope, with the results shown in FIG. 6B. It was found from the results that, the addition of 138-Fc did not affect the interaction between 293-hCTLA4-RFP and 293-B7-1-GFP. On the contrary, ipilimumab would block the interaction between the two kinds of cells.

The expression of 293-hCTLA4-RFP and 293-B7-1-GFP cells was detected by flow cytometry, respectively. 293-B7-1-GFP: 293-hCTLA4-RFP was mixed at a cell number ratio of 5:1, incubated for 5 min and detected by flow cytometry. The results were shown in FIG. 6C.

Into the cell suspension of cell lines 293-hCTLA4-RFP were added 100 nM different antibodies (138-Fc, at the same time, setting hIgG1 as the negative control, and Ipilimumab as the positive control), and incubated for 5 min. 293-B7-1-GFP cells of 5 times the number of 293-hCTLA4-RFP cells were then added, mixed evenly and incubated for 5 min. After then, the aggregation of cells was detected by flow cytometry, with the results shown in FIG. 6D. It was found from the results that, 138-Fc did not block the interaction between CTLA4 and its ligand. On the contrary, ipilimumab would block the interaction between CTLA4 and its ligand.

Into the cell suspension of cell lines 293-hCTLA4-RFP were added different concentrations (0 nM, 0.16 nM, 0.32 nM, 0.64 nM, 1.28 nM, 2.56 nM, 5.12 nM, 10.24 nM, 20.48 nM, 40.96 nM, 81.92 nM, 163.84 nM) of different antibodies (138-Fc, at the same time, setting hIgG1 as the negative control, and ipilimumab as the positive control), and incubated for 5 min. 293-B7-1-GFP cells of 5 times the number of 293-hCTLA4-RFP cells were then added, mixed evenly and incubated for 5 min. After then, the aggregation of cells was detected by flow cytometry. The binding degrees of 293-hCTLA4-RFP cells to 293-B7-1-GFP cells for different antibodies at different doses were calculated.

Where, binding degree=[RFP$^+$GFP$^+$/(RFP$^+$GFP$^+$+RFP$^+$GFP$^-$)]*100%.

Figure 6:
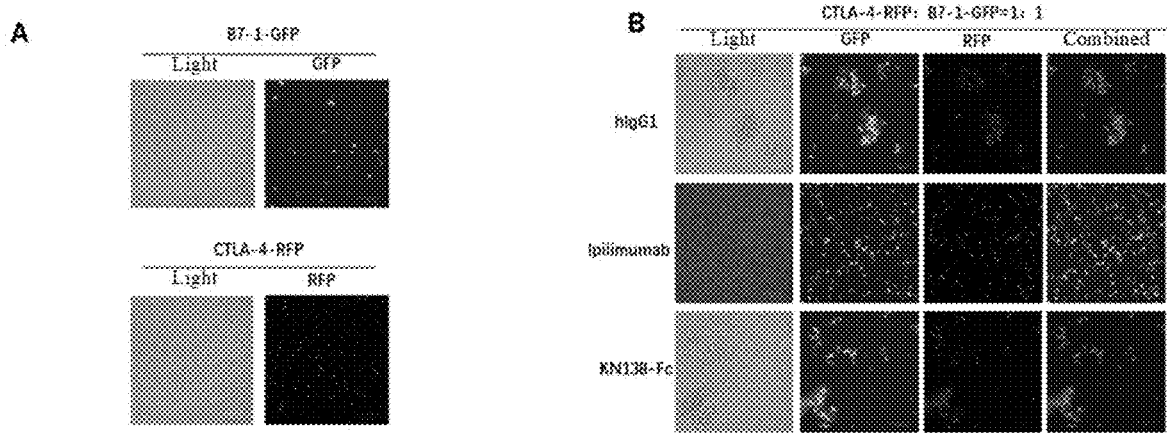
FIGS. 6A-6E show the results of the CTLA4-binding protein described in the present application competing with B7-1 for binding to human CTLA4.

The results were shown in FIG. 6E. It can be known from the results that the administration of ipilimumab would reduce the binding degree of 293-hCTLA4-RFP cells to 293-B7-1-GFP cells, while 138-Fc had no effect on these two types of cells. It can be seen that 138-Fc did not block the interaction of CTLA4 and its ligand.

Example 4: Species-Specificity of CTLA4-Binding Protein 4.1. Binding to CTLA4 of Human, Monkey, Rat Monkey CTLA4 protein and rat CTLA4 protein were purchased from Sino Biological Inc. Monkey CTLA4 protein, rat CTLA4 protein or human CTLA4 protein was coated on the plates at 0.5 μg/well at 4° C. overnight, and a serial dilution of 138-Fc prepared in Example 1 was then added and reacted at room temperature for 2 hours. Goat anti-human IgG-HRP (purchased from Sigma Co.) was additionally added and reacted at room temperature for 2 hours. A color developing solution was then added, and the absorbance value was read at a wavelength of 405 nm.

The software SoftMax Pro v5.4 was used for data processing and graphic analysis. A binding curve of 138-Fc to monkey, rat or human CTLA4 and the EC50 values were obtained through four-parameter fitting to reflect its affinity for CTLA4.

Figure 7A:
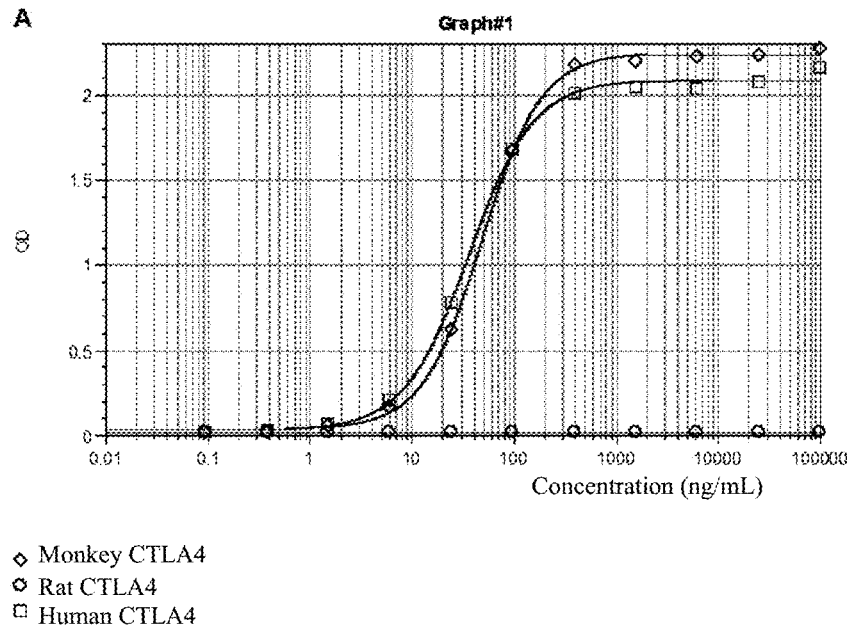
FIGS. 7A-7B show the species specificity of the CTLA4-binding protein described in the present application binding to CTLA4.

The results were shown in FIG. 7A, in which the vertical ordinate indicated OD$_{405}$, and the horizontal ordinate indicated the concentration of 138-Fc (in ng/ml). The results indicated that, 138-Fc can effectively bind to human or monkey CTLA4 protein, but did not bind to rat CTLA4 protein.

4.2. Binding to Mouse CTLA4

A biotinylation kit from Thermo Co. was used to get a biotinylated mouse CTLA4 protein, mCTLA-biotin.

The 138-Fc protein prepared in Example 1 was coated on the plates at 0.5 μg/well at 4° C. overnight, and a serial dilution of mCTLA4-biotin was then added and reacted at room temperature for 2 hours. SA-HRP (purchased from Sigma Co.) was then added and reacted at room temperature for 1.5 hours. A color developing solution was added, and the absorbance value was read at a wavelength of 405 nm.

The software SoftMax Pro v5.4 was used for data processing and graphic analysis. A binding curve of 138-Fc to monkey, rat or human CTLA4 and the EC50 values were obtained through four-parameter fitting to reflect its affinity for CTLA4.

Figure 7B:
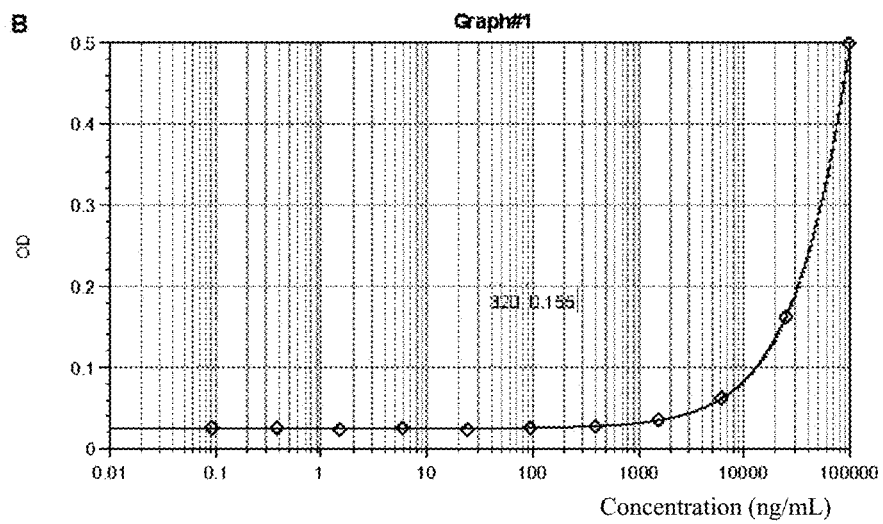

The results were shown in FIG. 7B, in which the vertical ordinate indicated OD$_{405}$, and the horizontal ordinate indicated the concentration of 138-Fc (in ng/ml). The results indicated that, the binding of 138-Fc to mouse CTLA4 protein was weak.

Example 5: Activation of CTLA4-Binding Protein on SEB-Stimulated PBMC

Peripheral blood mononuclear cells (PBMC) were separated from the concentrated leukocytes from peripheral blood of healthy donors by using the density gradient centrifugation of human lymphocyte separation solution (Tianjin Haoyang).

Staphylococcal enterotoxin B (SEB) is a superantigen, which can effectively stimulate host immune responses by directly binding to the major histocompatibility complex (MHC) class II molecules on the antigen presenting cells and the specific Vβ regions of the T cell receptors, which in turn induces the release of multiple types of cytokines. The human PBMC system stimulated by SEB can be used to evaluate CTLA4 binding protein to promote the activation of PBMC and stimulate the release of cytokine IL-2. PBMC was plated on a 96-well plate at $2 \times 10^5$ cells/well. The 138-Fc prepared in Example 1 as well as the positive control antibody KN044 were added at the same time. The group with PBS only was used as the negative control (marked as SEB only). After reacting for 60 min, SEB was added and co-cultivated for 5 days. The IL-2 content in the supernatant was then detected by Elisa.

Figure 8:
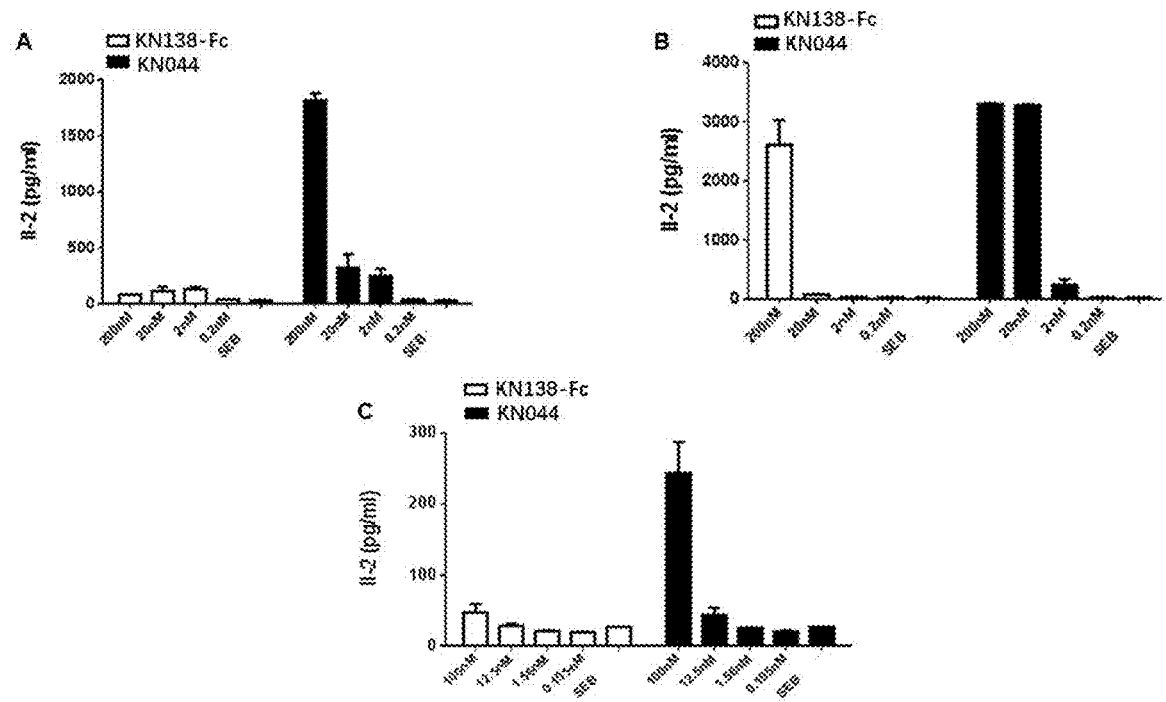
FIGS. 8A-8C show the activation effect of the CTLA4-binding protein described in the present application to PBMC.

The experimental results were shown in FIGS. 8A-8C. The results showed that: under the stimulation of the superantigen SEB (200 ng/ml), in the PBMC systems derived from three different individuals, one system of 138-Fc can obviously stimulate PBMC to secrete IL-2 at a high concentration (200 nM), a certain amount of IL-2 secretion could also be observed for another system at a high concentration (100 nM), but for the last system, no IL-2 secretion could be observed at the concentration range of 0.2-200 nM. However, the positive control KN044 antibody in the three systems all could stimulate human PBMC to secrete IL-2 in a dose-dependent manner. Thus it can be seen that, 138-Fc could activate SEB-stimulated PBMC in vitro, but its activation effect was weaker than that of the CTLA4 binding protein KN044 which has blocking activities.

Example 6: Anti-Tumor Effect of CTLA4-Binding Protein in Humanized Mice 6.1. Anti-Tumor Effect in a Tumor-Bearing Mouse Model CTLA4 humanized mice (that is, the mice express CTLA4 protein of human) were inoculated with $5*10^5$ MC38 tumor cells.

On days 7, 10, 13, 16 after inoculation, 100 μg of the test sample or an equal amount of human immunoglobulin (calculated according to the mouse body weight of about 20 g, and the administration dosage of about 5 mg/kg) was respectively administered intraperitoneally as a control group. From the 7th day after inoculation, the tumor size was measured every 3 days until the 28th day. The samples investigated comprise different doses (nM) of 138-Fc prepared in Example 1, the marketed CTLA4 monoclonal antibody drug ipilimumab (abbreviation: 1pilim) from BMS, and the group of human immunoglobulin (abbreviation: hIg) was used as the negative control. There are 5 mice for each treatment.

Figure 9:
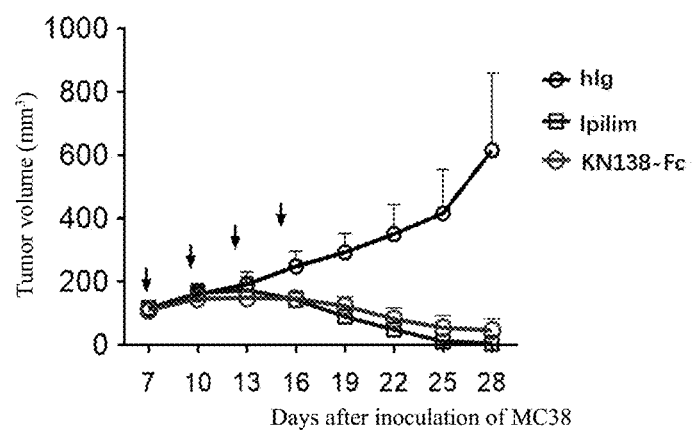
FIG. 9 shows the anti-tumor effect of the CTLA4-binding protein described in the present application in mice.

The results were shown in FIG. 9, in which hIg was human immunoglobulin IgG1, and 1pilim was ipilimumab. The results indicated that, at a dose of about 5 mg/kg, the anti-tumor effect of 138-Fc prepared in Example 1 in CTLA4 humanized mice was comparable to that of ipilimumab of BMS.

6.2. Rechallenge of Anti-Tumor Effect in a Tumor-Bearing Mouse Model

On the 100th day after the first inoculation of tumor cells, the CTLA4 humanized mice (that is, the mice express CTLA4 protein of human) with tumor regression after treatment with ipilimumab or the 138-Fc antibody prepared in Example 1 in Example 6.1 were reinjected subcutaneously with $5*10^5$ MC38 at a different location from the previous tumor, to obtain rechallenge mouse models. At the same time, non-experimented CTLA4 humanized mice were inoculated with $5*10^5$ MC38 tumor cells at the same time to construct MC38 tumor models as a negative control.

From the 7th day after inoculation, the tumor size was measured every 3 days until the 28th day.

Figure 10:
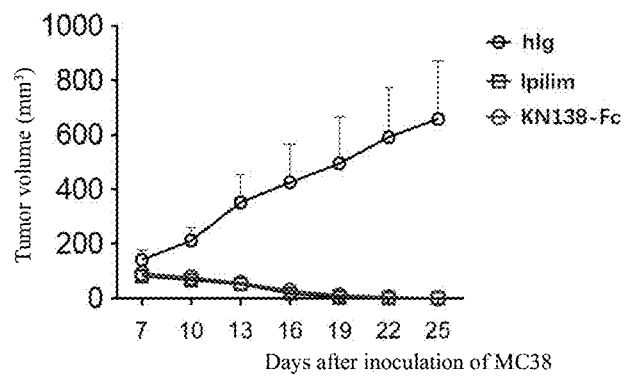
FIG. 10 shows the effect of the CTLA4-binding protein described in the present application in inhibiting tumor recurrence in mice.

The results were shown in FIG. 10, in which hIg was human immunoglobulin IgG1, and 1pilim was ipilimumab. The results indicated that, mice with tumor regression after treatment with 138-Fc still maintained a good anti-tumor effect after re-implantation of the tumor, and the anti-tumor effect was equivalent to that of the ipilimumab administration group after re-implantation of the tumor.

6.3. Anti-Tumor Effect in a Tumor-Bearing Mouse Model 6-8-week-old female CTLA4 humanized mice (that is, the mice express CTLA4 protein of human) were subcutaneously injected with $1*10^6$ MC38 tumor cells.

On days 0, 3, 6, 9 after subcutaneous inoculation of tumors, each mouse was intraperitoneally injected with 0.8 mpk of human IgG, ipilimumab, ipilimumab-AG, or 0.5 mpk of 138-Fc, 138-FcAG prepared in Example 1. The tumor volume was measured on days 9, 12, 16, 19 after inoculation of tumors.

Figure 11:
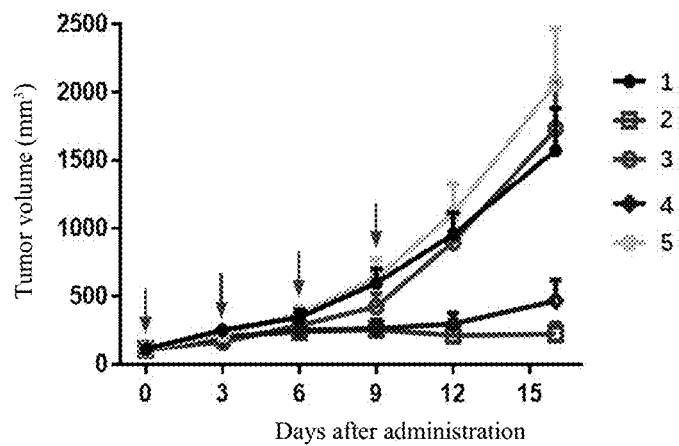
FIG. 11 shows the anti-tumor effect of the CTLA4-binding protein described in the present application in mice.

The results were shown in FIG. 11, showing the changes in tumor volume corresponding to human IgG, ipilimumab, ipilimumab-AG, 138-Fc and 138-FcAG treatments. Where, groups 1-5 respectively showed the tumor inhibition effects corresponding to the above human IgG control group (at a dose of 0.8 mpk, twice a week), ipilimumab (at a dose of 0.8 mpk, twice a week), ipilimumab-AG (at a dose of 0.8 mpk, twice a week), 138-Fc (at a dose of 0.5 mpk, twice a week), 138-FcAG (at a dose of 0.5 mpk, twice a week) treatments in turn. The results indicated that the anti-tumor effect of 138-Fc was comparable to that of ipilimumab. However, the antibody whose ADCC activity has been removed, 138-FcAG as well as ipilimumab-AG substantially did not show the effect of inhibiting the tumor growth at the experimental administration dosages.

6.4. Immune Cell Analysis in Tumor Microenvironment in a Tumor-Bearing Mouse Model 6-8-week-old female CTLA4 humanized mice (that is, the mice express CTLA4 protein of human) were subcutaneously injected with $1*10^6$ MC38 tumor cells.

On days 0, 3, 6, 9 after subcutaneous injection, each mouse was intraperitoneally injected with 0.8 mpk of human IgG, ipilimumab, ipilimumab-AG, or 0.5 mpk of 138-Fc, 138-FcAG prepared in Example 1.

Figure 12:
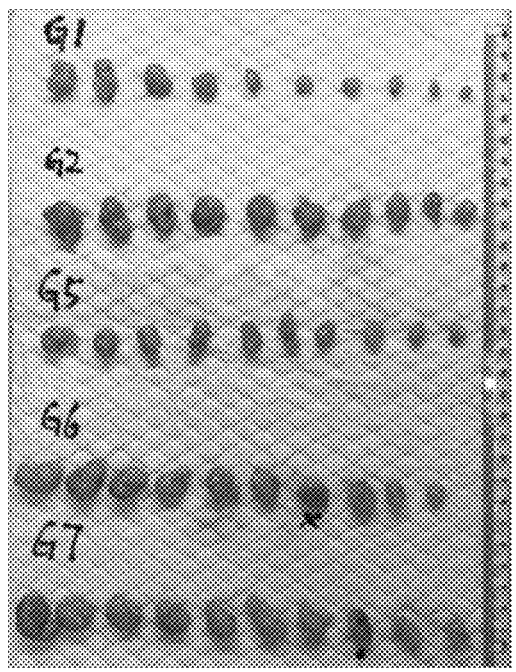
FIG. 12 shows the anti-tumor effect of the CTLA4-binding protein described in the present application.

The mice were sacrificed on the 11th day and the tumors were taken out. The corresponding tumors of each group of mice were shown in FIG. 12. In the figure, G1, G2, G5, G6 and G7 sequentially represented the tumor morphology corresponding to the above ipilimumab, ipilimumab-AG, 138-Fc, 138-FcAG and human IgG treatments.

After the tumors were crushed and the immune cells were separated, they were stained with CD4, CD8, FOXP3 biomarkers, and the cells with different staining conditions are typed by flow cytometry. The results were shown in FIGS. 13A-13C.

Figure 13:
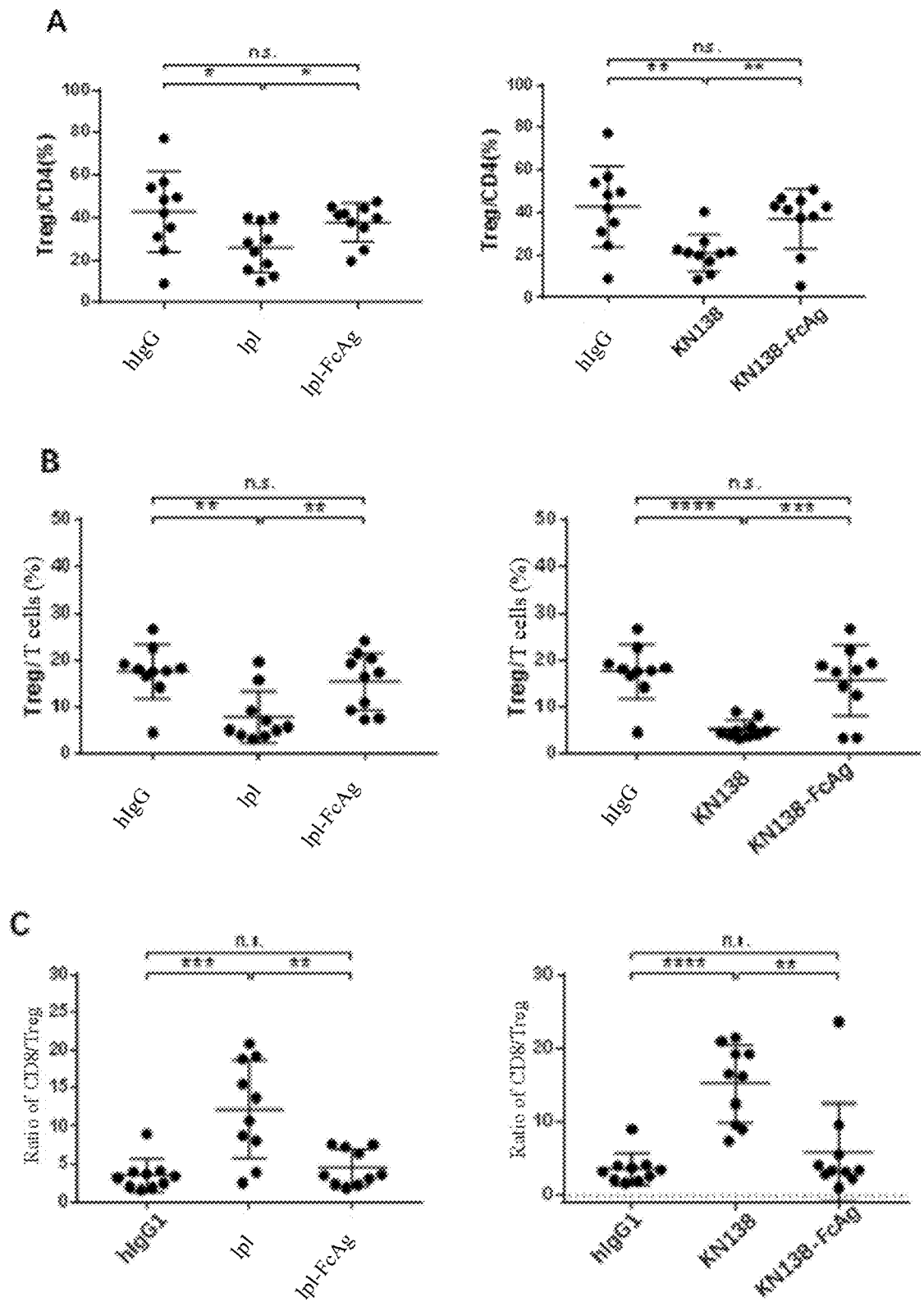
FIGS. 13A-13C show the effect of the CTLA4-binding protein described in the present application on the proportion of T cell population.

It can be seen from the results in FIGS. 13A-13C that, in mice administered with 138-Fc as well as ipilimumab, the proportion of the regulatory T cells (Treg, inhibitory T cells, displayed as FOXP3 positive, CD4 positive) in all of the CD4 positive T cells, or its proportion in all of the T cells was significantly reduced relative to that of the negative control group (hIgG group), while the proportion of Treg in the administration group of 138-FcAG without the ADCC activity and ipilimumab-AG (i.e., 1pl-FcAg) had no difference from that of the negative control group. At the same time, in mice administerd with 138-Fc and ipilimumab, the ratio of CD8 positive T cells (usually specifically activated killing T cells) to regulatory T cells (Treg, inhibitory T cells, displayed as FOXP3 positive, CD4 positive) was significantly increased relative to those in the negative control group (hIgG group) as well as the administration group of 138-FcAG without the ADCC activity (also indicated as 138-FcAg) and ipilimumab-AG (i.e., 1pl-FcAg). However, the proportion of CD8 positive T cells in the administration group of drug without the ADCC activity had no difference from that of the negative control group.

The above results indicated that, the CTLA4 binding antibody 138-FcAG without blocking activity showed a comparable anti-tumor effect to that of ipilimumab with blocking activity in a mouse tumor model. Meanwhile, like ipilimumab, it can also reduce the proportion of Treg in the tumor and increase the proportion of CD8 positive T cells. The above effects are associated with Fc-mediated ADCC activity.

Example 7: Crystal Structure

Figure 14:
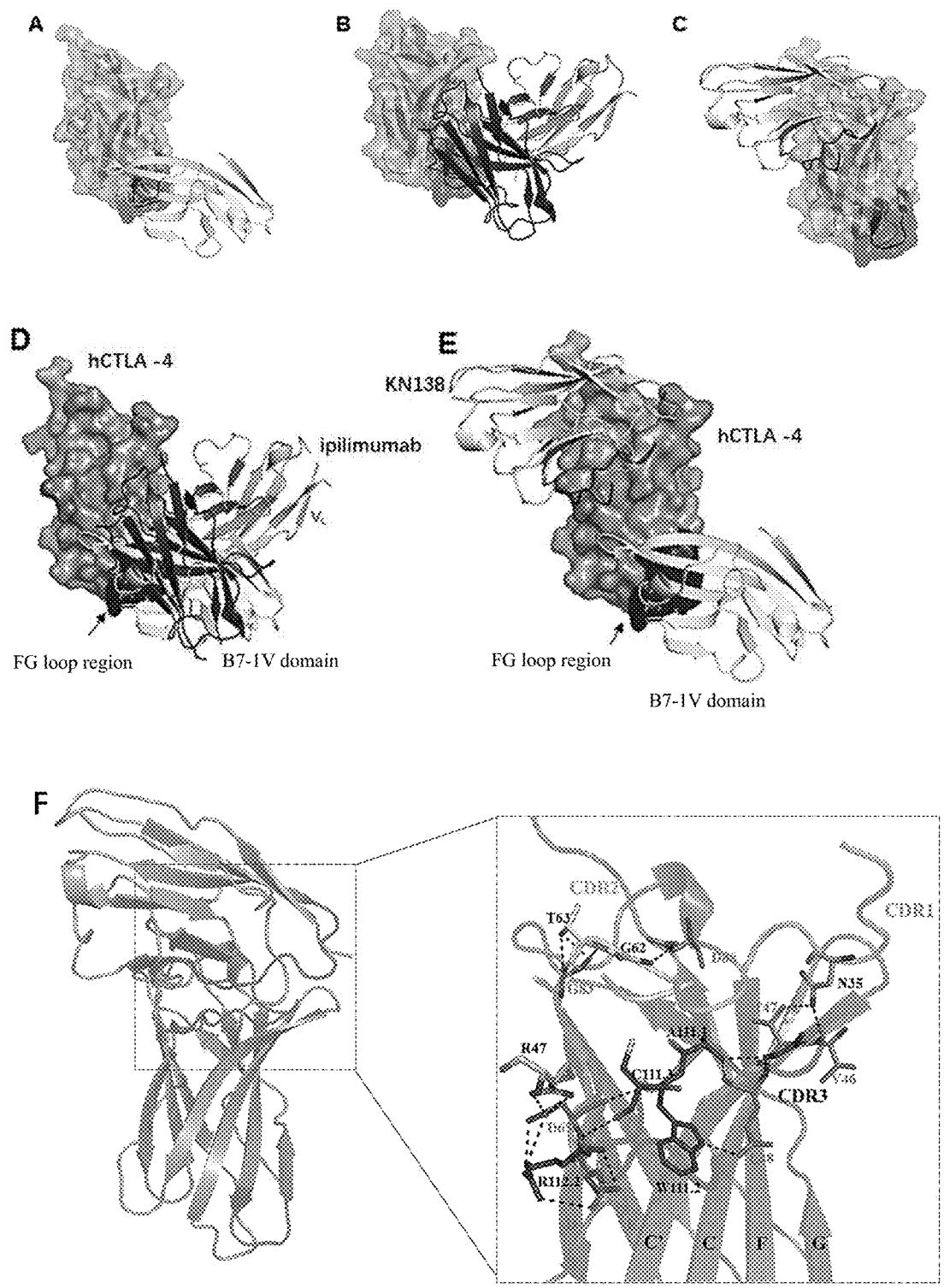
FIGS. 14A-14F show the binding of the CTLA4-binding protein described in the present application to human CTLA4.

FIGS. 14A-14F show the relative positions of 138 antibody, 10D1 (ipilimumab), and B7-1 binding to human CTLA4, respectively. Where, FIG. 14A shows the complex structure of human CTLA4/B7-1; FIG. 14B shows the complex structure of human CTLA4/ipilimumab; FIG. 14C shows the complex structure of human CTLA4/138 antibody; FIG. 14D shows the superimposition of human CTLA4/ipilimumab and human CTLA4/B7-1 complex with human CTLA4 as the center, showing the relative positions of ipilimumab and B7-1 binding to human CTLA4; FIG. 14E shows the superimposition of human CTLA4/138 antibody and human CTLA4/B 7-1 complex with human CTLA4 as the center, showing the relative positions of 138 antibody and B7-1 binding to human CTLA4; FIG. 14F shows a detailed drawing of the interaction of human CTLA4/138 antibody complex, and identifies important amino acid residue sites on CDR1-3.

Figure 15:
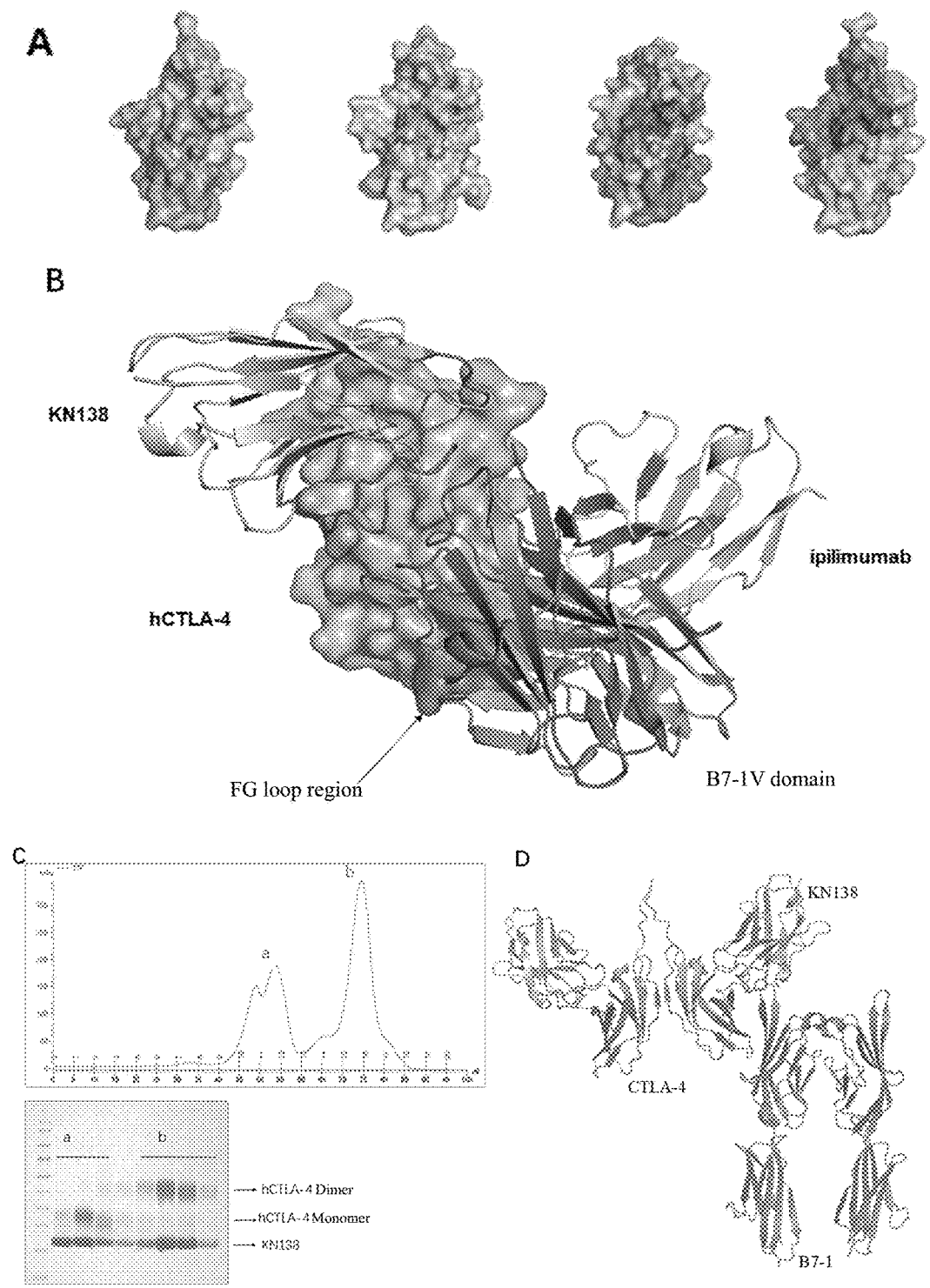
FIGS. 15A-15D show the structure of a complex formed by binding the CTLA4-binding protein described in the present application to human CTLA4.

FIG. 15A shows the structures of human CTLA4/B7-1 complex, human CTLA4/tremelimumab complex, human CTLA4/ipilimumab complex and CTLA4/138 complex in turn from left to right. FIG. 15B shows the structure of a complex superimposing different antibodies binding to human CTLA4, with human CTLA4 as the center. FIG. 15C shows the purification diagram of the monomeric and dimeric human CTLA4 forming a complex with 138 respectively, in which shows the situation of the complex formed by monomeric human CTLA4 and 138; b shows the situation of the complex formed by dimeric human CTLA4 and 138. FIG. 15D shows the mode of the dimeric human CTLA4 on the cell membrane surface binding to B7-1 on another cell membrane as well as 138.

The crystal structure of the human CTLA4/138 antibody complex is specifically shown in Table 3.

TABLE 3

| Data collection: | |
|---|---|
| Beamline | SSRF 17U1 |
| Space group | C121 |
| Cell dimensions: | |
| a, b, c (Å) | 309.98, 75.708, 83.047 |
| α, β, γ (°) | 90, 100.05, 90 |
| Wavelength (Å) | 0.9792 |
| Resolution (Å) | 50-3.25 (3.37-3.25) |
| Total NO. of observation | 140556 (27487) |
| Total NO. unique | 30159 (1926) |
| $R_{merge}$ | 0.15 (0.72) |
| I/σI | 8.0 (3.0) |
| Completeness (%) | 100 (99.9) |
| Multiplicity | 4.7 (4.5) |
| Refinement: | |
| Resolution (Å) | 152.61-3.25 (3.329-3.25) |
| No. of reflections/free | 27487/1926 |
| No. of residues | 973 |
| No. of atoms | 7446 |
| $R_{work}/R_{free}$ | 0.2426 (0.2651) |
| B-factor (Å$^2$) | 60.78 |
| Bond length RMSD (Å) | 0.006 |
| Bond angle RMSD (°) | 0.937 |
| Ramachandran plot | |
| Preferred Region (%) | 94.67% |
| Allowed Region (%) | 5.33 |
| Outliers (%) | 0.10 |

Tables 4A, 4B sequentially show the list of amino acids involved in the interactions of the human CTLA4/ipilimumab complex and the CTLA4/138 complex.

TABLE 4A

Hydrogen bond and salt bridge between CTLA4 and ipilimumab (distance ≤ 3.7 Å)

| CTLA4 interface amino acid | Location of CTLA4 interface amino acid | ipilimumab interface amino acid | Location of ipilimumab interface amino acid |
|---|---|---|---|
| M3 | N-terminus | Y33 | LCDR2 |
| K95 | F chain | W102 | HCDR3 |
| E97 | F chain | Y53 | HCDR2 |
| M99 | F chain | Y59 | LCDR2 |
| Y104 | FG loop | S95 | LCDR3 |
| L106 | G chain | G93 | LCDR3 |
| I108 | G chain | Y33 | LCDR2 |

TABLE 4B

Hydrogen bond and salt bridge between CTLA4 and 138 (distance ≤ 3.7 Å)

| CTLA4 interface amino acid | Location of CTLA4 interface amino acid | 138 interface amino acid | Location of 138 interface amino acid |
|---|---|---|---|
| V46 | C' chain | N30 | CDR1 |
| T47 | C' chain | N30 | CDR1 |
| E48 | C' chain | G110 | CDR3 |
| E48 | C' chain | A111.1 | CDR3 |
| E48 | C' chain | W111.2 | CDR3 |
| D65 | C"D loop | R47 | C' chain |
| D65 | C"D loop | C111.3 | CDR3 |
| D65 | C"D loop | R112.2 | CDR3 |
| G83 | DE loop | T63 | CDR2 |
| D88 | DE loop | G62 | CDR2 |

Example 8: Verification of ADCC Activity of CTLA4 Binding Protein at Cellular Level A plasmid expressing a full-length human CTLA4 protein was transiently transfected into the constructed CHO cell line CHO-CD20 that stably expresses human CD20 protein, so that the cell line expresses both human CD20 and human CTLA4 protein, the cell is called CHO-CD20-CTLA4. Cells were collected after 48 h. 96-well blank plates were respectively added with 25 μl different antibodies of different concentrations (300 μg/ml, 30 μg/ml, 3 μg/ml, 0.3 μg/ml, 0.03 μg/ml), 25 μl target cells (CHO-CD20-CTLA4), 25 μl Jurkat-CD16a-176V-NFAT-RE (this cell line means that a human CD16a protein as well as an ADCC activity-related reporter gene system NFAT-RE are stably transfected in the Jurkat cells purchased from ATCC. When the target cells are activated by the ADCC effect, the reporter system will express luciferase, and further reacts with the fluorescent substrate to investigate the ADCC activity according to the fluorescence intensity). The mixed solution was incubated at 37° C. for 4 h. Each well was added with 20 μl Luciferase substrate and immediately tested on the machine.

Figure 16:
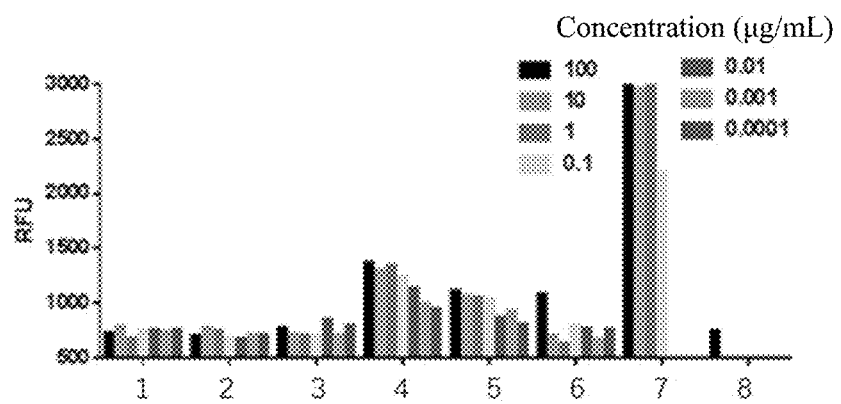
FIG. 16 shows the up-regulation of expression level of IL12 stimulated by the CTLA4-binding protein described in the present application.

The results were shown in FIG. 16. Groups 1-8 in FIG. 16 respectively correspond to the results of KN044-FcAG, 138-Fc, 138-FcAG, KN044, human IgG1, Rituxan and the negative control (without adding target cells). The results in FIG. 16 indicate that, 138-Fc and KN044 show dose-dependent ADCC activities, in which the activity of 138-Fc is slightly higher than that of KN044, while the activities of the two CTLA4-binding proteins are both weaker than that of Rituxan. After mutation, the ADCC activities of 138-FcAG and KN044-FcAG are almost undetectable.

Example 9: Detection of the Epitope that CTLA4-Binding Protein Binds to Human CTLA4 by Octet K2

Human CTLA4 was mutated in amino acids. The binding activity of the mutated human CTLA4 variant to 138-Fc was detected by the BLI method, specifically referring to Example 2.1. The situation can be seen in Table 5.

TABLE 5

| CTLA4 variant | KD (M) | Kon (1/Ms) | Kdis (1/s) | KD (variant)/KD (wild-type) |
|---|---|---|---|---|
| Wild-type | 5.21*10$^{-8}$ | 1.29*10$^5$ | 6.70*10$^{-3}$ | 1 |
| T47A | 7.27*10$^{-7}$ | 2.69*10$^4$ | 1.95*10$^{-2}$ | 14.0 |

TABLE 5-continued

| CTLA4 variant | KD (M) | Kon (1/Ms) | Kdis (1/s) | KD (variant)/KD (wild-type) |
|---|---|---|---|---|
| E48A | — | — | — | >1000 |
| V49A | — | — | — | >1000 |
| L63A | $2.91 \times 10^{-8}$ | $2.74 \times 10^{5}$ | $8.00 \times 10^{-3}$ | 0.56 |
| D64A | $3.15 \times 10^{-5}$ | $4.17 \times 10^{2}$ | $1.32 \times 10^{-2}$ | 604.6 |
| D65A | — | — | — | >1000 |
| I67A | $1.36 \times 10^{-6}$ | $6.96 \times 10^{4}$ | $9.48 \times 10^{-2}$ | 26.1 |
| L84A | — | — | — | >1000 |

TABLE 5-continued

| CTLA4 variant | KD (M) | Kon (1/Ms) | Kdis (1/s) | KD (variant)/KD (wild-type) |
|---|---|---|---|---|
| D88A | — | — | — | >1000 |
| Y92A | — | — | — | >1000 |

Figure 17:
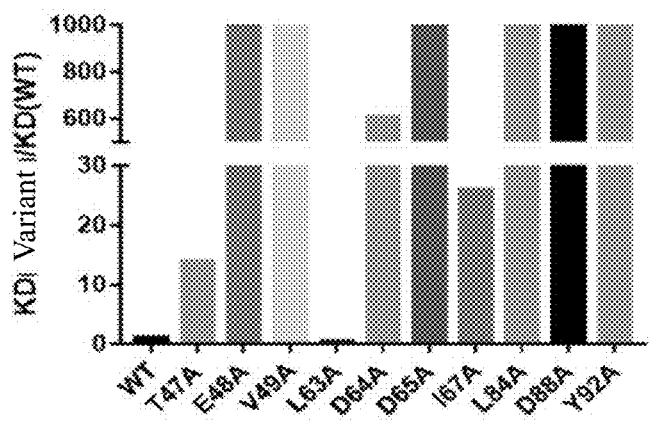
FIG. 17 shows the key epitope of the CTLA4-binding protein described in the present application binding to human CTLA4.

FIG. 17 shows the ratio of the $K_D$ value of 138-Fc binding to human CTLA4 variant to the KD value of 138-Fc binding to human CTLA4 (WT). The results of FIG. 17 show that, amino acid mutations of E48A, V49A, D65A, L84A, D88A and Y92A can all increase the KD value of the variant by more than 1000 times. It can be seen that E48, VV49, D65, L84, D88 and Y92 in human CTLA4 may be components of the epitope that 138-Fc binds to human CTLA4.

Example 10: Humanization of CTLA4-Binding Protein 10.1. Acquisition of Humanized Sequences The humanization method was achieved by employing a resurfacing method of the protein surface amino acids or a VHH humanization universal framework grafting method (CDR grafting to a universal framework).

The steps of humanization are as follows: The antibody 138 prepared in Example 1 is modeled homologously with modeling software called Modeller9. The reference homologous sequence is NbBcII10 antibody (PDB No.: 3DWT), and the relative solvent accessibility of the amino acids is calculated according to the three-dimensional structure of the protein. If an amino acid of 138 is exposed in the solvent, it will be replaced with the amino acid at the same location in the 10HQ sequence of the reference human antibody, until all the amino acids are replaced eventually.

The specific steps of the VHH humanization universal framework grafting method are as follows: Firstly, the universal humanization VHH framework hNbBcII10FGLA (PDB No.: 3EAK) designed by Cécile Vincke et al. based on sequence homology is acquired; the framework design is that, based on a nanobody NbBcII10 antibody (PDB NO.: 3DWT), performing protein surface amino acid humanization with reference to the human antibody (PDB No.: 1OHQ), and modifying partial amino acids VLP on the VHH sequence framework 1 (framework 1, i.e., FR1), partial amino acids GL on the VHH sequence framework 2 (FR2), partial amino acids RSKRAAV on the VHH sequence framework 3 (FR3) and amino acid L on the VHH sequence framework 4 (FR4).

138 was humanized to obtain 4 humanized variants of 138 (hu138V1-hu138V4), respectively. The numbering of the sequence of these humanized variants as well as the numbering of their amino acid residues can refer to Kabat numbering. Table 6 shows the alignment results of humanized sequences, in which the symbol "V" indicates the presence of this amino acid residue.

TABLE 6

| | Q5V | S11L | A14P | T19R | E44G | R45L | G75S | F80Y | K87R | P88A | M93V | Q121L |
|---|---|---|---|---|---|---|---|---|---|---|---|---|
| hu 138V1 | √ | | | √ | | | √ | √ | √ | √ | √ | √ |
| hu 138V2 | √ | √ | √ | √ | | | √ | √ | √ | √ | √ | √ |
| hu 138V3 | √ | | | √ | √ | √ | √ | √ | √ | √ | √ | √ |
| hu 138V4 | √ | √ | √ | √ | √ | √ | √ | √ | √ | √ | √ | √ |

Where, hu138V1 comprises HFR1-HFR4, in which HFR1 comprises an amino acid sequence as set forth in SEQ ID NO:21, HFR2 comprises an amino acid sequence as set forth in SEQ ID NO:22, HFR3 comprises an amino acid sequence as set forth in SEQ ID NO:23, HFR4 comprises an amino acid sequence as set forth in SEQ ID NO:24; hu138V1 comprises a heavy chain variable region, in which the heavy chain variable region comprises an amino acid sequence as set forth in SEQ ID NO:17.

Where, hu138V2 comprises HFR1-HFR4, in which HFR1 comprises an amino acid sequence as set forth in SEQ ID NO:25, HFR2 comprises an amino acid sequence as set forth in SEQ ID NO:22, HFR3 comprises an amino acid sequence as set forth in SEQ ID NO:23, HFR4 comprises an amino acid sequence as set forth in SEQ ID NO:24; hu138V2 comprises a heavy chain variable region, in which the heavy chain variable region comprises an amino acid sequence as set forth in SEQ ID NO:18.

Where, hu138V3 comprises HFR1-HFR4, in which HFR1 comprises an amino acid sequence as set forth in SEQ ID NO:21, HFR2 comprises an amino acid sequence as set forth in SEQ ID NO:26, HFR3 comprises an amino acid sequence as set forth in SEQ ID NO:23, HFR4 comprises an amino acid sequence as set forth in SEQ ID NO:24; hu138V3 comprises a heavy chain variable region, in which the heavy chain variable region comprises an amino acid sequence as set forth in SEQ ID NO:19.

Where, hu138V4 comprises HFR1-HFR4, in which HFR1 comprises an amino acid sequence as set forth in SEQ ID NO:25, HFR2 comprises an amino acid sequence as set forth in SEQ ID NO:26, HFR3 comprises an amino acid sequence as set forth in SEQ ID NO:23, HFR4 comprises an amino acid sequence as set forth in SEQ ID NO:24; hu138V4 comprises a heavy chain variable region, in which the heavy chain variable region comprises an amino acid sequence as set forth in SEQ ID NO:20.

10.2. Preparation of Fusion Protein with Mammal Cells

The humanized sequences obtained in 10.1 were commissioned to Suzhou Hongxun Biotechnologies Co., Ltd. for gene synthesis, and restriction sites were added at both ends. The humanized variants of 138 (hu138V1 to hu138V4) were double digested, and fused with DNA fragments encoding human IgG1Fc. The fused fragments were cloned into conventional mammal expression vectors, to obtain a recombinant plasmid for expressing humanized 138-Fc target proteins (hu138V1-Ld-Fc to hu138V4-Ld-Fc) in mammals.

The above recombinant plasmid was transfected into HEK293 cells for the transient expression of antibodies. The recombinant plasmid was diluted with Freestyle293 medium and added into a PEI (Polyethylenimine) solution required for transformation. Each group of plasmid/PEI mixture was respectively added into a suspension of HEK293 cells, placed at 37° C. and 5% $CO_2$, and cultured at 130 rpm. 4 hours later, EXCELL293 medium (adding 2 mM glutamine) was supplemented, and cultured at 130 rpm. 24 hours later, 3.8 mM VPA was added. And 72 hours later, 4 g/L of glucose was added. After cultivation for 5 to 6 days, the supernatant of the transiently expressed culture was collected and purified by protein A affinity chromatography to get the target protein. The purity of the target protein was preliminarily investigated by SDSPAGE and SECHPLC. The analysis on the expression and purity was shown in Table 7.

TABLE 7

| Target protein | $EC_{50}$ (ng/mL) |
|---|---|
| hu138v1-Ld-Fc | 36.2 |
| hu138v2-Ld-Fc | 34.6 |
| hu138v3-Ld-Fc | 34.9 |
| hu138v4-Ld-Fc | 33.6 |

10.3. Detection on the Thermostability of the Target Protein

The protein thermostability tester of UNCHAINED LABS Co. was used to determine a micro-volume of the target protein prepared in 10.2.

Temperature-rising program: the initial temperature was 15° C., the heating rate was 0.3° C./min, and the final temperature was 95° C. The fluorescence absorbance value of the sample at each temperature and each wavelength was recorded. The denaturation temperature Tm value was fitted by software as the highest point of the next derivative of the confidence wavelength BCM. The initial polymerization temperature Tagg value is one-tenth value of the next derivative of the static light scattering SLS at 473 nm. The higher the Tm1 value, indicating the protein is more stable. The results were shown in Table 8. It can be known from the results in Table 8 that, the Tm1 values of these target proteins are all higher than 60° C., indicating they all have good stability.

TABLE 8

| Target protein | Tm1 | Tagg |
|---|---|---|
| hu138v1-Ld-Fc | 67.4 | 69.7 |
| hu138v2-Ld-Fc | 67.5 | 68.8 |
| hu138v3-Ld-Fc | 67.2 | 68.5 |
| hu138v4-Ld-Fc | 66.9 | 69.0 |

Example 11: CTLA4-Binding Protein-Mediated Endocytic Degradation of CTLA4 on the Cell Membrane Surface HEK293-CTLA4 cells expressing human CTLA4 protein were obtained according to Example 3.3.

The initial concentrations of CTLA4-binding proteins to be tested were adjusted to 120 nM. Into each well of a 24-well plate were added 100 μl growth medium, and 100 μl CTLA4-binding protein to be tested. The density of HEK293-CTLA4 cells was adjusted to $1.2*10^6$ cells/ml, and 100 μl was added into each well. After that, they were incubated at 37° C. for 1-6 hours. Cells were then collected, and the supernatant was discarded. 50 μl human CTLA4 antibody PE-anti-human CD152 (diluted at 1:50) was added and incubated at 4° C. for 45 min. The cells were washed with 1% BSA/PBS twice. Each tube was added with 200 μl of 1% BSA/PBS resuspended cells. FACS was used to detect the changes in the amount of CTLA4 on the cell membrane in HEK293-CTLA4 after being incubated with different CTLA4 binding proteins to be detected by means of mean fluorescence intensity (MFI).

Figure 18:
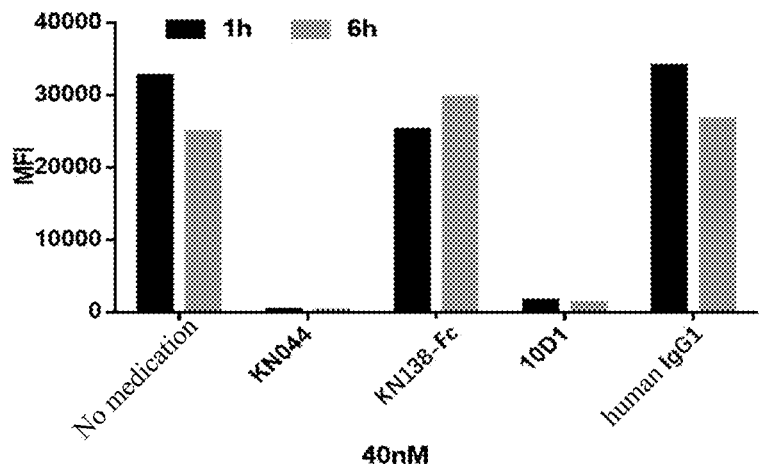
FIG. 18 shows the decrease of CTLA4 protein on the surface of the cell membrane caused by the endocytic degradation of the CTLA4-binding protein described in the present application.

The results were shown in FIG. 18. After incubating with 138-Fc and HEK293-CTLA4 cells for 1-6 hours, there is essentially no difference in the expression level of CTLA4 on the cell surface compared with the inactive control isotype antibody (human IgG1), or the control group without any antibody treatments. It indicates that, after incubation at 37° C. for 1-6 hours, 138-Fc cannot cause the endocytic degradation of CTLA4 molecules on the cell membrane surface, or it can further stabilize the CTLA4 molecules on the membrane surface. However, for cells treated with KN044 and ipilimumab, the expression level of CTLA4 is obviously reduced, indicating that KN044 or ipilimumab reduces the density of CLTA4 on the cell membrane surface through endocytosis.

Example 12: Preliminary Evaluation on the Toxicity of CTLA4 Binding Protein in Immune Reconstituted Mice To preliminarily evaluate the immunotoxicity caused by CTLA4 binding proteins of different natures, immune reconstituted mice (i.e., implanting human immunoblasts into immunodeficient mice to reconstitute a human immune system in the mice) were selected and intraperitoneally given 100 μg CTLA4-binding protein to be tested (138-Fc prepared in Example 1, marketed CTLA4 monoclonal antibody drug ipilimumab (Abbreviation: 1pilim) from BMS) or an equal volume of PBS as a control group, respectively twice a week (calculated with the body weight of a mouse at about 20 g, the dosage is about 5 mg/kg). There were 5 mice in each group.

Since the administration, the states of mice were observed every day until the 19th day. It was found from the results that, by day 19, all mice in the ipilimumab administration group had acute immune responses caused by the administration of ipilimumab; however, only two mice in the 138-Fc group had drug responses, and the mice in the control group all survived.

Thus, it can be seen that, 138-Fc protein shows more lower pharmacological toxicity compared with ipilimumab.

The foregoing detailed description is provided by way of explanation and examples, and is not intended to limit the scope of the appended claims. Various changes of the embodiments listed herein are obvious to those of ordinary skills in the art, and are reserved within the scope of the appended claims and their equivalents.

The invention claimed is:

1. A method of treating a tumor, wherein the method comprises administering a CTLA4-binding protein to a subject in need thereof,
   wherein the CTLA4-binding protein comprises an antibody Fc domain and an antibody heavy chain variable region, and the antibody heavy chain variable region is directly or indirectly fused with the antibody Fc domain; and
   wherein the heavy chain variable region comprises an amino acid sequence as set forth in any one of SEQ ID NOs: 8 and 17-20, and the antibody Fc domain is of human IgG1 isotype subtype.

2. The method according to claim 1, wherein the CTLA4-binding protein binds to human CTLA4 and monkey CTLA4.

3. The method according to claim 1, wherein the CTLA4-binding protein binds to or recognizes:
   a) one or more amino acids in the ABEDC" chain, A'B loop, C"D loop, DE loop and/or EF loop of human CTLA4;
   b) one or more amino acids in the C' chain, C"D loop and/or DE loop of human CTLA4; or
   c) a) and b).

4. The method according to claim 1, wherein the CTLA4-binding protein recognizes or binds to a conformational epitope in human CTLA4 comprising one or more of the following amino acid residues: V46, T47, E48, V49, D64, D65, I67, G83, L84, D88 and Y92.

5. The method according to claim 1, wherein the CTLA4-binding protein recognizes or binds to a conformational epitope in human CTLA4 comprising the following amino acid residues: E48, V49, D65, L84, D88 and Y92.

6. The method according to claim 1, wherein the CTLA4-binding protein does not compete for binding to CTLA4 with a molecule that recognizes or binds to:
   a) one or more of the following amino acid residues in human CTLA4: K95, E97, M99, Y104, L106 and I108;
   b) one or more amino acids in the F chain, FG loop and/or G chain of CTLA4; or
   c) a) and b).

7. The method according to claim 1, wherein the CTLA4-binding protein is a single-domain antibody or an antigen binding fragment thereof.

8. The method according to claim 1, wherein the CTLA4-binding protein comprises an amino acid sequence as set forth in SEQ ID NO: 9.

9. The method according to claim 1, wherein the tumor is:
   a) a solid tumor;
   b) colon cancer; or
   c) melanoma.

10. A method of treating a tumor, wherein the method comprises administering a pharmaceutical composition comprising the CTLA4-binding protein according to claim 1 and a pharmaceutically acceptable carrier to a subject in need thereof, wherein the tumor is:
   a) a solid tumor;
   b) colon cancer; or
   c) melanoma.

* * * * *